(12) United States Patent
Henry

(10) Patent No.: US 12,140,467 B2
(45) Date of Patent: Nov. 12, 2024

(54) COMMUNICATING WEIGHT SENSOR UNITS AND TECHNIQUES FOR USING SAME

(71) Applicant: INVENTOR-E LIMITED, West Midlands (GB)

(72) Inventor: Dean Charles Henry, Solihull (GB)

(73) Assignee: INVENTOR-E LIMITED, West Midlands (GB)

( * ) Notice: Subject to any disclaimer, the term of this patent is extended or adjusted under 35 U.S.C. 154(b) by 441 days.

(21) Appl. No.: 17/410,568

(22) Filed: Aug. 24, 2021

(65) Prior Publication Data

US 2022/0113182 A1   Apr. 14, 2022

(30) Foreign Application Priority Data

Aug. 24, 2020   (GB) ...................................... 2013225

(51) Int. Cl.
*G01G 13/00* (2006.01)
*G01G 23/18* (2006.01)
*G08C 17/02* (2006.01)

(52) U.S. Cl.
CPC ........... *G01G 13/006* (2013.01); *G01G 23/18* (2013.01); *G08C 17/02* (2013.01)

(58) Field of Classification Search
CPC ...... G01G 13/006; G01G 23/18; G01G 19/42; G01G 23/3735; G01G 19/00; G08C 17/02

(Continued)

(56) References Cited

U.S. PATENT DOCUMENTS 5,051,601 A   9/1991   Atobe
5,804,810 A *   9/1998   Woolley ................. G06Q 10/08
                                                      235/383

(Continued)

FOREIGN PATENT DOCUMENTS

CA    2 829 535 A1    4/2015
CN    106979814 A    7/2017

(Continued)

OTHER PUBLICATIONS

Office Action dated Nov. 21, 2023 corresponding to Canadian Patent Application No. 3, 128,832.

(Continued)

*Primary Examiner* — Jacques M Saint Surin
(74) *Attorney, Agent, or Firm* — SQUIRE PATTON BOGGS (US) LLP

(57) ABSTRACT

A weight sensor unit, comprises a weight sensor configured to output weight sensor readings indicative of the weight being supported thereby. A transmission device is configured to transmit wireless signals, and a processor, is coupled to the weight sensor and to the transmission device. The weight sensor unit includes a battery. The weight sensor, transmission device and processor are powered by the battery. In use, the processor is configured to receive one or more weight sensor readings output by the weight sensor, and transmit the weight sensor readings wirelessly using the transmission device. The weight sensor unit may include a wireless transceiver configured to wirelessly interact with devices placed in proximity thereto. In an embodiment, all electronic components of the weight sensor unit are powered by the battery. A dispensing unit incorporating the weight sensor unit is also disclosed.

15 Claims, 61 Drawing Sheets

(58) Field of Classification Search
USPC .......................................................... 177/245
See application file for complete search history.

(56) References Cited

U.S. PATENT DOCUMENTS

| | | | |
|---|---|---|---|
| 5,874,724 | A | 2/1999 | Cato |
| 5,892,441 | A * | 4/1999 | Woolley ................. G06K 17/00 340/8.1 |
| 5,917,433 | A * | 6/1999 | Keillor ..................... G08G 1/20 340/7.37 |
| 7,027,808 | B2 * | 4/2006 | Wesby .................. H04W 8/245 455/423 |
| 8,219,466 | B2 * | 7/2012 | Gui ....................... G06Q 10/087 705/28 |
| 9,109,943 | B2 * | 8/2015 | Mager ..................... G16H 20/60 |
| 2007/0040683 | A1 | 2/2007 | Oliver et al. |
| 2007/0050271 | A1 * | 3/2007 | Ufford ................. G06Q 10/087 705/28 |
| 2007/0050315 | A1 | 3/2007 | Rabindran |
| 2008/0105469 | A1 | 5/2008 | Domel |
| 2009/0102665 | A1 | 4/2009 | Baranowski et al. |
| 2010/0156640 | A1 | 6/2010 | Forster |
| 2010/0327001 | A1 | 12/2010 | Godlewski |
| 2011/0301749 | A1 | 12/2011 | Hammonds et al. |
| 2013/0033381 | A1 | 2/2013 | Breed |
| 2013/0218511 | A1 | 8/2013 | Mager et al. |
| 2014/0246918 | A1 | 9/2014 | Shijo et al. |
| 2014/0262918 | A1 | 9/2014 | Chu |
| 2016/0071052 | A1 | 3/2016 | Henry et al. |
| 2016/0188838 | A1 | 6/2016 | Bradley et al. |
| 2017/0200275 | A1 | 7/2017 | McCloskey et al. |
| 2018/0372398 | A1 | 12/2018 | Cosgrove et al. |
| 2019/0307648 | A1 | 10/2019 | Bartos |
| 2019/0354734 | A1 | 11/2019 | Forster |
| 2020/0065748 | A1 | 2/2020 | Durkee et al. |
| 2021/0160241 | A1 | 5/2021 | Andreev |
| 2021/0201256 | A1 | 7/2021 | Rahilly et al. |

FOREIGN PATENT DOCUMENTS

| | | |
|---|---|---|
| CN | 111143152 A | 5/2020 |
| CN | 210836378 U | 6/2020 |
| CN | 111397710 A | 7/2020 |
| EP | 2 315 162 A1 | 4/2011 |
| EP | 2 819 072 A1 | 12/2014 |
| EP | 3 333 776 A1 | 6/2018 |
| GB | 2529906 A | 3/2016 |
| GB | 2567336 A | 10/2019 |
| GB | 2579941 A | 7/2020 |
| GB | 2600522 A | 5/2022 |
| GB | 2610904 A | 3/2023 |
| JP | 2008191888 A | 8/2008 |
| WO | WO 2006/116665 A1 | 11/2006 |
| WO | WO 2007/128572 A1 | 11/2007 |
| WO | WO 2017/156619 A1 | 9/2017 |
| WO | WO 2017/211708 A1 | 12/2017 |

OTHER PUBLICATIONS

Office Action dated Jan. 27, 2023, corresponding to Canadian Patent Application No. 3,128,832.
Office Action dated Nov. 21, 2022, corresponding to Great Britain Patent Application No. 2112147.0.
Extended European Search Report dated Jan. 11, 2022 corresponding to European Patent Application No. 21020425.1.
Combined Search and Examination Report under Sections 17 and 18(3) dated Feb. 22, 2022 corresponding to GB Application No. GB2112145.4.
Combined Search and Examination Report under Sections 17 and 18(3) dated Feb. 24, 2022 corresponding to GB Application No. GB2112147.0.
Combined Search and Examination Report under Sections 17 and 18(3) dated Feb. 22, 2022 corresponding to GB Application No. GB2112148.8.
Combined Search and Examination Report under Sections 17 and 18(3) dated Feb. 25, 2022 corresponding to GB Application No. GB2112151.2.
Combined Search and Examination Report under Sections 17 and 18(3) dated Feb. 28, 2022 corresponding to GB Application No. GB2112153.8.
Office Action dated Oct. 2, 2023, corresponding to Great Britain Patent Application No. 2310604.0.
Communication pursuant to Article 94(3) EPC dated Aug. 8, 2023, corresponding to European Patent Application No. 21020425.1.
Extended European Search Report dated Jan. 9, 2024 corresponding to European Patent Application No. 23020089.1.
Combined Search and Examination Report under Sections 17 and 18(3) dated Aug. 21, 2023 corresponding to Patent Application No. GB2302672.7.
Combined Search and Examination Report under Sections 17 and 18(3) dated Aug. 25, 2023 corresponding to Patent Application No. GB2302680.0.
Extended European Search Report dated Jul. 13, 2023, corresponding to European Patent Application No. 23020094.1.
Office Action dated Jul. 14, 2023, corresponding to GB Patent Application No. GB2302652.9.
Examination Report under Section 18(3) dated May 31, 2024 corresponding to United Kingdom Patent Application No. GB2310604.0.
Communication pursuant to Article 94(3) EPC dated Jul. 15, 2024 corresponding to European Patent Application No. 23020094.1.
Examination Report under Section 18(3) dated Oct. 1, 2024 corresponding to United Kingdom Patent Application No. GB2310604.0.
Office Action dated Oct. 1, 2024 corresponding to U.S. Appl. No. 18/113,714.

* cited by examiner

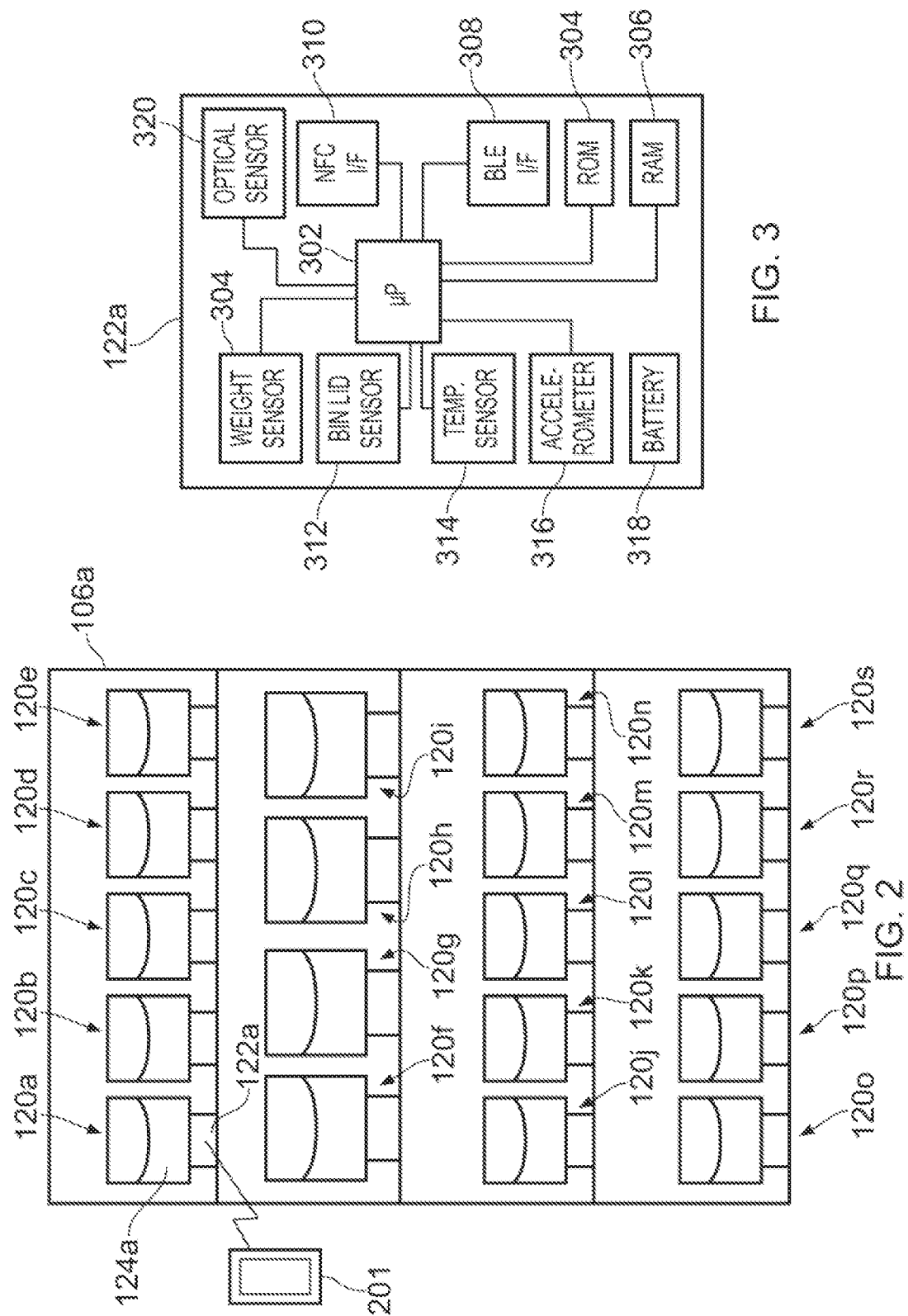

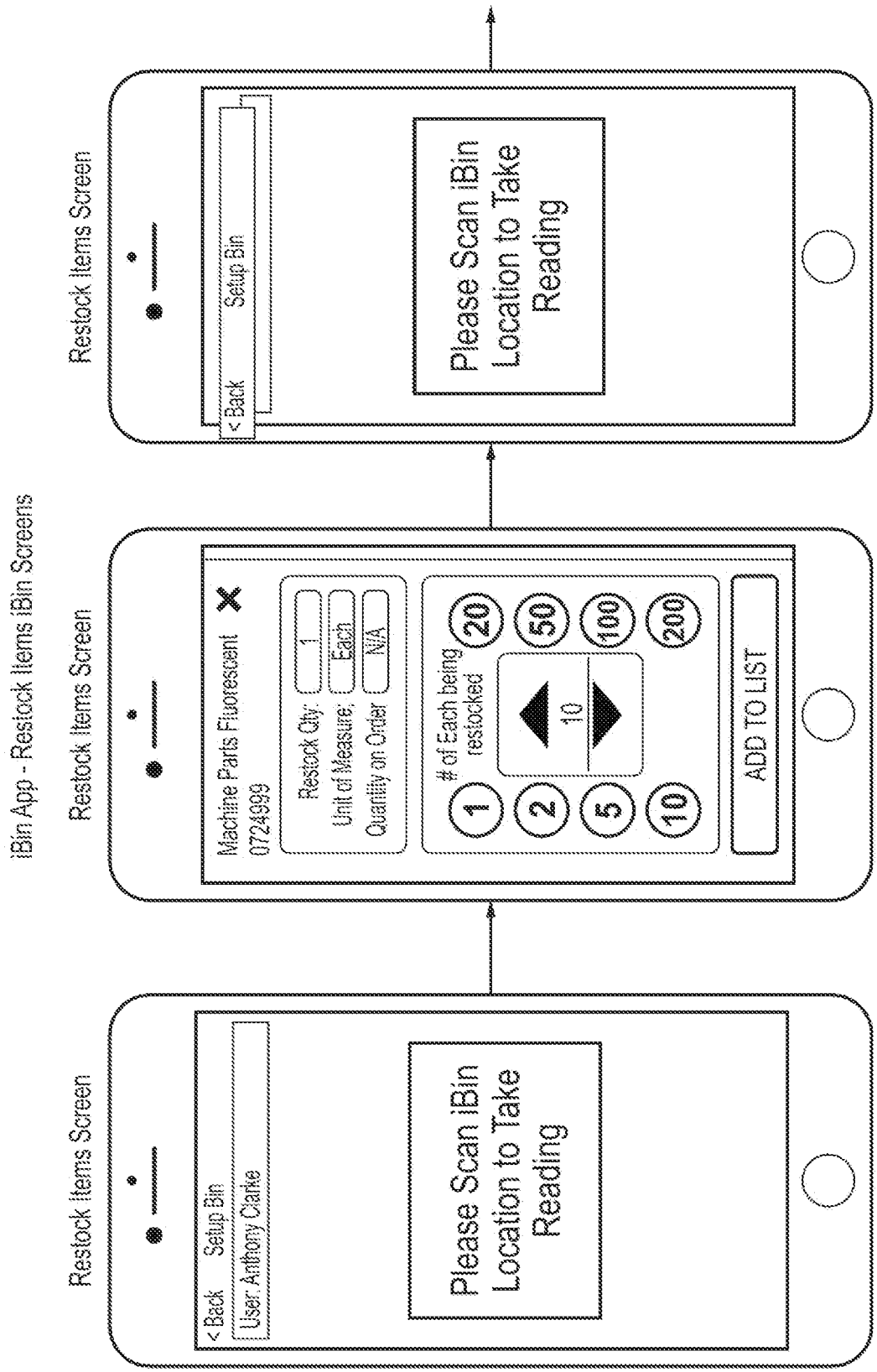

COMMUNICATING WEIGHT SENSOR UNITS AND TECHNIQUES FOR USING SAME

The present invention relates to electronic stock or asset monitoring techniques, and more particularly to communicating weight sensor units and techniques for using same.

In various environments it is desirable to detect conditions or take measurements relating to objects or attributes of the objects, i.e., using electronic measurement devices that include sensors. Such devices may be found in factories or production sites, or any environment in which attributes of the object(s) may change over time, such as a quantity of objects or items sensed. It is then conventional for the measurements to be used, often by being communicated to a controller, possibly a remote server, by a communications network; and the controller may operate responsive to the sensed measurements.

In a case where electronic measurement devices are used to take measurements such as a quantity of objects or items, a problem with such systems is that some organisations have thousands of objects or items across their sites, and/or have numerous electronic measurement devices which may be spread across one or multiple locations within a site, and/or across numerous sites. The electronic measurement devices are integrated into the infrastructure of a site by wired and essentially permanent connections, and the process of setting up the electronic measurement devices, and/or removing and reconfiguring them, is onerous, inflexible and time consuming. This is particularly the case where the electronic measurement devices comprise weight sensor units including potentially delicate electronic sensors.

BRIEF SUMMARY

In one embodiment of this disclosure, there is provided a weight sensor unit, comprising a weight sensor configured to output weight sensor readings indicative of the weight being supported by the weight sensor. The weight sensor unit may further comprise a transmission device is configured to transmit wireless signals. The weight sensor unit may further comprise a processor, coupled to the weight sensor and to the transmission device. The weight sensor unit may further comprise a battery, wherein the weight sensor, transmission device and processor are powered by the battery. The processor may be configured to: receive one or more weight sensor readings output by the weight sensor; and transmit the one or more weight sensor readings wirelessly using the transmission device.

An advantage is that the weight sensor unit is an autonomous unit, and can be independently deployed to a wide range of locations. In addition, no connecting up of cabling is necessary, greatly simplifying and expediting the process of deploying a weight sensor unit. For a large number of weight sensor units to be deployed across a site or at multiple sites, the technical installation time and effort is considerably reduced.

In an embodiment, the transmission device is configured to transmit wireless signals with a signal power sufficient to reach a wireless gateway or a wireless access point. The transmission device may be configured to transmit wireless signals with a signal power providing a range of signal reception lying in the range of (i) 1 to 500 m, (ii) 50 to 500 m, (iii) 50 to 400 m or (iv) 100 to 400 m. In embodiments (i) the transmission device is a Bluetooth Low Energy (BLE) transmitter, and the wireless signals are BLE signals or (ii) the transmission device is an ultra-wide band (UWB) transmitter, and the wireless signals are UWB signals.

In an embodiment, the weight sensor unit further comprises a wireless transceiver configured to wirelessly interact with devices placed in proximity thereto. In an embodiment, the transceiver comprises a NFC transceiver In an embodiment, all electronic components of the weight sensor unit are powered by the battery.

The processor may be configured to: receive a weight sensor reading output by the weight sensor; construct a weight sensor reporting message, the weight sensor reporting message including (i) identifying data related to the dispensing unit or to the weight sensor unit and (ii) the weight sensor reading, and transmit the weight sensor reporting message using the transmission device. In embodiments, (i) the weight sensor unit has a weight sensor unit ID and/or a weight sensor unit type ID, and the identifying data comprises or additionally includes the weight sensor unit ID and/or the weight sensor unit type ID and/or (ii) the transmission device has a transmission device ID and/or a transmission device type ID, and the identifying data comprises or additionally includes the transmission device ID and/or the transmission device type ID. In an embodiment, the weight sensor unit ID is unique to the weight sensor unit and/or the transmission device ID is unique to the transmission device.

The processor may be configured to repeatedly poll the weight sensor for a weight sensor reading with a predetermined periodicity T. In embodiments, (i) T is in the range 1 to 10 minutes, (ii) T is in the range 2 to 5 minutes or (iii) T is 3 minutes.

In another embodiment of this disclosure, there is provided a dispensing unit, comprising: a container configured to receive or support the stock items; and a weight sensor unit configured to support, in use, the container, the weight sensor unit being in accordance with embodiments of this disclosure.

In an embodiment, the container has a container ID and/or a container type ID and/or the container ID is unique to the container. In an embodiment, the identifying data comprises the container ID and/or the container type ID.

In another embodiment of this disclosure, there is provided a dispensing system, for dispensing stock items, the dispensing system comprising a dispensing unit, a portable wireless device and a central control computer configured for communication with the dispensing unit and the portable wireless device via a network. The dispensing unit may comprise: a container configured to receive or support the stock items; and a weight sensor unit, configured to support, in use, the container. The weight sensor unit may comprise: a weight sensor configured to output weight sensor readings indicative of the weight of the container; a first transceiver, configured to wirelessly interact with devices placed in proximity thereto; and a first processor, coupled to the weight sensor and the first transceiver; and optionally a battery, wherein the weight sensor, transceiver and processor are powered by the battery. The portable wireless device may comprise: a first memory configured for storage of programs and data; a display configured for displaying graphical data; an input device configured to receive user inputs; an output device configured to output visual or audible alerts; a second transceiver configured for wireless communication with the first transceiver when placed in proximity thereto by a user of the portable wireless device; and a second processor, the first memory, display, input device and transceiver being connected to the second processor. The central control computer may comprise: a second memory configured for storage of programs and data; and a third processor connected to the second memory. The first processor may be configured to: in response to a portable wireless device being tapped or placed in proximity to the first transceiver for a first time, receive first wireless signals from the portable wireless; receive a weight sensor reading output by the weight sensor during a first predetermined period after receipt of the first wireless signals; and transmit a weight reading reporting message to the central control computer via the network, the weight reading reporting message including the weight sensor reading output by the weight sensor. The second processor may be configured to: receive a first quantity input by the user via the input device; and in response to a portable wireless device being tapped or placed in proximity to the first transceiver for a second time, transmit a quantity reporting message to the central control computer via the network, the quantity reporting message including the first quantity. The third processor may be configured to: receive the weight reading reporting message; extract the weight sensor reading from the weight reading reporting message; determine as a second quantity the difference between the extracted weight sensor reading and an immediately preceding weight sensor reading, divided by a unit weight of a corresponding stock item; receive the quantity reporting message; extract the first quantity from the quantity reporting message; and determine whether the first quantity is different from the second quantity; and transmit an alert command message to (i) the portable wireless device and/or (ii) to an output unit associated with the dispensing unit, if it is determined that the first quantity is different from the second quantity. The first processor may be configured to: in response to receipt of the alert command message, output a visual and/or audible alert using the output unit, the alert indicating that the weight sensor requires recalibration or replacement. Alternatively or additionally, the second processor may be configured to: in response to receipt of the alert command message, output a visual and/or audible alert using the output device, the alert indicating that the weight sensor requires recalibration or replacement.

The dispensing may comprise a dispensing unit, the dispensing unit comprising a container configured to receive or support the stock items; and the weight sensor unit may be configured to support, in use, the container.

In another embodiment of this disclosure, there is provided a weight sensor unit for use in the dispensing system, or in the dispensing unit. The weight sensor unit may comprise: a weight sensor configured to output weight sensor readings indicative of the weight of the container; a first transceiver, configured to wirelessly interact with devices placed in proximity thereto; and a first processor, coupled to the weight sensor and the first transceiver; and optionally a battery, wherein the weight sensor, transceiver and processor are powered by the battery. The first processor may be configured to: in response to a portable wireless device being tapped or placed in proximity to the first transceiver for a first time, receive first wireless signals from the portable wireless; receive a weight sensor reading output by the weight sensor during a first predetermined period after receipt of the first wireless signals; and transmit a weight reading reporting message to the central control computer via the network, the weight reading reporting message including the weight sensor reading output by the weight sensor. The first processor may be configured to: in response to receipt of the alert command message, output a visual and/or audible alert using the output unit, the alert indicating that the weight sensor requires recalibration or replacement.

In another embodiment of this disclosure, there is provided a dispensing unit for use in the dispensing system, the dispensing unit comprising: a container configured to receive or support the stock items; and a weight sensor unit configured to support, in use, the container, the weight sensor unit being in accordance with one or more embodiments of this disclosure.

The first wireless signals from the portable wireless device may include an identifier of the portable wireless device or user thereof.

In an embodiment, the first processor is configured to: receive a weight sensor reading output by the weight sensor; construct a weight sensor reporting message, the weight sensor reporting message including (i) identifying data related to the dispensing unit or to the weight sensor unit and (ii) the weight sensor reading, and transmit the weight sensor reporting message using the transmission device. In embodiments, the weight sensor unit has a weight sensor unit ID and/or a weight sensor unit type ID, and the identifying data comprises or additionally includes the weight sensor unit ID and/or the weight sensor unit type ID. In embodiments, the transmission device has a transmission device ID and/or a transmission device type ID, and the identifying data comprises or additionally includes the transmission device ID and/or the transmission device type ID. In embodiments, the container has a container ID and/or a container type ID, and the identifying data comprises the container ID and/or the container type ID. In embodiments, the container ID is unique to the container, the weight sensor unit ID is unique to the weight sensor unit and/or the transmission device ID is unique to the transmission device.

In an embodiment, the first processor is configured to repeatedly poll the weight sensor for a weight sensor reading with a predetermined periodicity T. In embodiments, (i) T is in the range 1 to 10 minutes, (ii) T is in the range 2 to 5 minutes or (iii) T is 3 minutes.

In embodiments, (i) the transmission device is a Bluetooth Low Energy (BLE) transmitter, and the wireless signals are BLE signals or (ii) the transmission device is an ultra-wide band (UWB) transmitter, and the wireless signals are UWB signals.

In an embodiment, the transceiver comprises a NFC transceiver.

In an embodiment, all electronic components of the weight sensor unit are powered by the battery.

In an embodiment, the dispensing unit is disposed inside a cabinet configured for wired or wireless communication with the dispensing unit, and the output unit comprises a visual and/or audio output device disposed on the cabinet.

In another embodiment of this disclosure, there is provided a portable wireless device for use in the dispensing system. The portable wireless device may comprise: a first memory configured for storage of programs and data; a display configured for displaying graphical data; an input device configured to receive user inputs; an output device configured to output visual or audible alerts; a second transceiver configured for wireless communication with the first transceiver when placed in proximity thereto by a user of the portable wireless device; and a second processor, the first memory, display, input device and transceiver being connected to the second processor. The second processor may be configured to: receive a first quantity input by the user via the input device; and in response to a portable wireless device being tapped or placed in proximity to the first transceiver for a second time, transmit a quantity reporting message to the central control computer via the network, the quantity reporting message including the first quantity. The second processor may be configured to: in response to receipt of the alert command message, output a visual and/or audible alert using the output device, the alert indicating that the weight sensor requires recalibration or replacement.

In another embodiment of this disclosure, there is provided a central control computer for use in the dispensing system. The central control computer may comprise: a second memory configured for storage of programs and data; and a third processor connected to the second memory. The third processor may be configured to: receive the weight reading reporting message; extract the weight sensor reading from the weight reading reporting message; determine as a second quantity the difference between the extracted weight sensor reading and an immediately preceding weight sensor reading, divided by a unit weight of a corresponding stock item; receive the quantity reporting message; extract the first quantity from the quantity reporting message; determine whether the first quantity is different from the second quantity. The third processor may be configured to: transmit an alert command message to (i) the portable wireless device and/or (ii) to an output unit associated with the dispensing unit, if it is determined that the first quantity is different from the second quantity.

In another embodiment of this disclosure, there is provided a dispensing unit, for dispensing stock items, the system comprising a container configured to receive or support the stock items, the container including a lid, a lid sensor on the container or lid being configured to issue at least a lid open signal in the event that a transition of the lid from closed to open is detected by the lid sensor. The dispensing unit may further comprise a weight sensor unit, configured to support, in use, the container. The weight sensor unit may comprise: a weight sensor configured to output weight sensor readings indicative of the weight being supported by the weight sensor; a transmission device configured to transmit wireless signals; a processor, coupled to the weight sensor, lid sensor and to the transmission device, and a battery, wherein the weight sensor, sensor, transmission device and processor are powered by the battery. The processor may be configured to: receive the lid open signal; only after receipt of the lid open signal, receive one or more weight sensor readings output by the weight sensor, and transmit the one or more weight sensor readings using the transmission device.

In an embodiment, the lid sensor is further configured to issue a lid close signal in the event that a transition of the lid from open to closed is detected by the lid sensor; and wherein the processor is configured to: only after receipt of the lid close signal, receive one or more weight sensor readings output by the weight sensor, and transmit the one or more weight sensor readings using the transmission device. In an embodiment, the processor is configured to transmit the one or more weight sensor readings using the transmission device only after receipt (i) of the lid open signal and (ii) the lid close signal within a predetermined timeout period after the lid open signal.

In an embodiment, the transmission device is configured to be operated in one of at least a first state in which the transmission device consumes power P1, and in a second state, in which the transmission device consumes power P2, wherein P2 is greater than P1. In embodiments, the processor is configured to switch the transmission device from the first state to the second state only after only after receipt (i) of the lid open signal and/or (ii) the lid close signal within a predetermined timeout period after the lid open signal. In an embodiment, in the first state the transmission device is in deactivated mode, and in the second state the transmission device is in activated mode whereby it is able to transmit the wireless signals. In embodiments, (i) P1 is 2 to 50 times P2, or P1 is 5 to 15 times P2 or P1 is 10 times P2 and/or (ii) P3 is 2 to 50 times P4, or P3 is 5 to 15 times P4 or P1 is 10 times P2. In an embodiment, P1 is zero.

In an embodiment, after the lid close signal and until the next lid open signal the processor is configured to repeatedly poll the weight sensor for a weight sensor reading with a predetermined periodicity T. In embodiments, (i) T is in the range 1 second to 5 minutes, (ii) T is in the range 1 second to 3 minutes or (iii) T is in the range 1 second to 1 minute.

In an embodiment, the processor is configured to transmit the wireless signals using the transmission device at a given time at a settable signal strength S, corresponding to a range R of signal reception.

D12. The dispensing unit of claim 11, wherein: (i) the signal strength S corresponds to a range R of signal reception lying in the range of (i) 1 to 500 m, (ii) 50 to 500 m, (iii) 50 to 400 m or (iv) 100 to 400 m. In embodiments, (i) the transmission device is a Bluetooth Low Energy (BLE) transmitter, and the wireless signals are BLE signals or (ii) the transmission device is an ultra-wide band (UWB) transmitter, and the wireless signals are UWB signals.

In an embodiment, after the lid open signal and until the next lid close signal the processor is configured to repeatedly poll the weight sensor to obtain a weight sensor reading, and to average the weight sensor reading obtained over a predetermined period lying within or contemporaneous with the period between the lid open signal and until the next lid close signal. In an embodiment, the processor is configured to: poll the weight sensor to obtain a weight sensor reading in response to receipt of the lid open signal; and/or poll the weight sensor to obtain a weight sensor reading in response to receipt of the lid close signal; and/or average weight sensor readings in a period commencing at a time point a first predetermined delay period after the lid open signal and/or ending at the next lid close signal.

In another embodiment of this disclosure, there is provided a dispensing arrangement, the dispensing arrangement comprising: a housing, wherein a plurality of compartments are configured or disposed within the housing; wherein each compartment is configured as a dispensing unit according to one or more embodiments of this disclosure. In embodiments, for each compartment, the processor of the corresponding dispensing unit is configured to (i) obtain the weight sensor readings and/or (ii) transmit the one or more weight sensor readings using the transmission device, independently of the processor of the or each other compartment. In embodiments, (i) the weight sensor readings are obtained and/or (ii) the one or more weight sensor readings are transmitted using the transmission device, only by the respective processor of those compartments in which the lid open signal and/or the next lid close signal is received.

In another embodiment of this disclosure, there is provided a dispensing enclosure, the dispensing enclosure comprising: a housing; a door mounted on the housing, whereby the door is openable and closable by a user; and one or more shelves mounted internally within the housing; and one or more dispensing units according to any of the preceding claims disposed on one or more of the shelves. In an embodiment, for each dispensing unit, the processor thereof the corresponding dispensing unit is configured to (i) obtain the weight sensor readings and/or (ii) transmit the one or more weight sensor readings using the transmission device, independently of the processor of the or each other dispensing unit. In an embodiment, (i) the weight sensor readings are obtained and/or (ii) the one or more weight sensor readings are transmitted using the transmission device, only by the respective processor of those dispensing units in which the lid open signal and/or the next lid close signal is received.

In another embodiment of this disclosure, there is provided a weight sensor unit, comprising: a weight sensor configured to output weight sensor readings indicative of the weight being supported by the weight sensor; a multimode component configured for sensing or transmitting data, wherein the multimode component is configured to be operated in one of at least a first state and a second state, whereby power consumption by the multimode component is lower in the second state than in the first state; a transceiver, configured to wirelessly interact with devices placed in proximity thereto; a processor, coupled to the weight sensor, multimode component and transceiver; and a battery, wherein the weight sensor, multimode component, transceiver and processor are powered by the battery. The processor may be configured to: in response to a portable wireless device of a user being tapped on or placed in proximity to the transceiver, receive a first wireless signal from the portable wireless device, the first wireless signal including a first setting command; and determine, from the first wireless signal, the first setting command; and if the first setting command corresponds to a command to change the state of the multimode component from one of the first state and the second state to the other of the first state and the second state, setting the state of the multimode component to the other of the first state and the second state.

In an embodiment, power consumption by the multimode component in the second state is the lowest possible power consumption of the weight sensor unit.

In an embodiment, setting the state of the multimode component to the other of the first state and the second state comprises:
if the multimode component is in the first state and if the first setting command is a command to set the state of the multimode component to the second state, setting the multimode component to operate in the second state.

In an embodiment, the multimode component comprises a transmission device configured to transmit wireless signals. In an embodiment, the processor is further configured to transmit the one or more of the weight sensor readings in the wireless signals using the transmission device. In an embodiment, the processor is further configured to transmit the wireless signals using the transmission device at a given time at a settable frequency f, corresponding to a periodicity T. In an embodiment, the processor is configured to: transmit the wireless signals using the transmission device at a set frequency f1, corresponding to a periodicity T1, when the transmission device is operated in the first state, and transmit the wireless signals using the transmission device at a set frequency f2, corresponding to a periodicity T2, when the transmission device is operated in the second state; wherein T2 is greater than T1. In embodiments, (i) T2 is 5-10 times T1 or (ii) T2 is 10-100 times T1. In embodiments, (i) T1 is in the range 1 to 10 minutes, (ii) T1 is in the range 2 to 5 minutes or (iii) T1 is 3 minutes. In an embodiment, the processor is configured to: extract the periodicity T from the first setting command, where T is one of T1 or T2.

In an embodiment, the processor is further configured to transmit the wireless signals using the transmission device at a given time at a settable signal strength S, corresponding to a range R of signal reception. In an embodiment, processor is configured to: transmit the wireless signals using the transmission device at a set signal strength S1, corresponding to a range R1, when the transmission device is operated in the first state, and transmit the wireless signals using the transmission device at a set signal strength S2, corresponding to a range R2, when the transmission device is operated in the second state; wherein S2 is less than S1. In embodiments, (i) signal strength S1 is 1.5-10 times signal strength S2 or (ii) signal strength S1 is 1.5-5 times signal strength S2. In embodiments, (i) signal strength S1 corresponds to a range R1 of signal reception lying in the range of (i) 1 to 500 m, (ii) 50 to 500 m, (iii) 50 to 400 m or (iv) 100 to 400 m. In an embodiment, the processor is configured to: extract the signal strength S from the first setting command, where S is one of S1 or S2.

In an embodiment, the multimode component comprises or further includes at least one supplementary sensor. In embodiments, the at least one supplementary sensor comprises at least a first supplementary sensor and a second supplementary sensor; when in the first state the first supplementary sensor consumes power P1, and when in the second state the first supplementary sensor consumes power P2, wherein P2 is less than P1; and/or when in the first state the second supplementary sensor consumes power P3, and when in the second state the second supplementary sensor consumes power P4, wherein P4 is less than P3. In embodiments, (i) P1 is 2 to 50 times P2, or P1 is 5 to 15 times P2 or P1 is 10 times P2 and/or (ii) P3 is 2 to 50 times P4, or P3 is 5 to 15 times P4 or P1 is 10 times P2. In embodiments, P2 and/or P4 is zero.

In an embodiment, (i) the first supplementary sensor comprises a temperature sensor configured to sense the temperature in the weight sensor unit and/or (ii) the second supplementary sensor comprises an accelerometer configured to sense the movement status or movement speed of the weight sensor unit.

In an embodiment, the first wireless signals received from the portable wireless device include an identifier of the portable wireless device or user thereof. In an embodiment, the processor is further configured to: extract the identifier from the first wireless signals; search a list of validated identifiers corresponding to users authorised to alter settings of weight sensor units; and if the multimode component is in the first state and if the first setting command is a command to set the state of the multimode component to the second state, permitting setting of the multimode component to operate in the second state only if a match is found between the extracted identifier and one of the identifiers in the list of validated identifiers.

In an embodiment, the transceiver is an NFC transceiver and/or the transmission device is a BLE transmitter.

In another embodiment of this disclosure, there is provided a dispensing unit, comprising: a container configured to receive or support the stock items; and a weight sensor unit configured to support, in use, the container, the weight sensor unit being in accordance with any of the embodiments of this disclosure.

In another embodiment of this disclosure, there is provided a portable wireless device for configuring a weight sensor unit, the weight sensor unit including a first transceiver and a multimode component configured for sensing or transmitting data, wherein the multimode component is configured to be operated in one of a first state and a second state, whereby power consumption by the multimode component is lower in the second state than in the first state. The portable wireless device may comprise: a memory configured for storage of programs and data; a display configured for displaying graphical data; an input device configured to receive user inputs; a second transceiver configured for wireless communication when placed in proximity to the first transceiver; and a processor, the memory, display, input device and transceiver being connected to the processor. The processor may be configured to: in response to the portable wireless device being tapped on or placed in proximity to the first transceiver, transmitting a first wireless signal using the second transceiver, the first wireless signal including a first setting command, the first setting command being a command to operate the multimode component of the weight sensor unit in the second state.

In an embodiment, the processor is further configured to: display, prior to the portable wireless device being tapped on or placed in proximity to the first transceiver, a setup screen, the setup screen including a first setting configuration graphical element and/or a second setting configuration graphical element; wherein the first setting configuration graphical element is configured to display a first plurality of user-selectable settings options including at least a first settings option corresponding to the first state and a second settings option corresponding to the second state; and wherein the second setting configuration graphical element is configured to display a second plurality of user-selectable settings options including at least a third settings option corresponding to the first state and a fourth settings option corresponding to the second state. In an embodiment, the first setting configuration graphical element corresponds to automatic read time of the weight sensor unit, the first settings option is a first periodicity T1 and the second settings option is a second periodicity T2, where T2 is greater than T1. In an embodiment, the processor is further configured to: receive user selection of the second settings option via the input device; construct a first message including (i) a first command to set an automatic read time of the weight sensor unit and (ii) to set the automatic read time to the second periodicity T2.

In an embodiment, the second setting configuration graphical element corresponds to a range of a transmitter of the weight sensor unit, the third settings option is a first range R1 and the fourth settings option is a second range R2, where R2 is less than R1. In an embodiment, the processor is further configured to: receive user selection of the fourth settings option via the input device; construct a first message including (i) a first command to set a range of the transmitter of the weight sensor unit and (ii) to set the range to the second range R2.

In an embodiment, the processor is further configured to: prior to displaying the setup screen, display a menu on the display, the menu including a first graphical element corresponding a settings change option; and in response to user selection of the first graphical element via the input device, displaying a settings change screen.

In an embodiment, the first wireless signal is transmitted in response to portable wireless device being tapped on or placed in proximity to the first transceiver for a second time, and the processor is further configured to: prior to displaying the setup screen, in response to the portable wireless device being tapped on or placed in proximity to the first transceiver for a first time, receive from the weight sensor unit via the first transceiver (i) a transceiver ID of the first transceiver, (ii) the current configuration settings of the weight sensor unit and optionally a device ID of the weight sensor unit. In an embodiment, the content of the setup screen (i) includes one or more of the current configuration settings and/or (ii) is dependent upon the transceiver ID and/or (ii) the device ID of the weight sensor unit. In an embodiment, the processor is further configured to incorporate the transceiver ID in the first wireless signal.

In an embodiment, the display is a touchscreen display and the input device comprises an overlay of the touchscreen display.

In another embodiment of this disclosure, there is provided a weight sensor unit, comprising: a weight sensor configured to output weight sensor readings indicative of the weight being supported by the weight sensor; a transmission device configured to transmit wireless signals; an optical sensor configured to output electrical signals in response to the receipt of optical signals; a processor, coupled to the weight sensor, optical sensor and the transmission device; and a battery, wherein at least the weight sensor, optical sensor, transmission device and processor are powered by the battery. The processor may be configured to: receive a first electrical signal from the optical sensor in response to the receipt thereby of a first optical signal; receive one or more weight sensor readings output by the weight sensor, and receive a second electrical signal from the optical sensor in response to the receipt thereby of a second optical signal; and only after receipt of the second electrical signal, transmit the one or more weight sensor readings wirelessly using the transmission device.

In an embodiment, the first optical signal is different to the second optical signal. In an embodiment, the first optical signal comprises a train of N1 optical pulses and the second optical signal comprises a train of N2 optical pulses, where N2 is not equal to N1. In an embodiment, (i) N2 is a×N1, where a is in the range 2-4, (ii) N1 is b×N2, where b is in the range 2-4 or (iii) or N1 is 2 and N2 is 4.

In embodiments, (i) the optical sensor is an infrared (IR) photodetector or (ii) an IR photodiode and/or (iii) the first optical signal and/or second optical signal is an IR optical signal. In an embodiment, the transmission device is configured to be operated in one of at least a first state in which the transmission device consumes power P1, and in a second state, in which the transmission device consumes power P2, wherein P2 is greater than P1. In embodiments, the processor is configured to switch the transmission device from the first state to the second state only after only after receipt (i) of the door open signal and/or (ii) the door close signal after the door open signal. In an embodiment, in the first state the transmission device is in deactivated mode, and in the second state the transmission device is in activated mode whereby it is able to transmit the wireless signals. In embodiments, (i) P1 is 2 to 50 times P2, or P1 is 5 to 15 times P2 or P1 is 10 times P2 and/or (ii) P3 is 2 to 50 times P4, or P3 is 5 to 15 times P4 or P1 is 10 times P2. In an embodiment, P1 is zero.

In an embodiment, after the door close signal and until the next door open signal the processor is configured not to poll the weight sensor for a weight sensor reading and/or not to transmit the one or more weight sensor readings using the transmission device.

In an embodiment, the processor is configured to transmit the wireless signals using the transmission device at a given time at a settable signal strength S, corresponding to a range R of signal reception.

In an embodiment, the transmission device is configured to transmit wireless signals with a signal power sufficient to reach a wireless gateway or a wireless access point. In embodiments, (i) the signal strength S corresponds to a range R of signal reception lying in the range of (i) 1 to 500 m, (ii) 50 to 500 m, (iii) 50 to 400 m or (iv) 100 to 400 m.

In embodiments, (i) the transmission device is a Bluetooth Low Energy (BLE) transmitter, and the wireless signals are BLE signals or (ii) the transmission device is an ultra-wide band (UWB) transmitter, and the wireless signals are UWB signals.

In an embodiment, after the door open signal and until the next door close signal the processor is configured to repeatedly poll the weight sensor to obtain a weight sensor reading, and to average the weight sensor reading obtained over a predetermined period lying within or contemporaneous with the period between the door open signal and until the next door close signal. In embodiments, the processor is configured to: poll the weight sensor to obtain a weight sensor reading in response to receipt of the door open signal; and/or poll the weight sensor to obtain a weight sensor reading in response to receipt of the door close signal; and/or average weight sensor readings in a period commencing at a time point a first predetermined delay period after the door open signal and/or ending at the next door close signal.

In an embodiment, the weight sensor unit further comprises a wireless transceiver configured to wirelessly interact with devices placed in proximity thereto. In an embodiment, the transceiver comprises a NFC transceiver In an embodiment, all electronic components of the weight sensor unit are powered by the battery.

In another embodiment of this disclosure, there is provided a dispensing unit for dispensing stock items, the dispensing unit comprising: a container configured to receive or support the stock items; and a weight sensor unit configured to support, in use, the container, the weight sensor unit being in accordance with any of the embodiments of this disclosure.

In another embodiment of this disclosure, there is provided a dispensing enclosure, the dispensing enclosure comprising: a housing; one or more shelves mounted internally within the housing; one or more dispensing units in accordance with any of the embodiments of this disclosure, or one or more weight sensor units in accordance with any of the embodiments of this disclosure, disposed on one or more of the shelves; a door mounted on the housing, whereby the door is openable and closable by a user; a door sensor configured to output a door open signal in the event of the door transitioning from closed to open and a door close signal in the event of the door transitioning from open to closed; an optical transmitter configured to transmit optical signals; and a controller, the controller being connected to the door sensor and to the optical transmitter. The controller may be configured to receive the door open signal; in response to the door open signal, transmit a first optical signal using the optical transmitter; receive the door close signal; in response to the door close signal, transmit a second optical signal using the optical transmitter.

In an embodiment, the first optical signal is different to the second optical signal. In an embodiment, the first optical signal comprises a train of N1 optical pulses and the second optical signal comprises a train of N2 optical pulses, where N2 is not equal to N1. In embodiments, (i) N2 is a×N1, where a is in the range 2-4, (ii) N1 is b×N2, where b is in the range 2-4 or (iii) or N1 is 2 and N2 is 4.

In embodiments, (i) the optical transmitter is an infrared (IR) light emitter or (ii) an IR LED and/or (iii) the first optical signal and/or second optical signal is an IR optical signal.

In an embodiment, the door is a glazed door incorporating a transparent pane.

In an embodiment, the door is a solid and/or non-transparent door. In an embodiment, the second electrical signal is a zero level signal corresponding to an absence of an optical signal.

In an embodiment, the controller has a secondary power source, whereby the controller is configured to cause the emission of the first optical signal and/or the second optical signal using the optical transmitter in the absence of power from a mains power source. In an embodiment, the secondary power source is a battery.

In an embodiment, the controller comprises a wireless gateway.

In an embodiment, the controller includes or is connected to a first wireless receiver or first wireless transceiver; wherein the controller is configured to receive weight sensor readings received wirelessly via the first wireless receiver or first wireless transceiver.

In an embodiment, the first wireless receiver or first wireless transceiver is a Bluetooth Low Energy (BLE) receiver or transceiver, respectively, and the wireless signals are BLE signals.

In an embodiment, the controller includes or is connected to a cellular transceiver or wired network transceiver, and the controller transmit one or more weight reporting messages via the cellular transceiver or wired network transceiver, the one or more weight reporting messages including the weight sensor readings.

In another embodiment of this disclosure, there is provided a dispensing system, for dispensing stock items, the dispensing system comprising a weight sensor unit, a portable wireless device and a central control computer configured for communication with the weight sensor unit and the portable wireless device via a network. The weight sensor unit may comprise: a weight sensor configured to output weight sensor readings indicative of the weight of the container; a first transceiver, configured to wirelessly interact with devices placed in proximity thereto; and a first processor, coupled to the weight sensor and the first transceiver; and optionally a battery, wherein the weight sensor, transceiver and processor are powered by the battery. The portable wireless device may comprise: a first memory configured for storage of programs and data; a display configured for displaying graphical data; an input device configured to receive user inputs; an output device configured to output visual or audible alerts; a second transceiver configured for wireless communication with the first transceiver when placed in proximity thereto by a user of the portable wireless device; and a second processor, the first memory, display, input device and transceiver being connected to the second processor. The central control computer may comprise: a second memory configured for storage of programs and data; and a third processor connected to the second memory. The first processor may be configured to: in response to a portable wireless device being tapped or placed in proximity to the first transceiver for a first time, transmit a first transceiver ID of the first transceiver; receive a service command using the first transceiver, the service command having a service command type; receive a weight sensor reading output by the weight sensor during a first predetermined period after receipt of the service command; and transmit a weight reading reporting message to the central control computer via the network, the weight reading reporting message including (i) a weight sensor unit ID, (ii) the weight sensor reading, (iii) the time and date of taking the weight sensor reading and optionally (iii) a status relating to the service command type. The second processor may be configured to: receive a service command input by the user via the input device, the service command being one of a plurality of service command types; and in response to a portable wireless device being tapped or placed in proximity to the first transceiver, receive a first transceiver ID of the first transceiver; transmit the service command using the second transceiver; and transmit a service command reporting message to the central control computer via the network, the service command reporting message including (i) the service command type of the service command, (ii) the time and date of transmission of the service command to the weight sensor unit and (iii) first transceiver ID or a location associated with the first transceiver ID. The third processor may be configured to: receive the service command reporting message; extract (i) the service command type, (ii) the time and date of transmission of the service command to the weight sensor unit and (iii) first transceiver ID or a location associated with the first transceiver ID from the service command reporting message; receive the weight reading reporting message; extract (i) a weight sensor unit ID, (ii) the weight sensor reading, (iii) the time and date of taking the weight sensor reading and optionally (iii) a status relating to the service command type from the weight reading reporting message. The third processor may be configured to: if the time and date of taking the weight sensor reading extracted from the weight reading reporting message matches the time and date of transmission extracted from the service command reporting message, store, in association with the weight sensor unit ID, (i) the weight sensor reading and (ii) a status indicator indicating service completed for the service command type.

In another embodiment of this disclosure, there is provided a weight sensor unit for use in the dispensing system of claim 1, the weight sensor unit comprising: a weight sensor configured to output weight sensor readings indicative of the weight of the container; a first transceiver, configured to wirelessly interact with devices placed in proximity thereto; and a first processor, coupled to the weight sensor and the first transceiver; and optionally a battery, wherein the weight sensor, transceiver and processor are powered by the battery. The first processor may be configured to: in response to a portable wireless device being tapped or placed in proximity to the first transceiver, transmit a first transceiver ID of the first transceiver; receive the service command using the first transceiver, the service command having a service command type; receive a weight sensor reading output by the weight sensor during a first predetermined period after receipt of the service command; and transmit a weight reading reporting message to the central control computer via the network, the weight reading reporting message including (i) a weight sensor unit ID, (ii) the weight sensor reading, (iii) the time and date of taking the weight sensor reading and optionally (iii) a status relating to the service command type.

In an embodiment, the weight sensor unit ID is unique to the weight sensor unit.

In another embodiment of this disclosure, there is provided a dispensing unit for use in the dispensing system of any of the preceding claims, the dispensing unit comprising: a container configured to receive or support the stock items; and a weight sensor unit configured to support, in use, the container, the weight sensor unit being in accordance any of the embodiments of this disclosure.

In another embodiment of this disclosure, there is provided a portable wireless device for use in the dispensing system in accordance any of the embodiments of this disclosure, the portable wireless device comprising: a first memory configured for storage of programs and data; a display configured for displaying graphical data; an input device configured to receive user inputs; an output device configured to output visual or audible alerts; a second transceiver configured for wireless communication with the first transceiver when placed in proximity thereto by a user of the portable wireless device; and a second processor, the first memory, display, input device and transceiver being connected to the second processor. The second processor may be configured to: receive a service command input by the user via the input device, the service command being one of a plurality of service command types; and in response to a portable wireless device being tapped or placed in proximity to the first transceiver, receive a first transceiver ID of the first transceiver; transmit the service command using the second transceiver; and transmit a service command reporting message to the central control computer via the network, the service command reporting message including (i) the service command type of the service command, (ii) the time and date of transmission of the service command to the weight sensor unit and (iii) first transceiver ID or a location associated with the first transceiver ID.

In an embodiment, the second processor is configured to: display service menu screen, the service menu screen including one or more service graphical elements, each service graphical element corresponding to a different service command type. In an embodiment, the second processor is configured to: receive a user selection of one of the service graphical elements; and in response to the user selection of the one service graphical element, display a prompt screen, the prompt screen including a message directing the user to scan the first transceiver with the second transceiver. In an embodiment, the second processor is configured to: in response to a portable wireless device being tapped or placed in proximity to the first transceiver, display a service complete screen, the service complete screen including a message indicating that the service corresponding to the selected one service graphical element has been completed.

In an embodiment, the service command input by the user is a zero command, the service command type is zeroing, and the status relating to the service command type is zeroing completed. In an embodiment, the service command input by the user is a calibrate command, the service command type is calibrating, and the status relating to the service command type is calibration completed. In an embodiment, the service command input by the user is a tare command, the service command type is taring, and the status relating to the service command type is tare completed.

In another embodiment of this disclosure, there is provided a central control computer for use in the dispensing system in accordance any of the embodiments of this disclosure, the central control computer comprising: a second memory configured for storage of programs and data; and a third processor connected to the second memory. The third processor may be configured to: receive the service command reporting message; extract (i) the service command type, (ii) the time and date of transmission of the service command to the weight sensor unit and (iii) first transceiver ID or a location associated with the first transceiver ID from the service command reporting message; receive the weight reading reporting message; extract (i) a weight sensor unit ID, (ii) the weight sensor reading, (iii) the time and date of taking the weight sensor reading and optionally (iii) a status relating to the service command type from the weight reading reporting message; and if the time and date of taking the weight sensor reading extracted from the weight reading reporting message matches the time and date of transmission extracted from the service command reporting message, store, in association with the weight sensor unit ID, (i) the weight sensor reading and (ii) a status indicator indicating service completed for the service command type.

Embodiments of the invention will now be described in detail, by way of example, with reference to the accompanying drawings, in which:

BRIEF DESCIPTION OF THE DRAWINGS

FIG. 2 shows one of the dispensing stations 106a of FIG. 1, according to an embodiment;

FIG. 3 is a block diagram of the internal electronics of one of the weight sensor units 122a of FIG. 1, in an embodiment;

Figure 5:
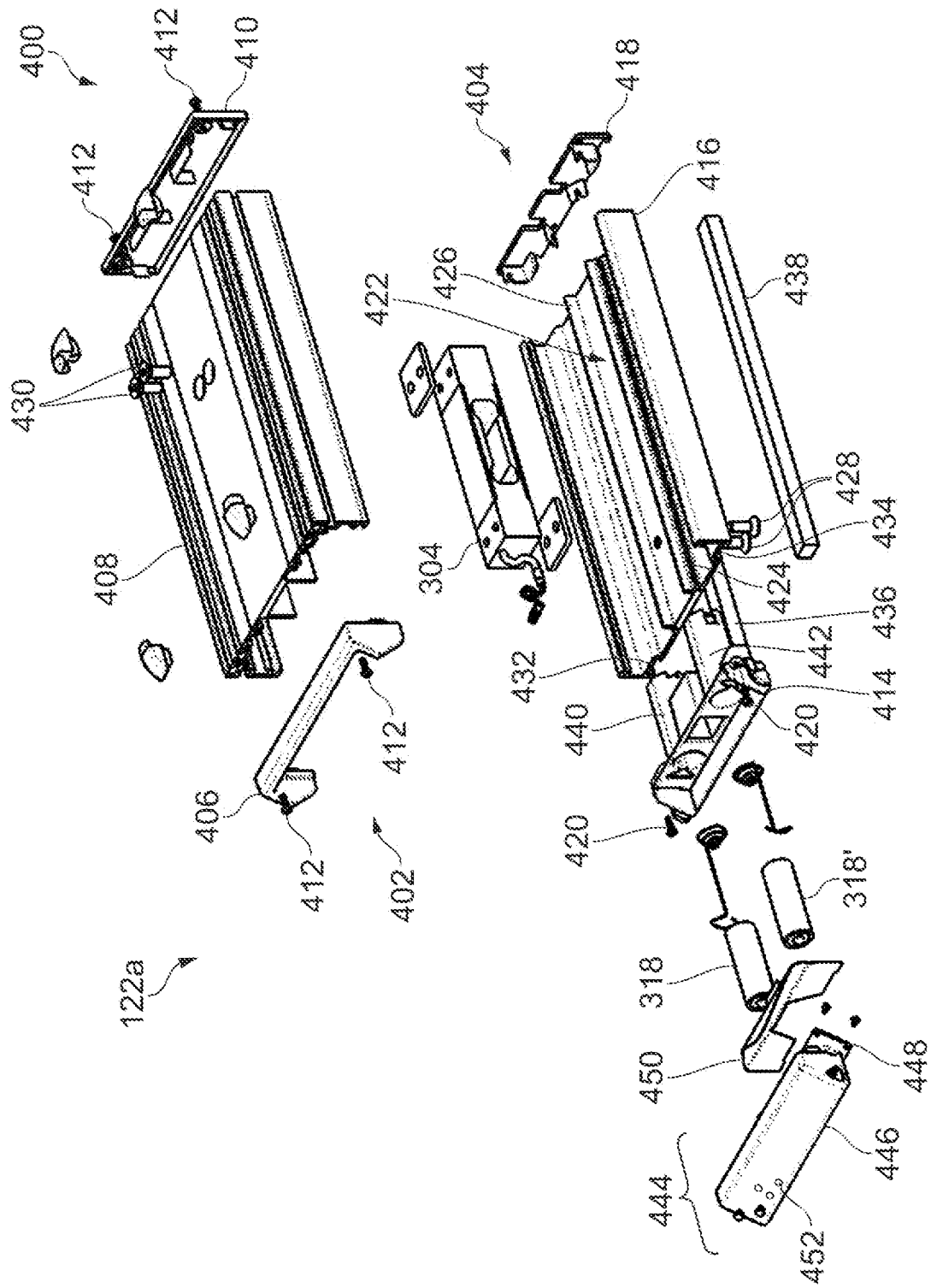
Figure 6:
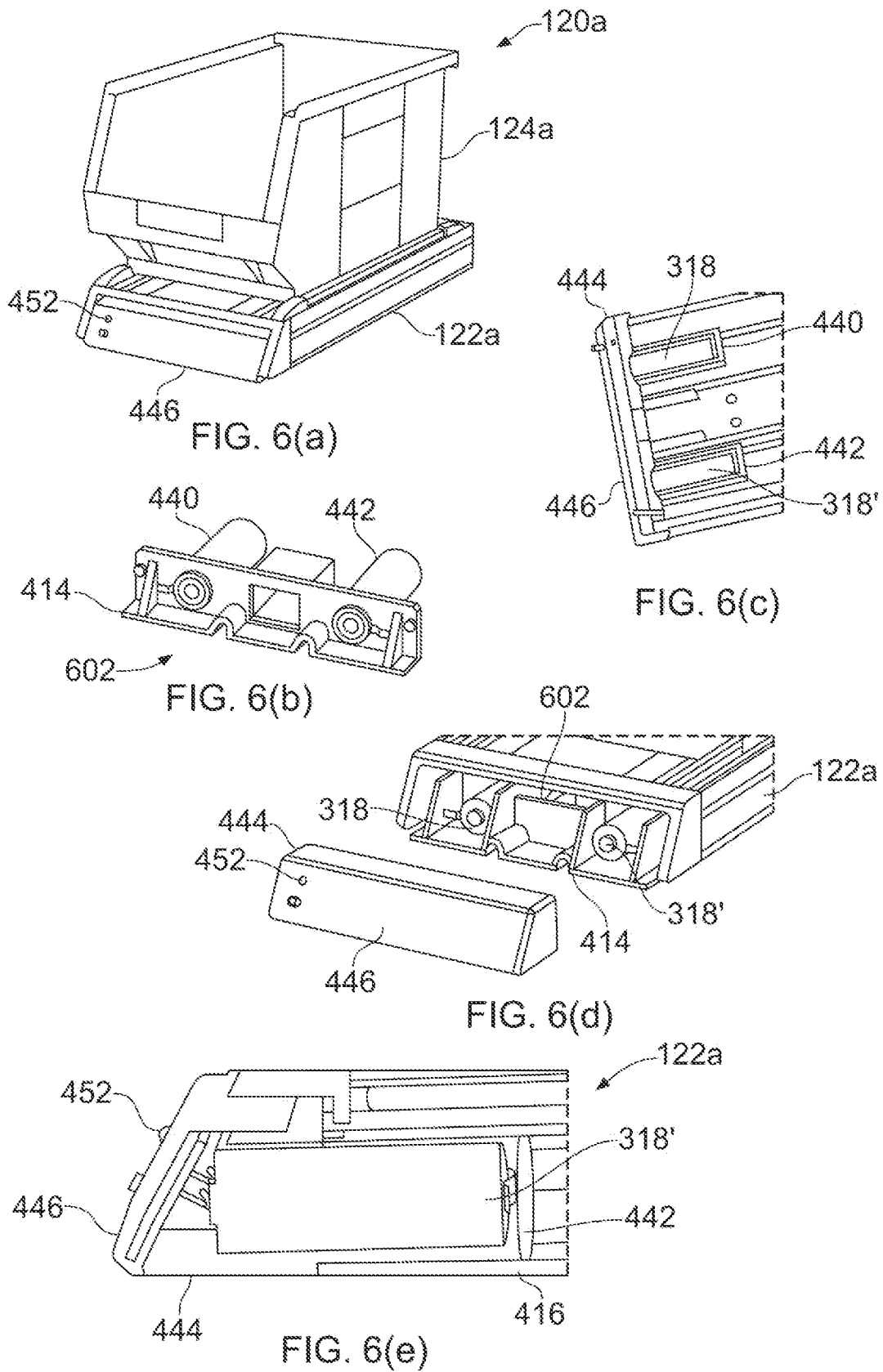
Figure 7:
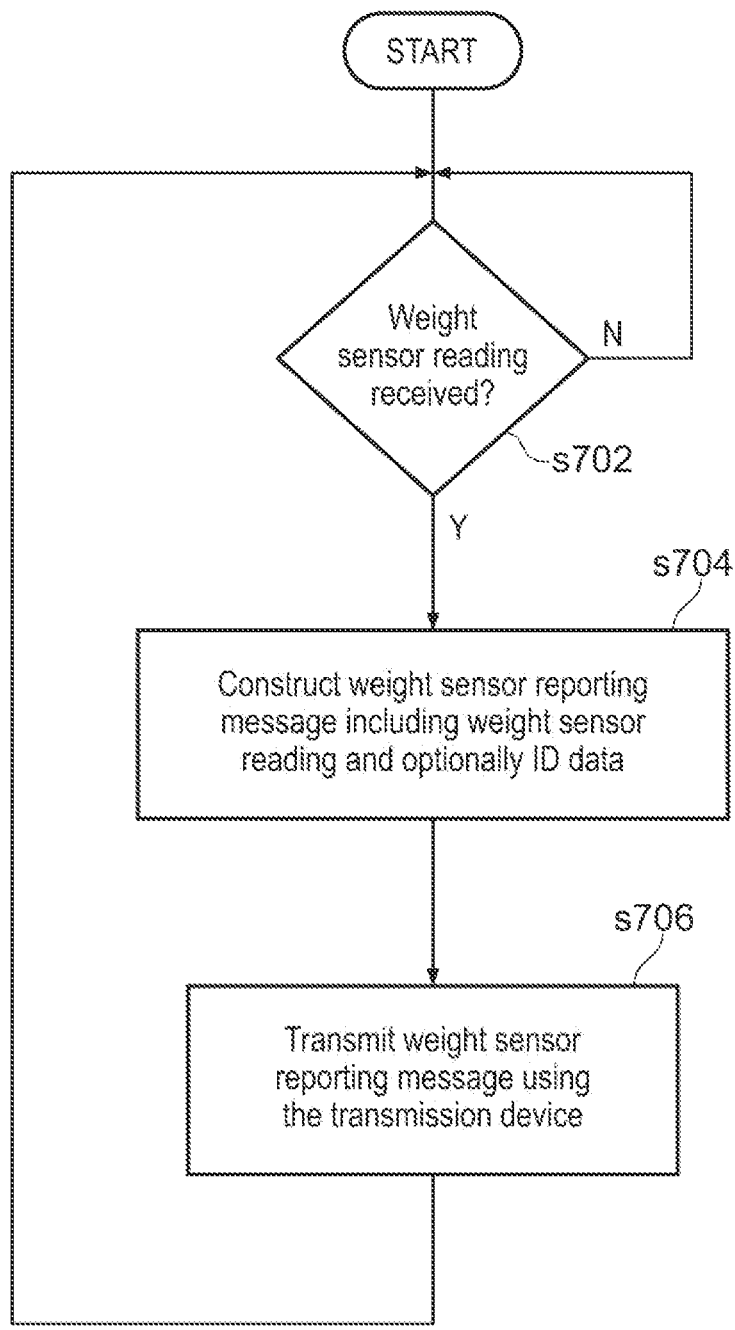
Figure 9A:
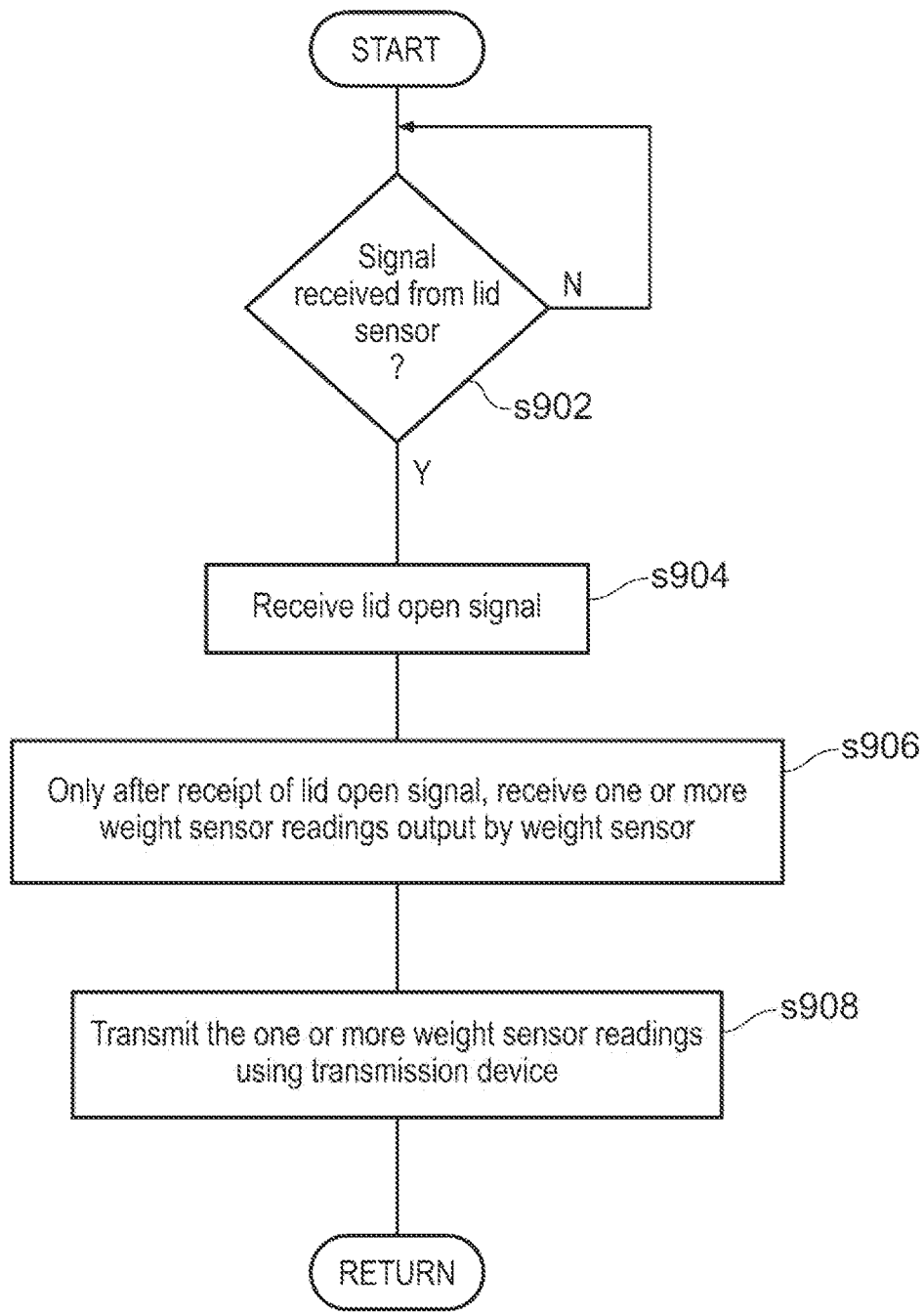
Figure 9B:
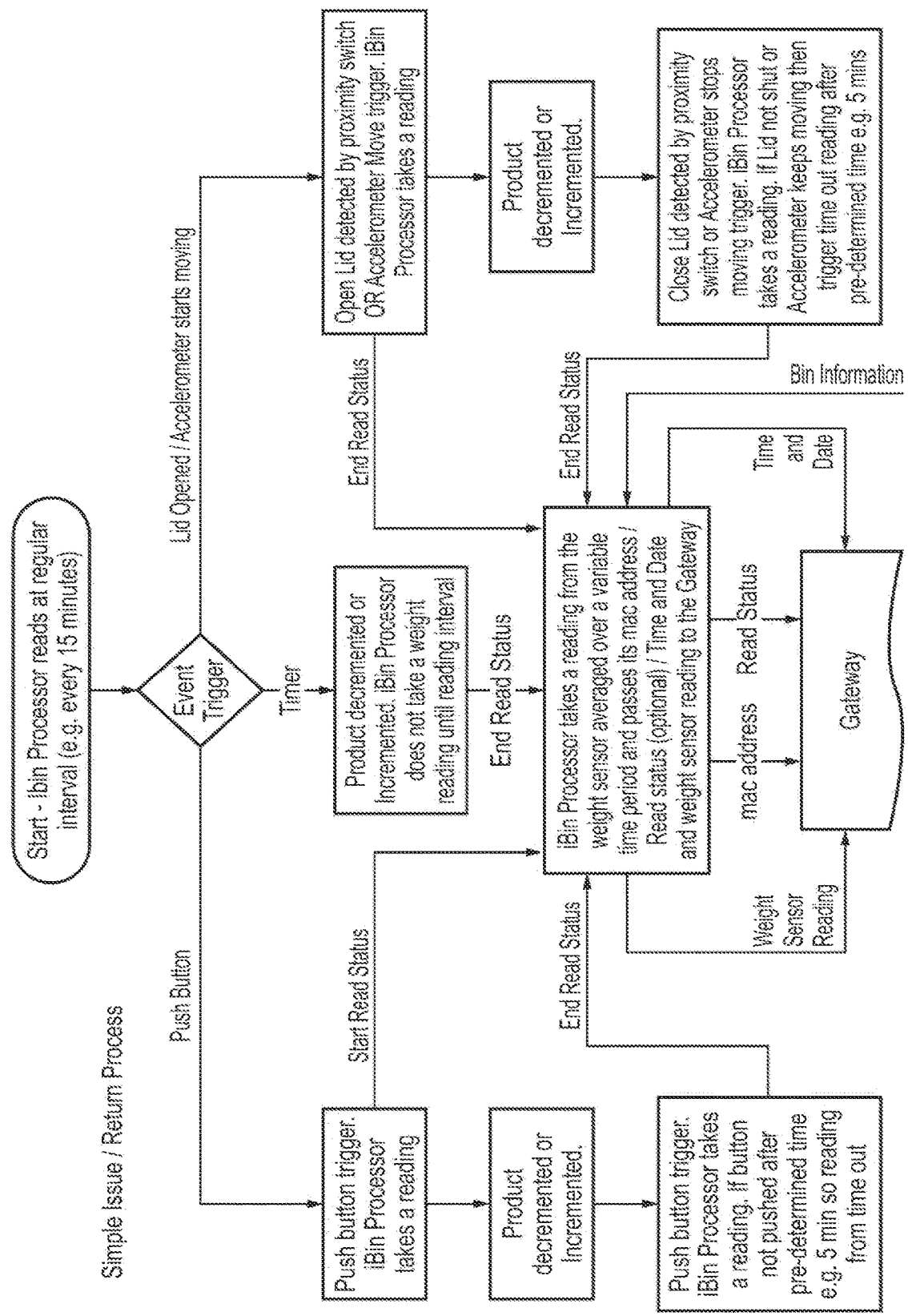
Figure 9B:
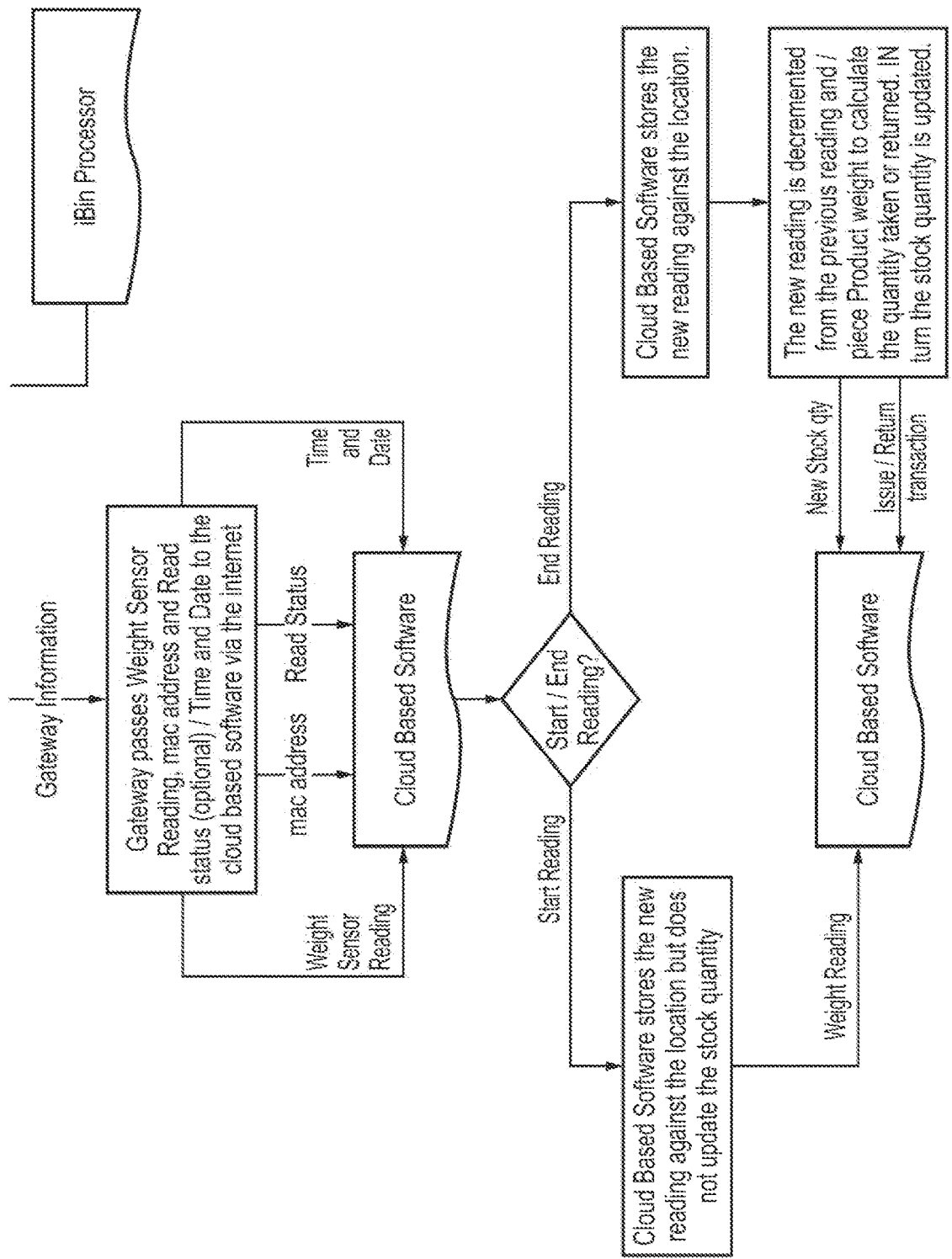
Figure 9C:
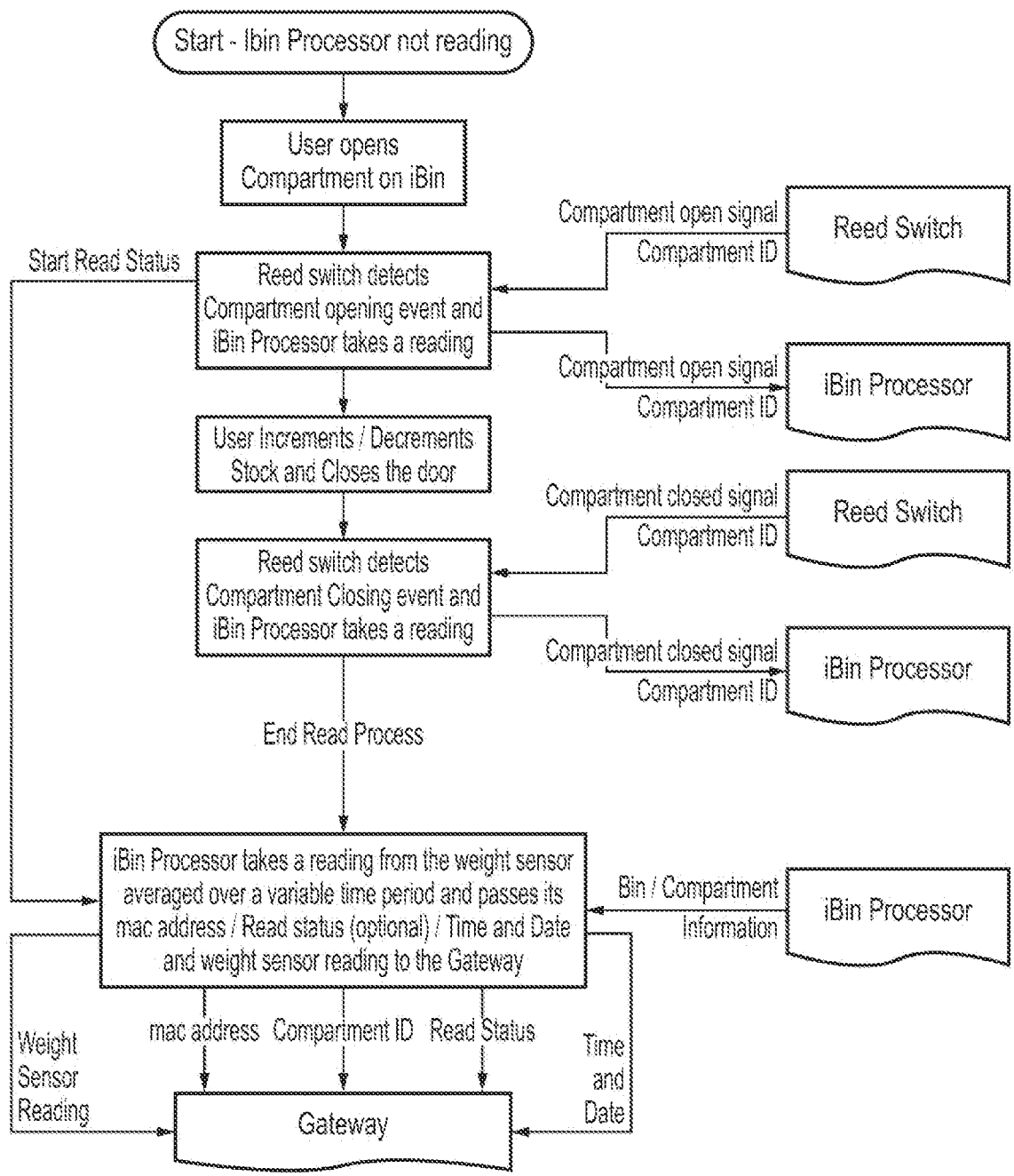
Figure 9C:
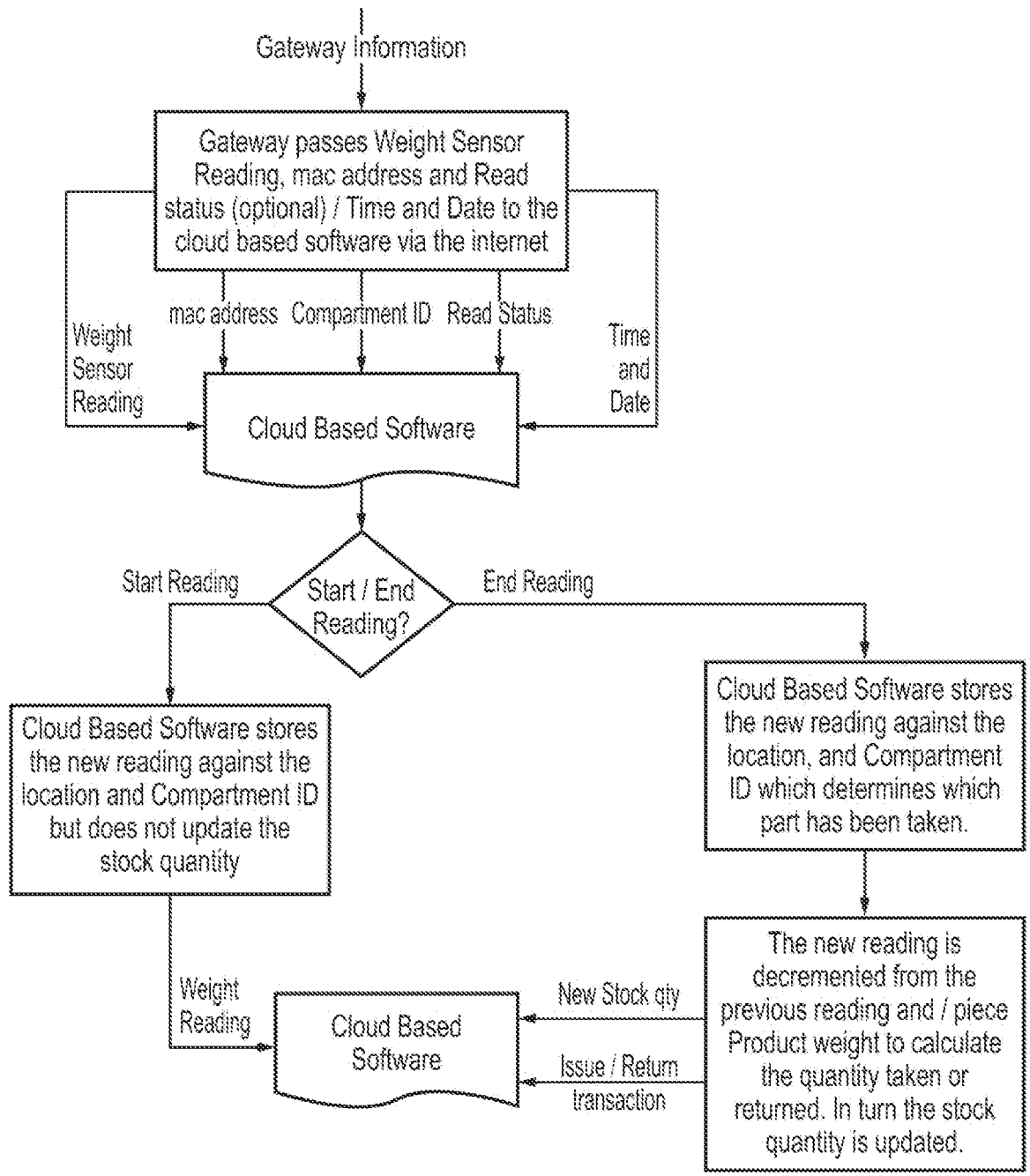
Figure 10A:
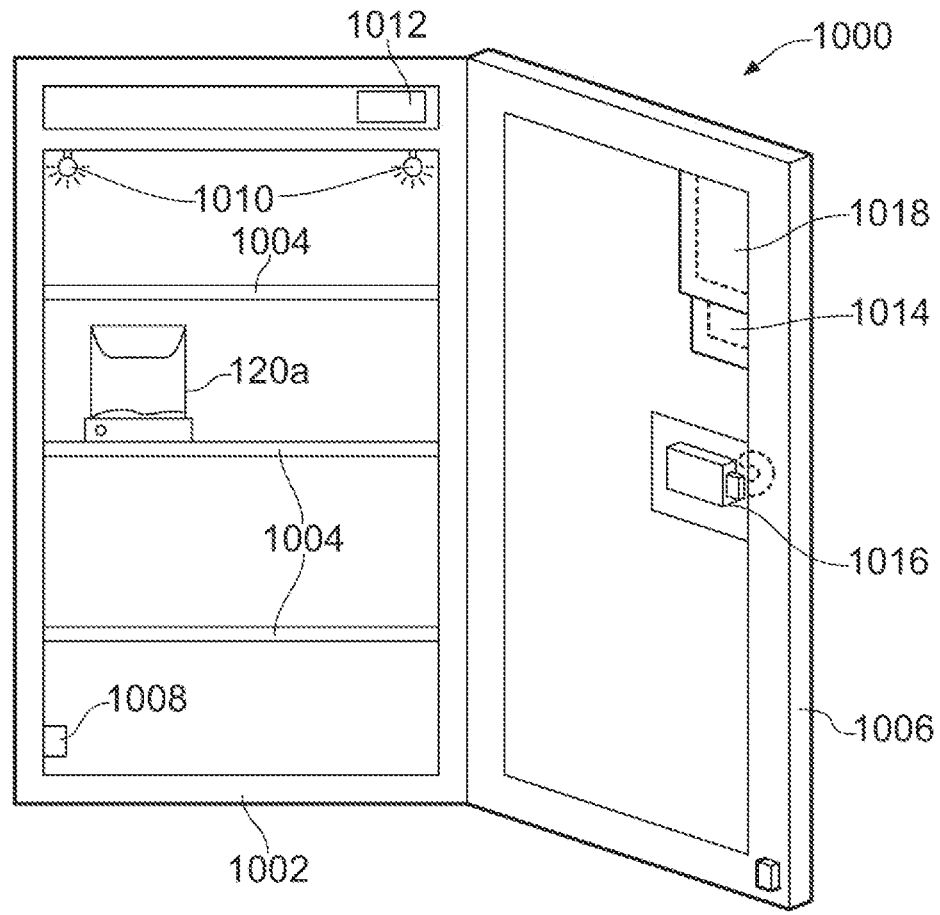
Figure 10B:
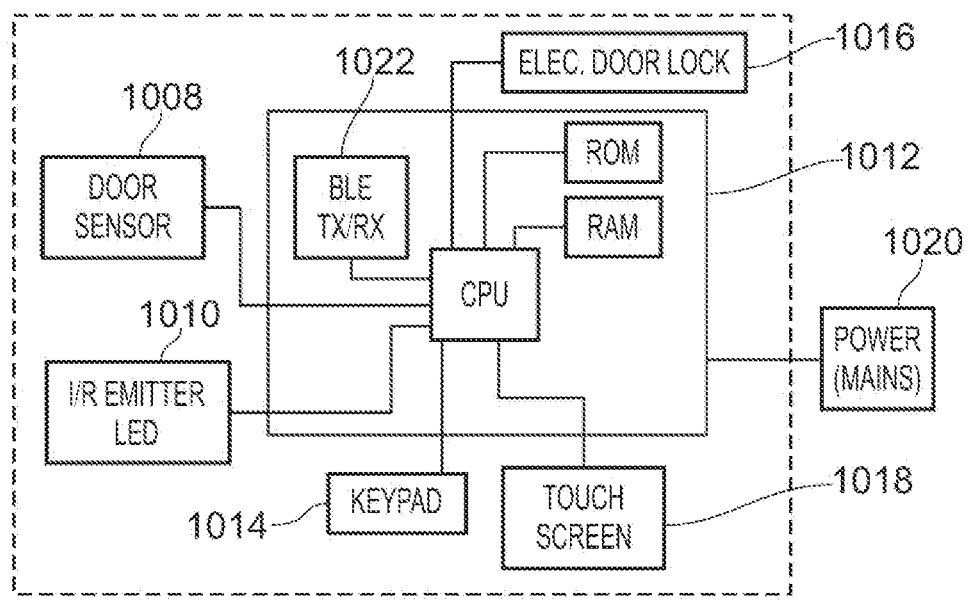
Figure 11A:
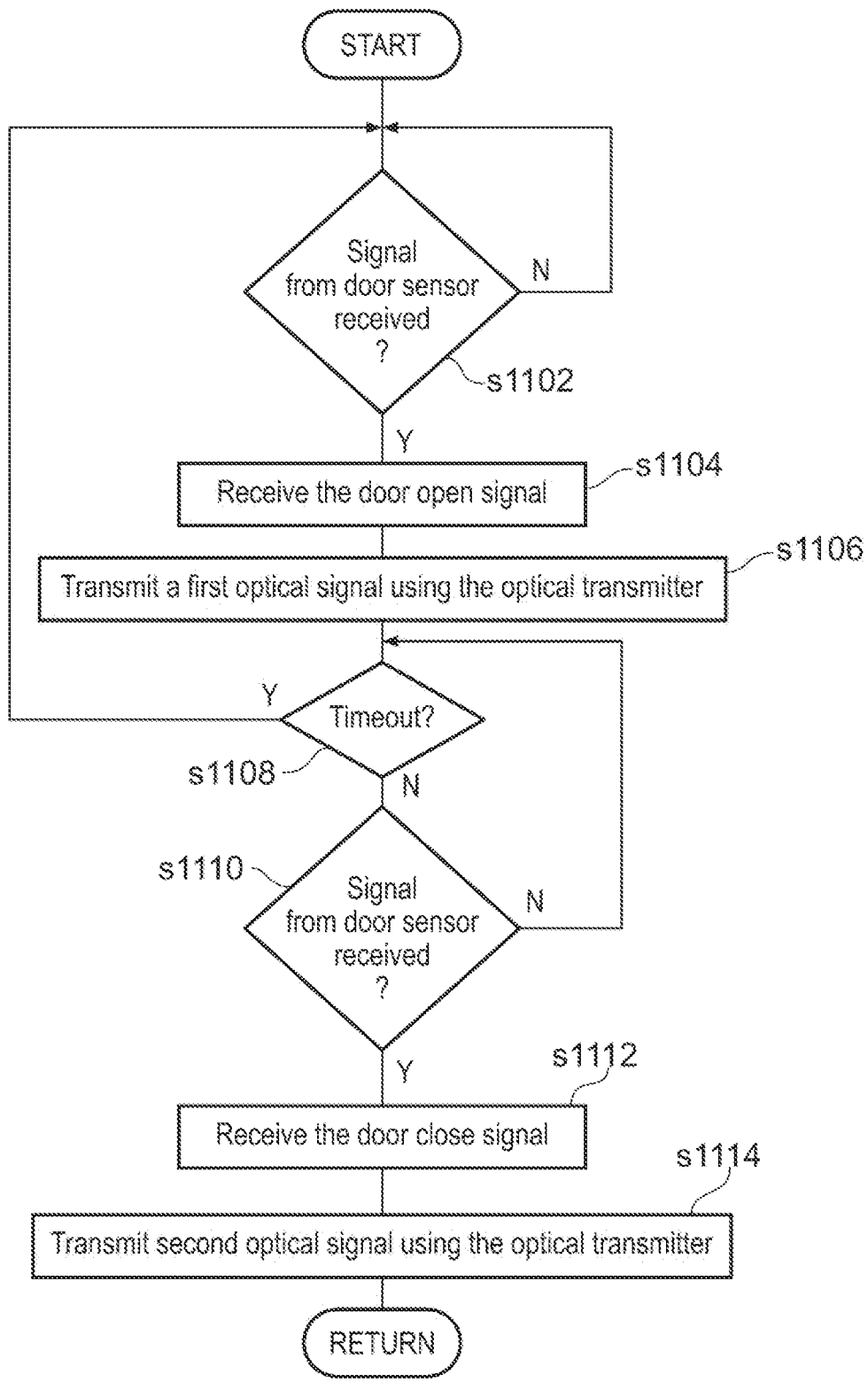
Figure 11B:
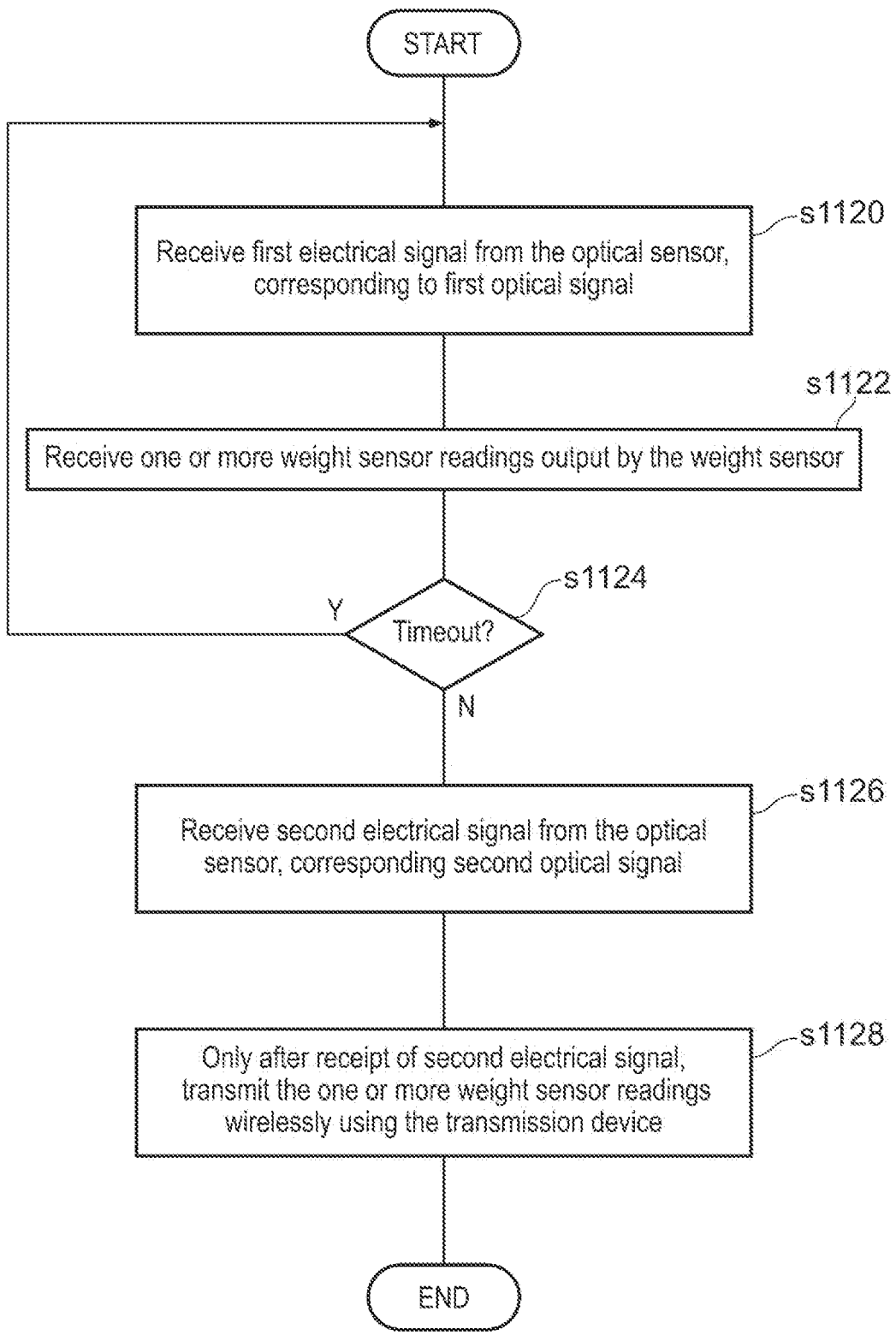
Figure 11C:
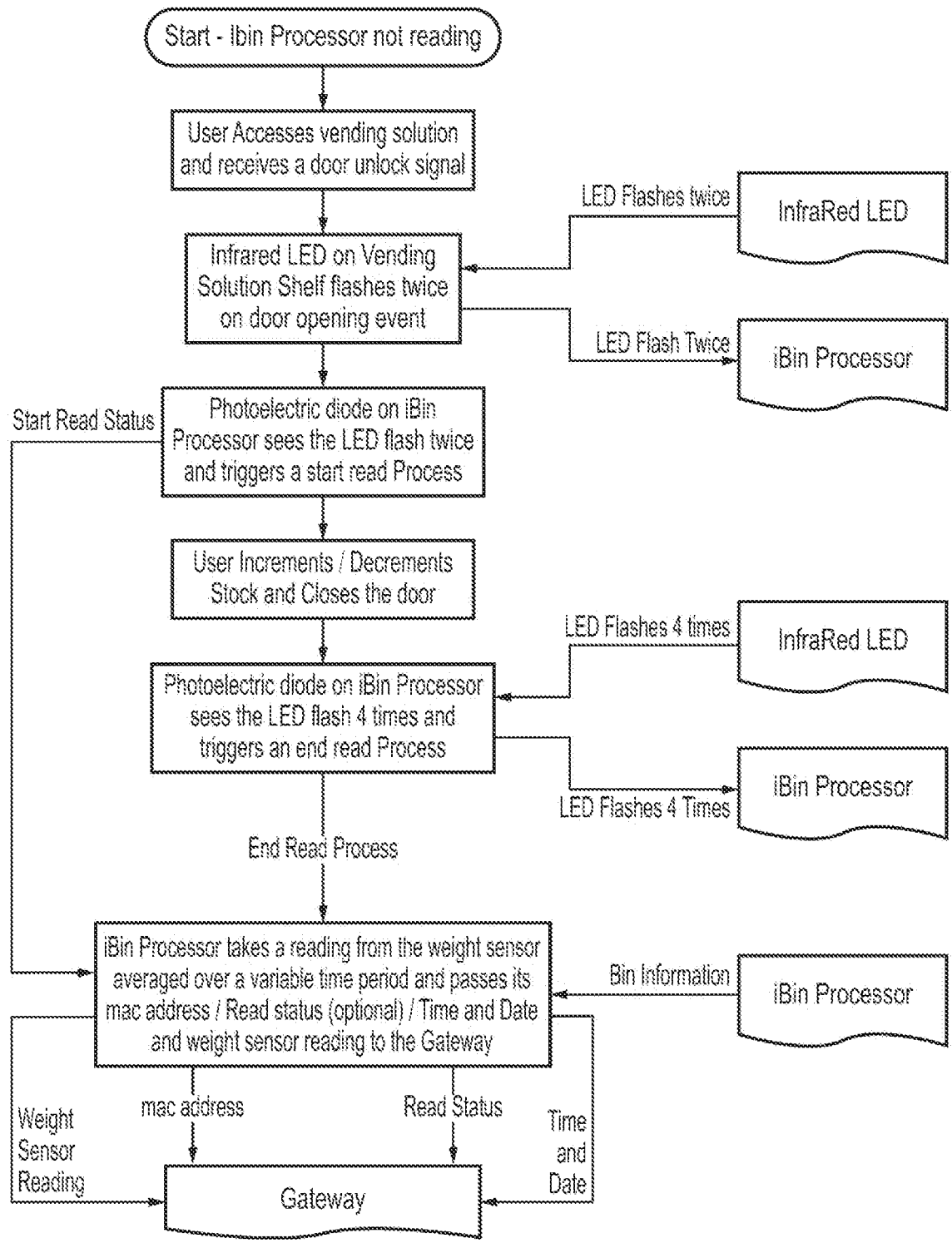
Figure 11C:
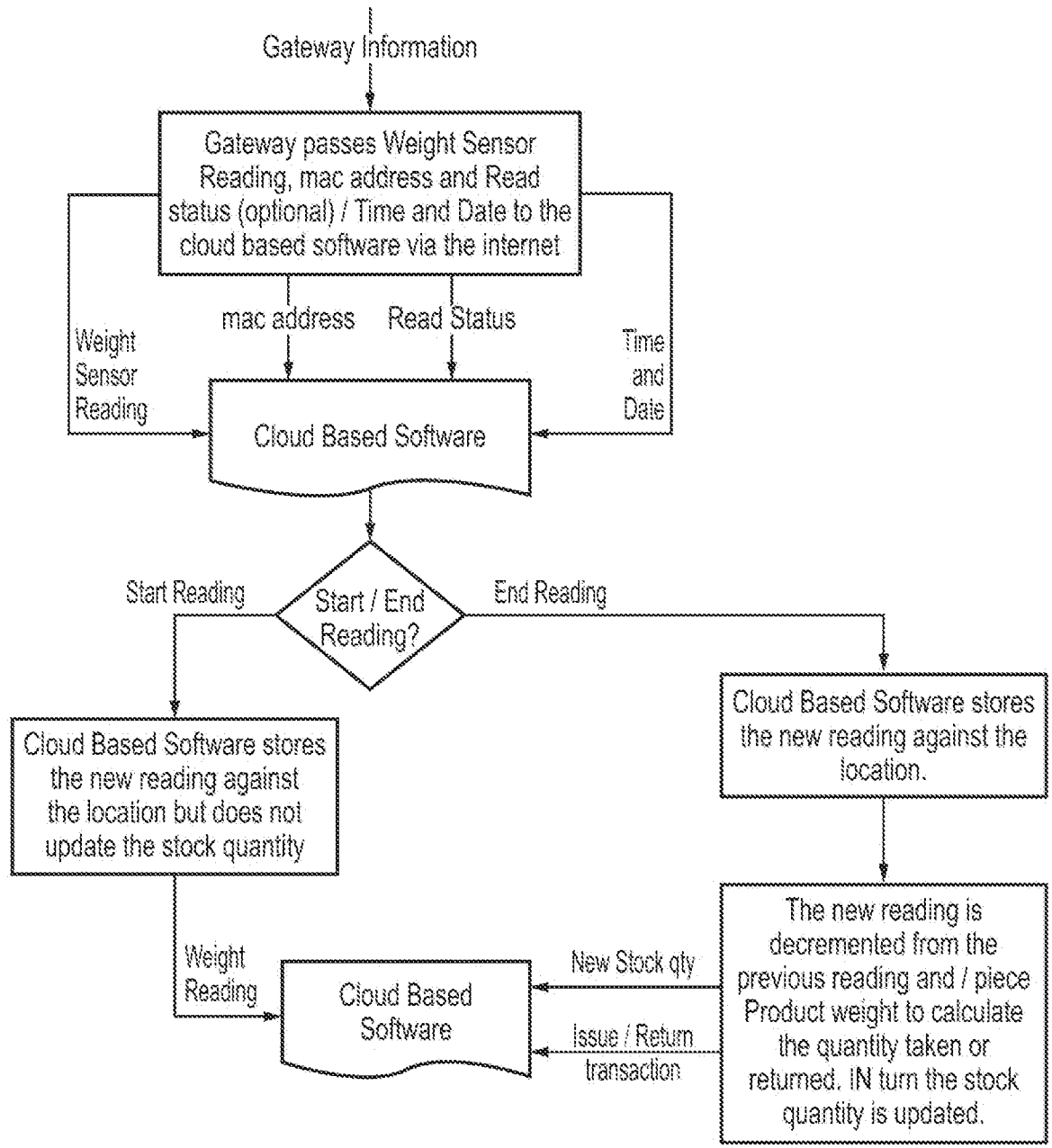
Figure 12:
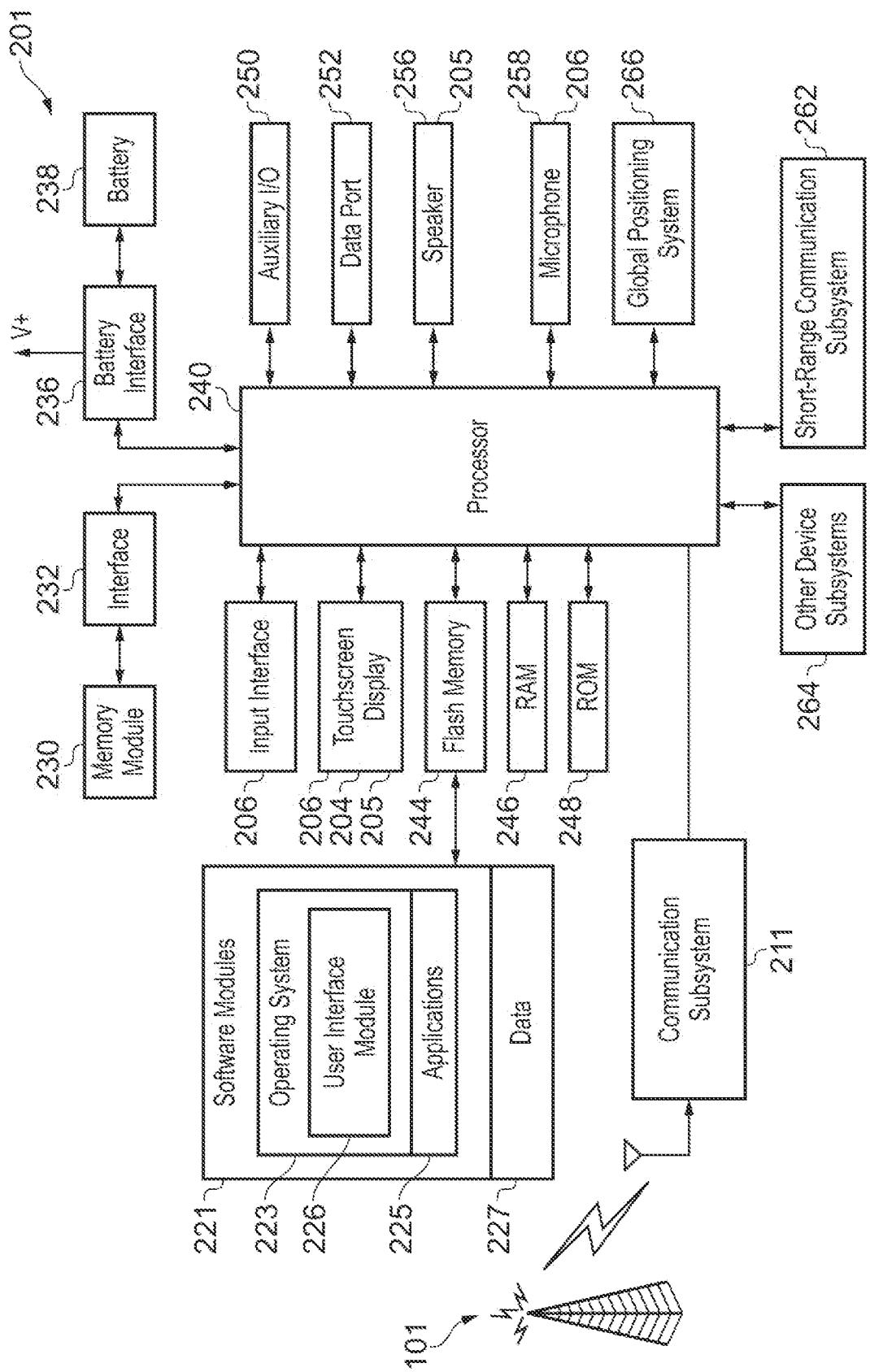
Figure 13A:
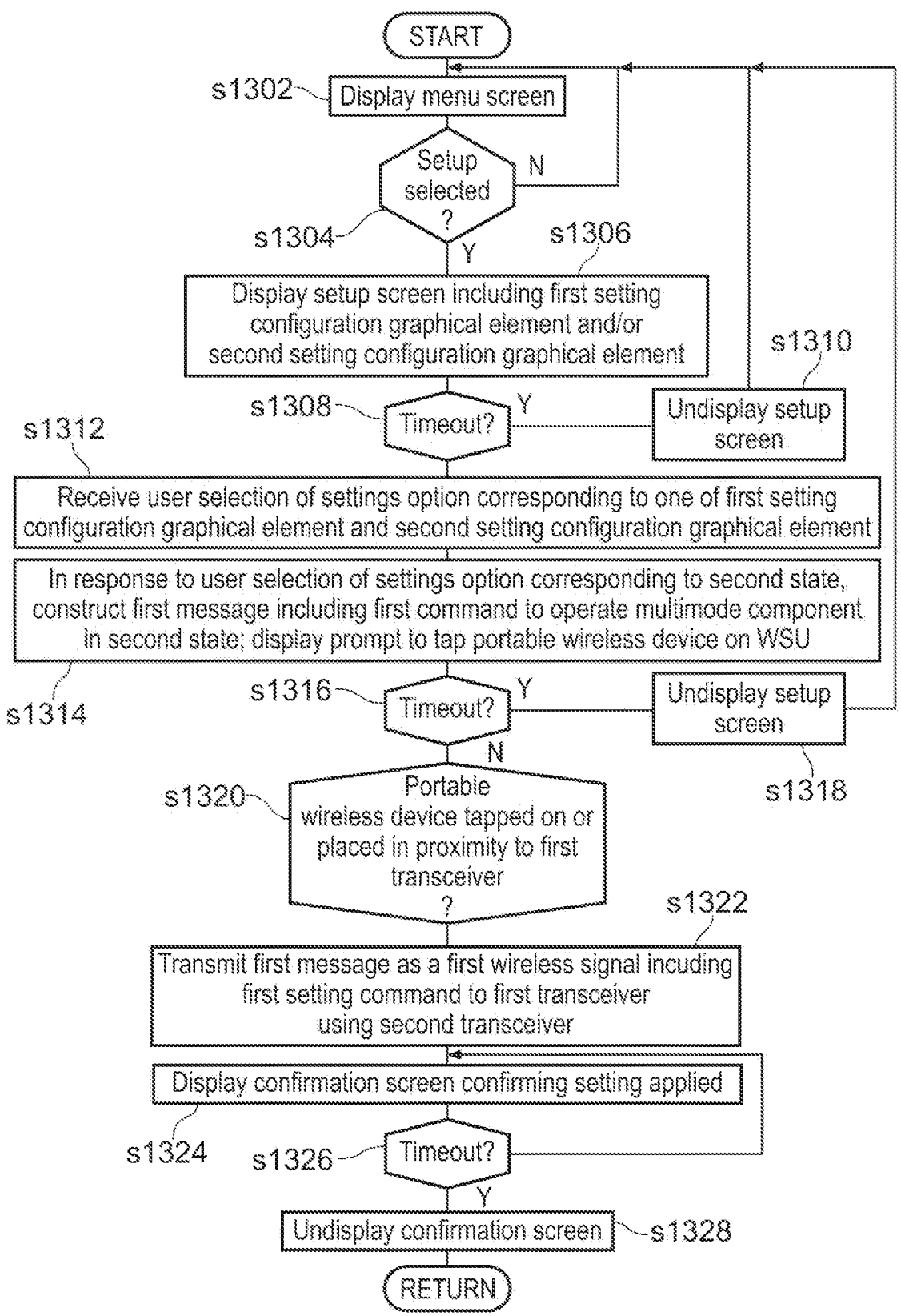
Figure 13B:
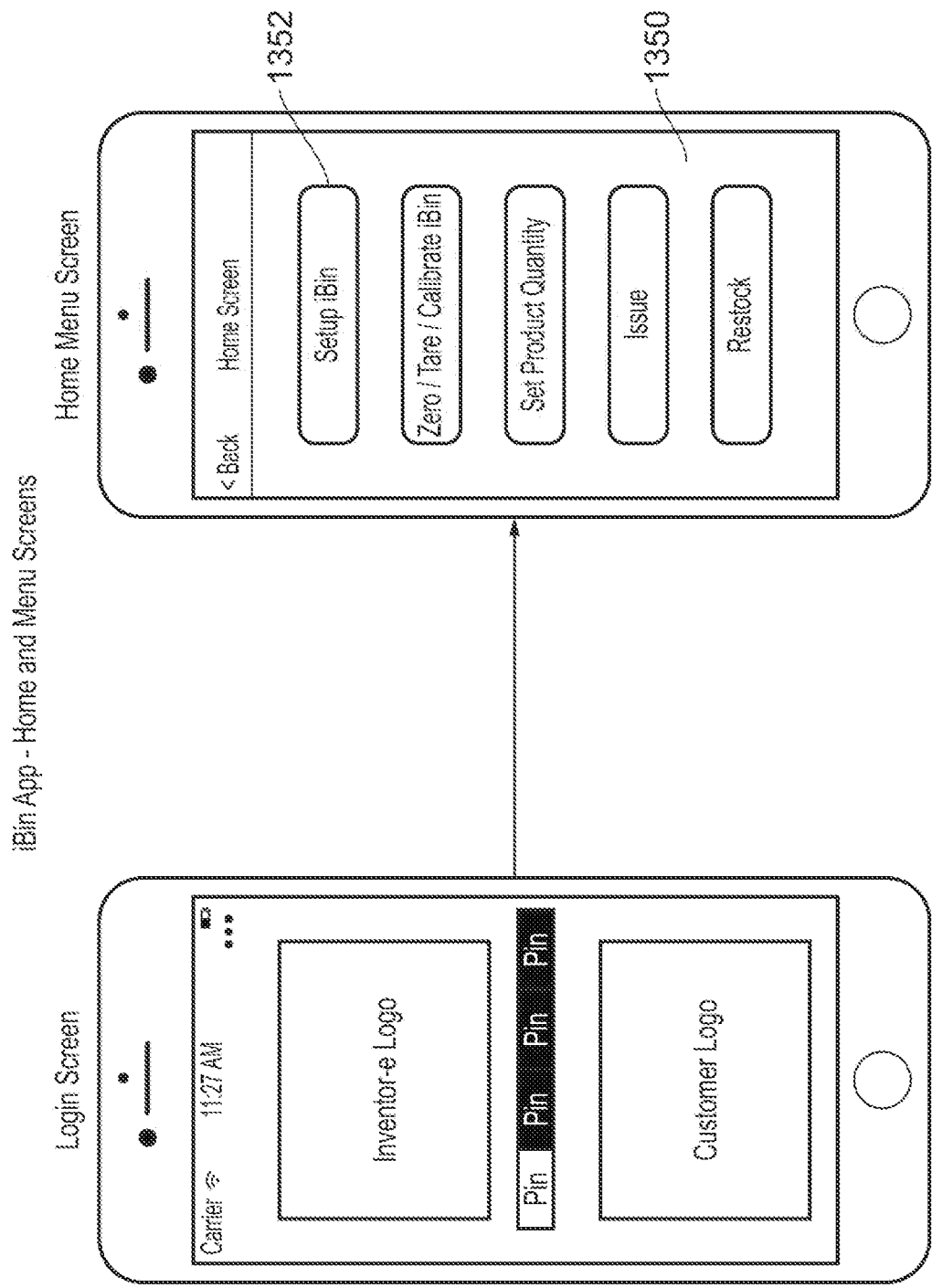
Figure 13C:
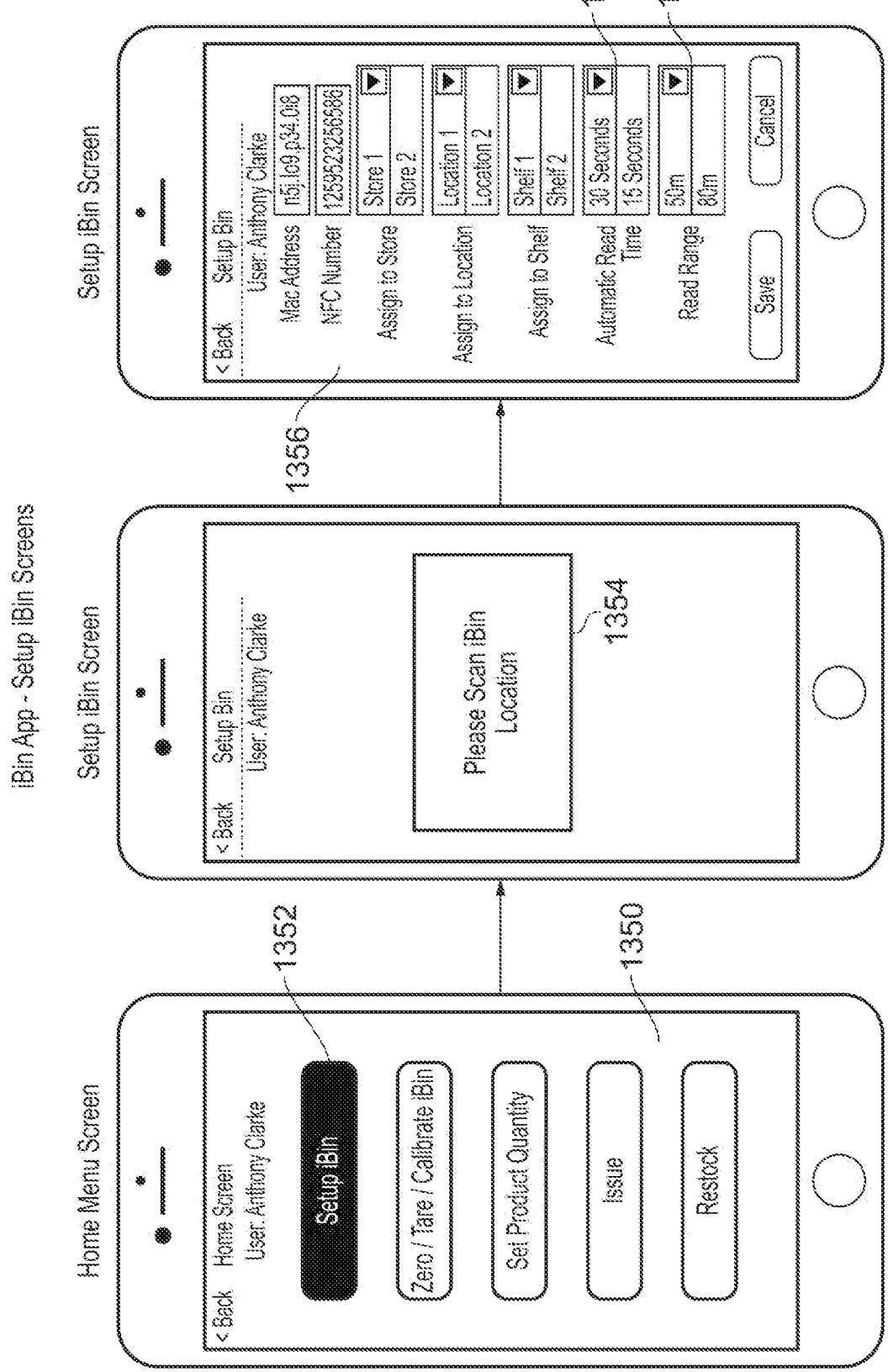
Figure 13C:
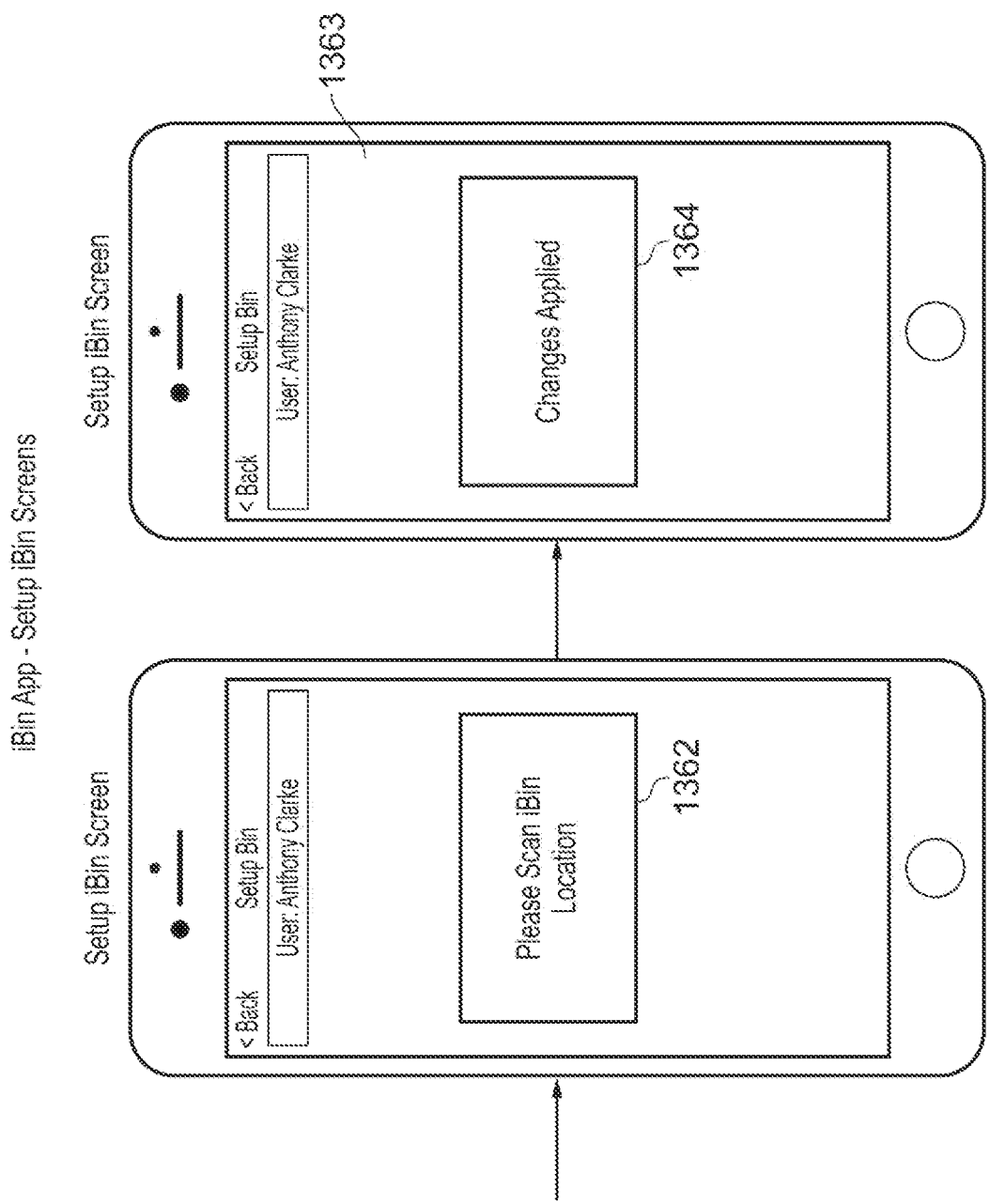
Figure 13D:
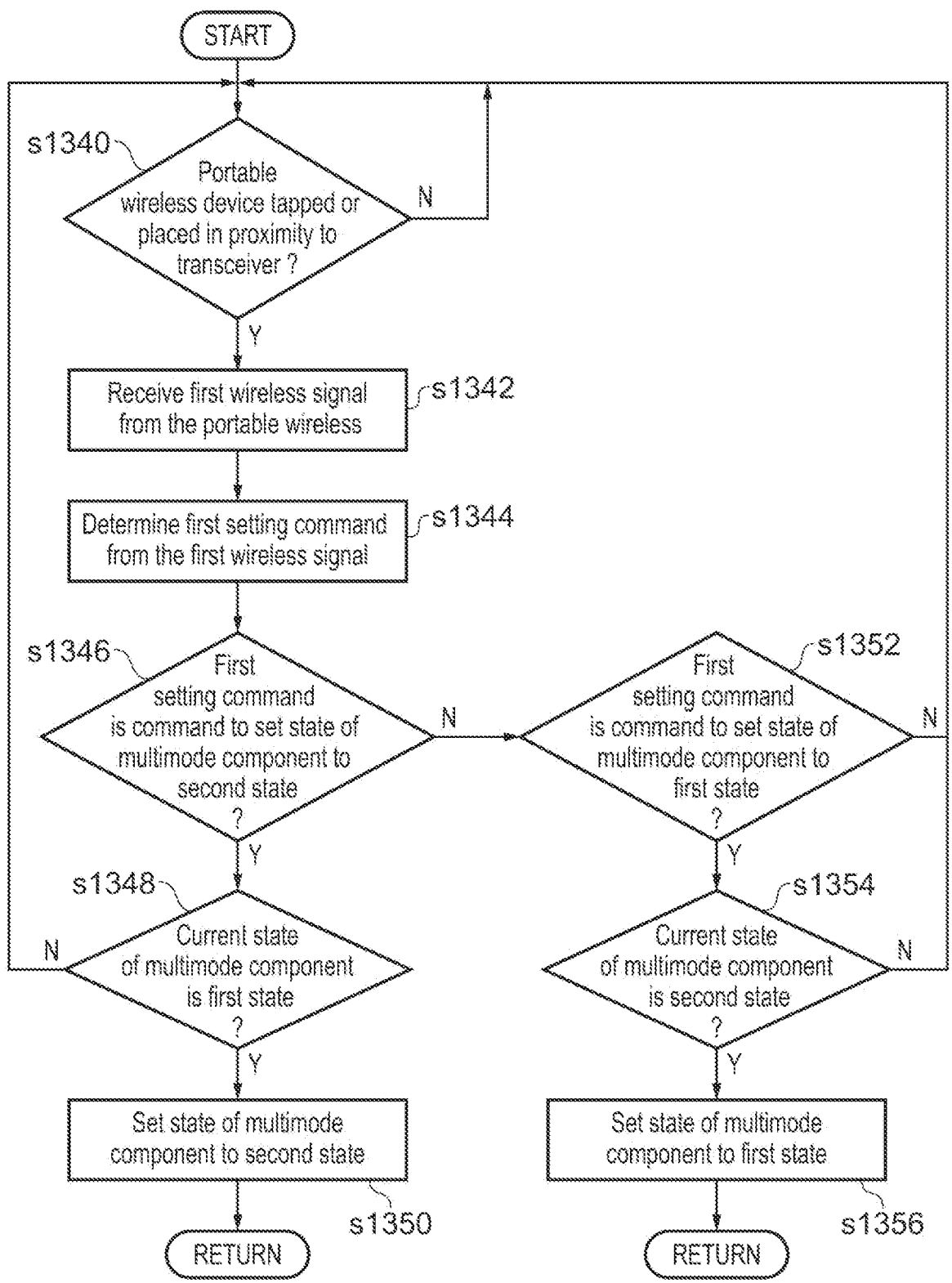
Figure 13E:
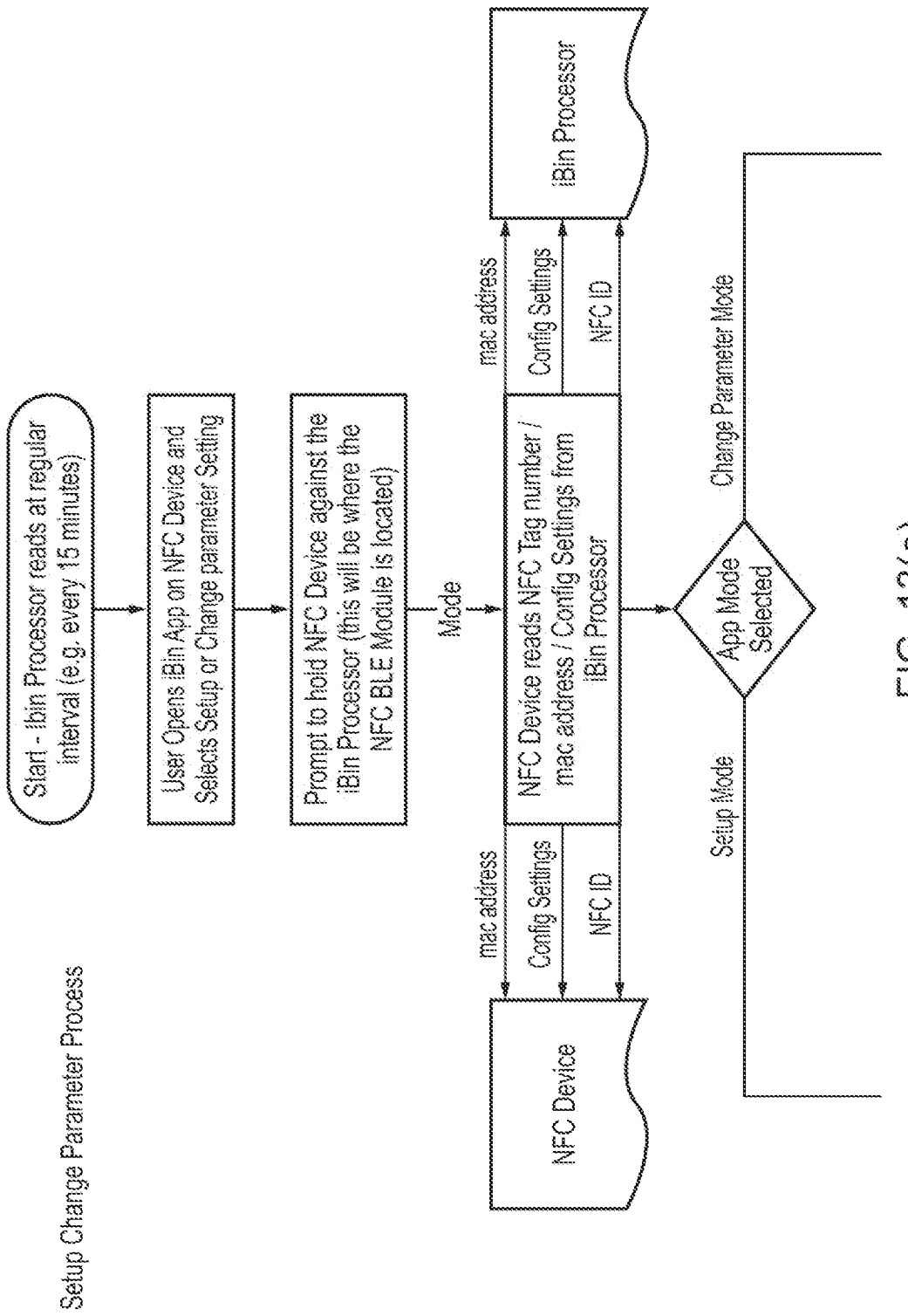
Figure 13E:
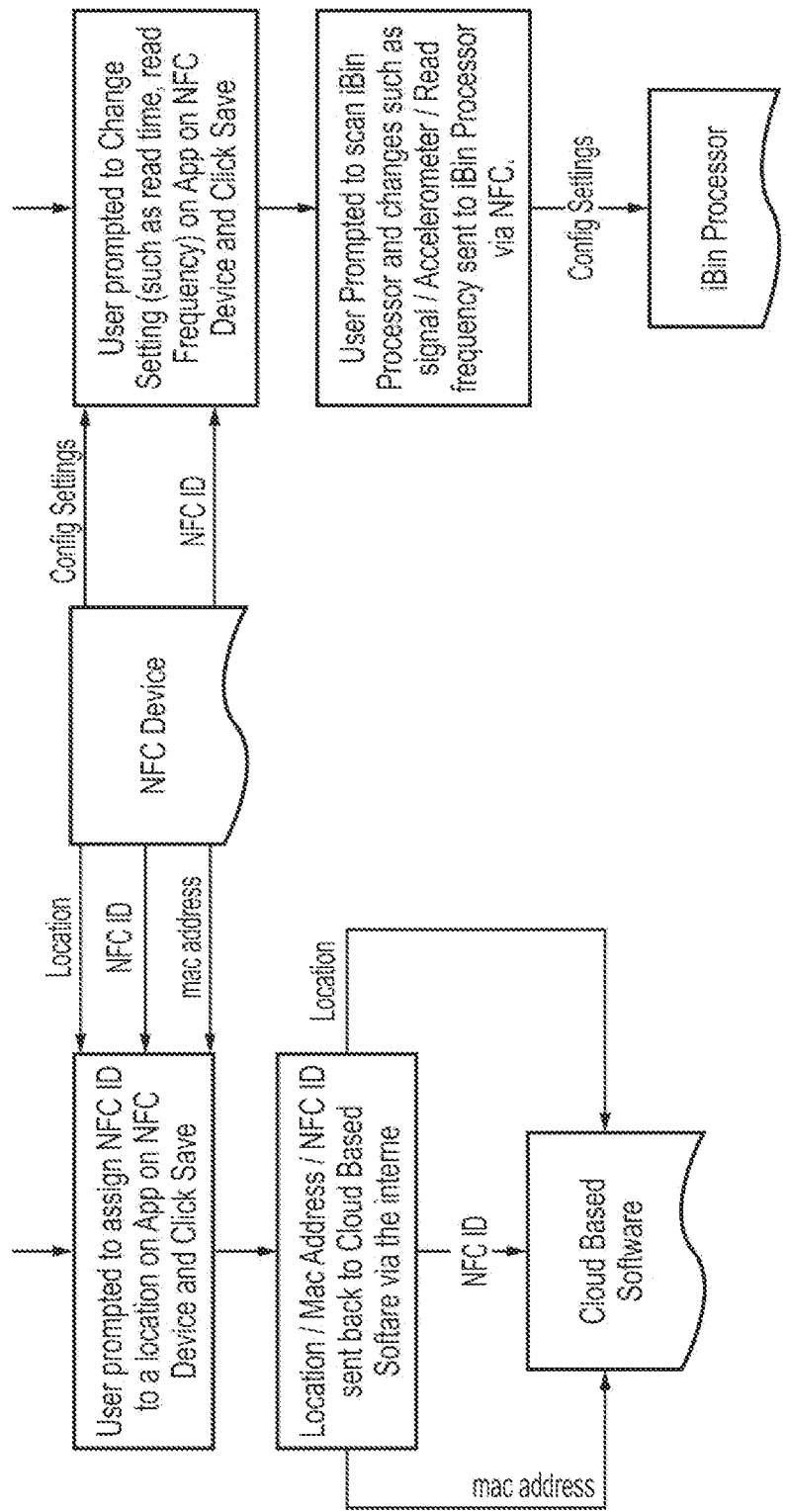
Figure 14A:
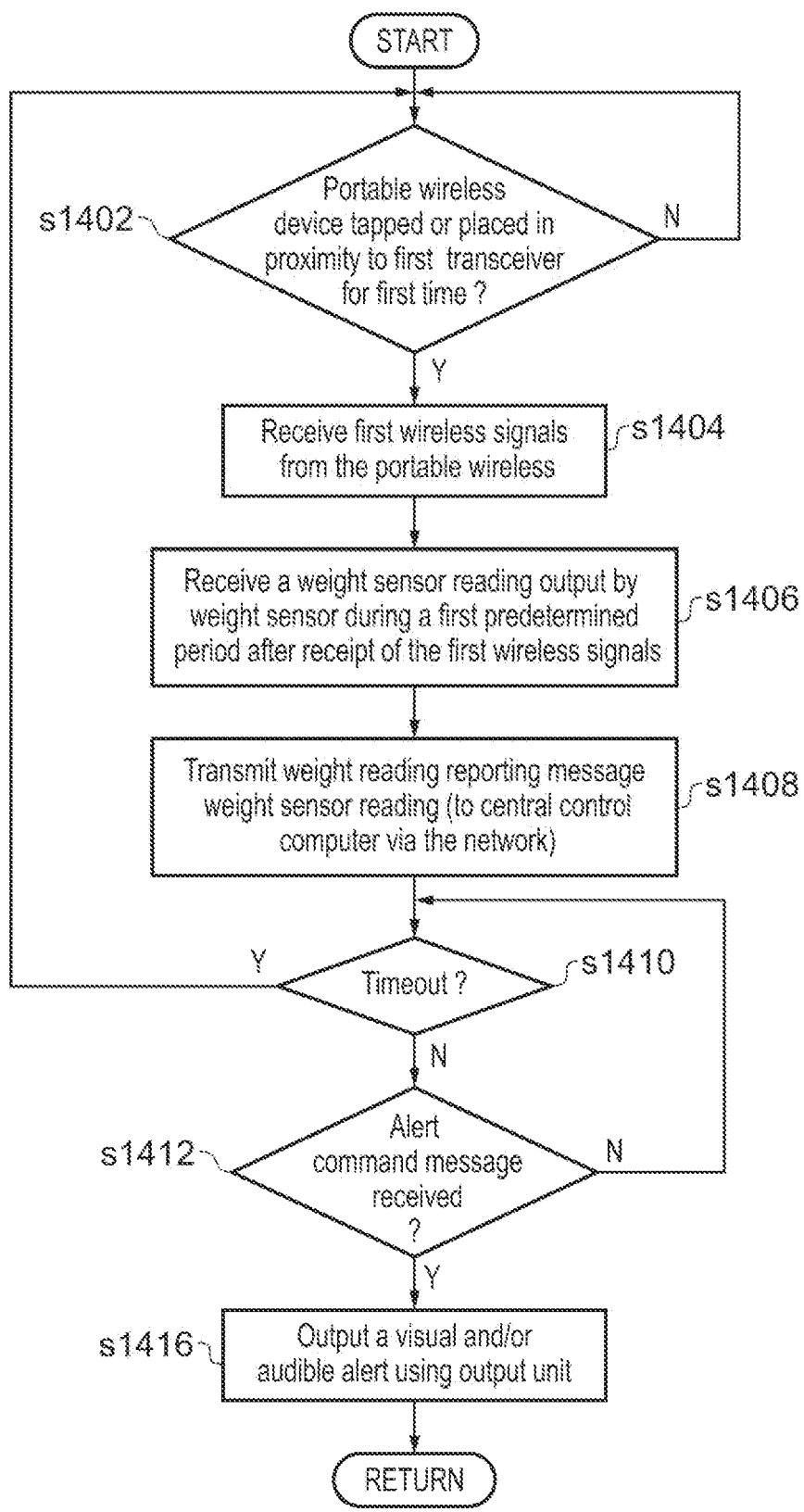
Figure 14B:
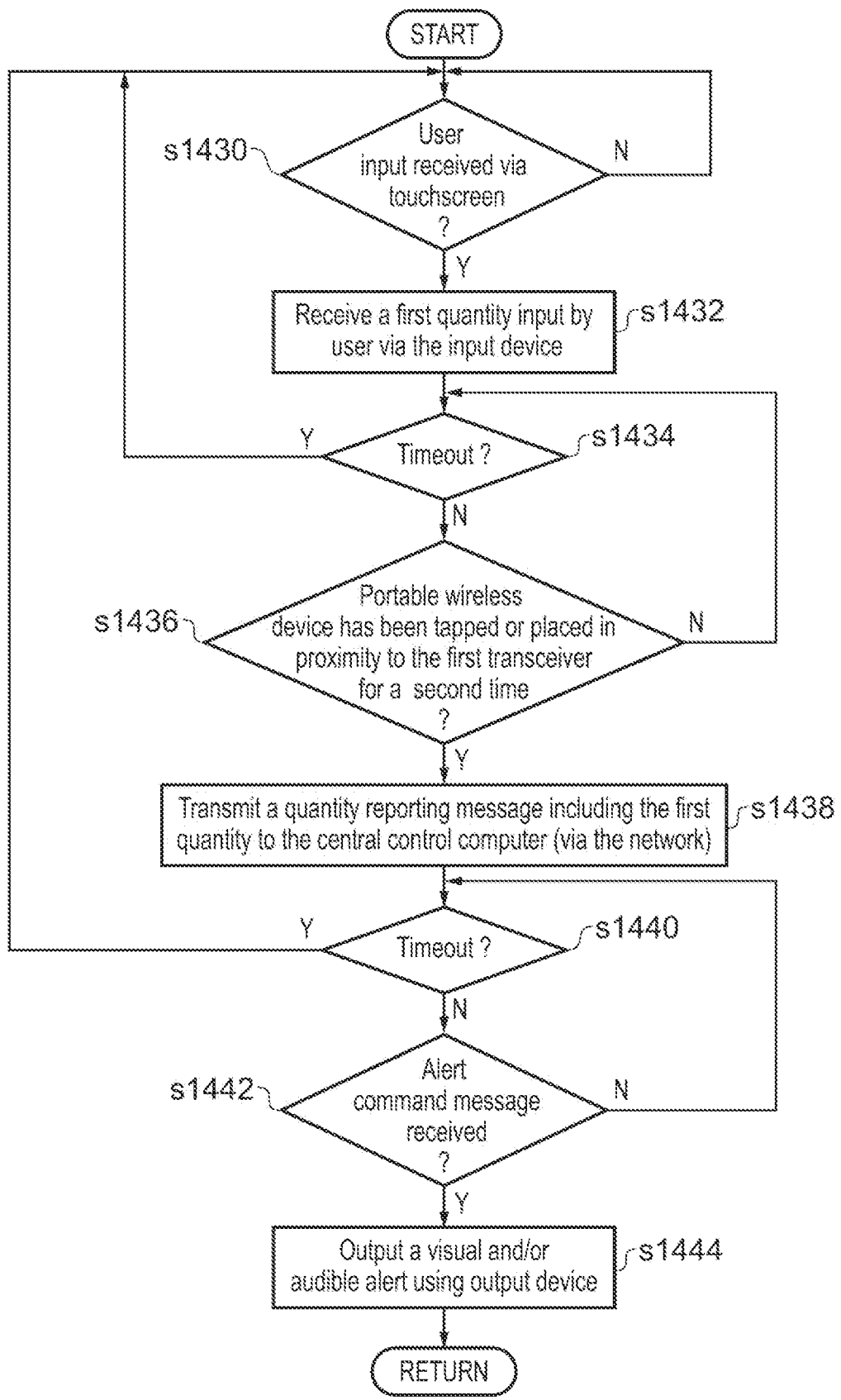
Figure 14C:
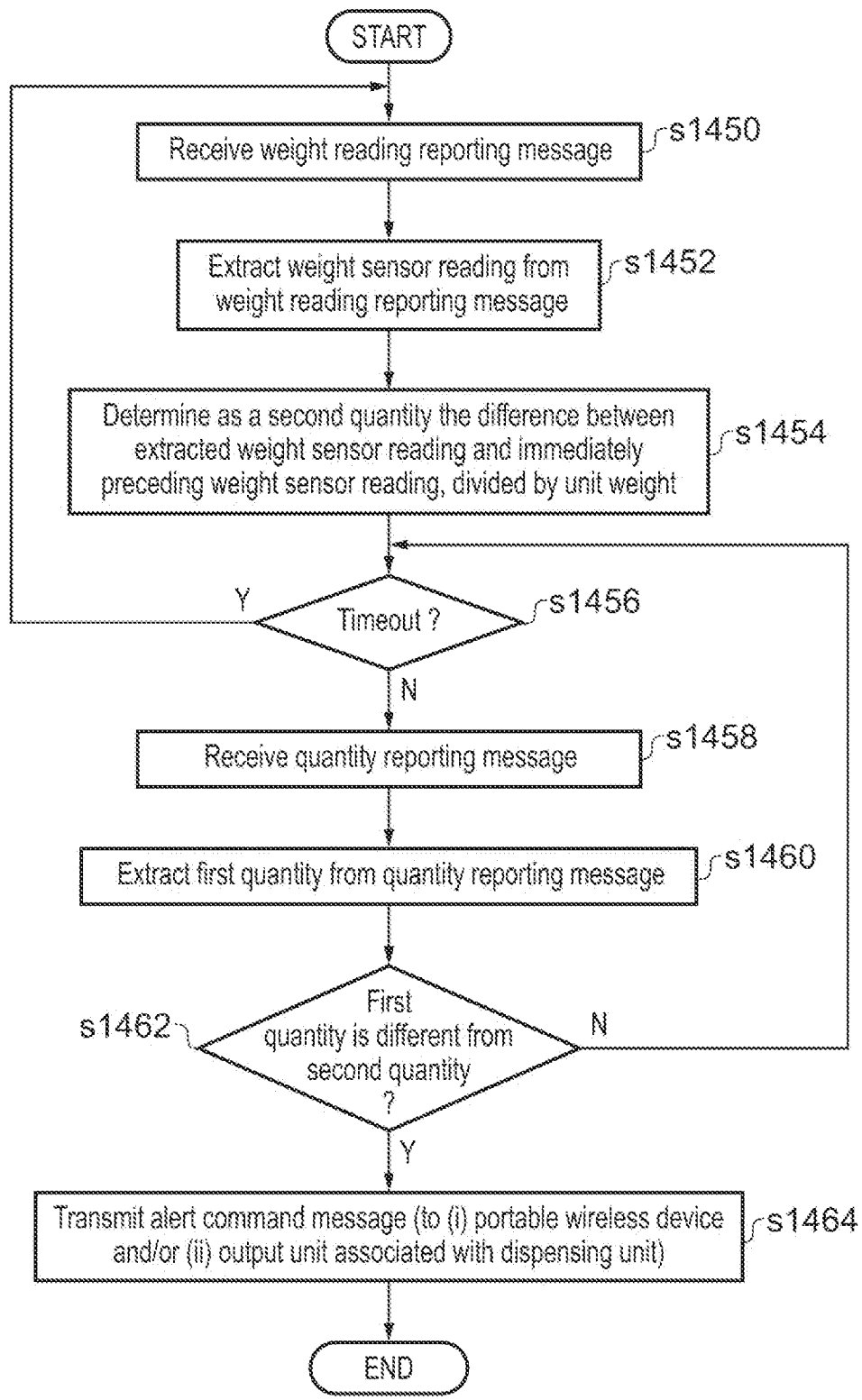
Figure 14D:
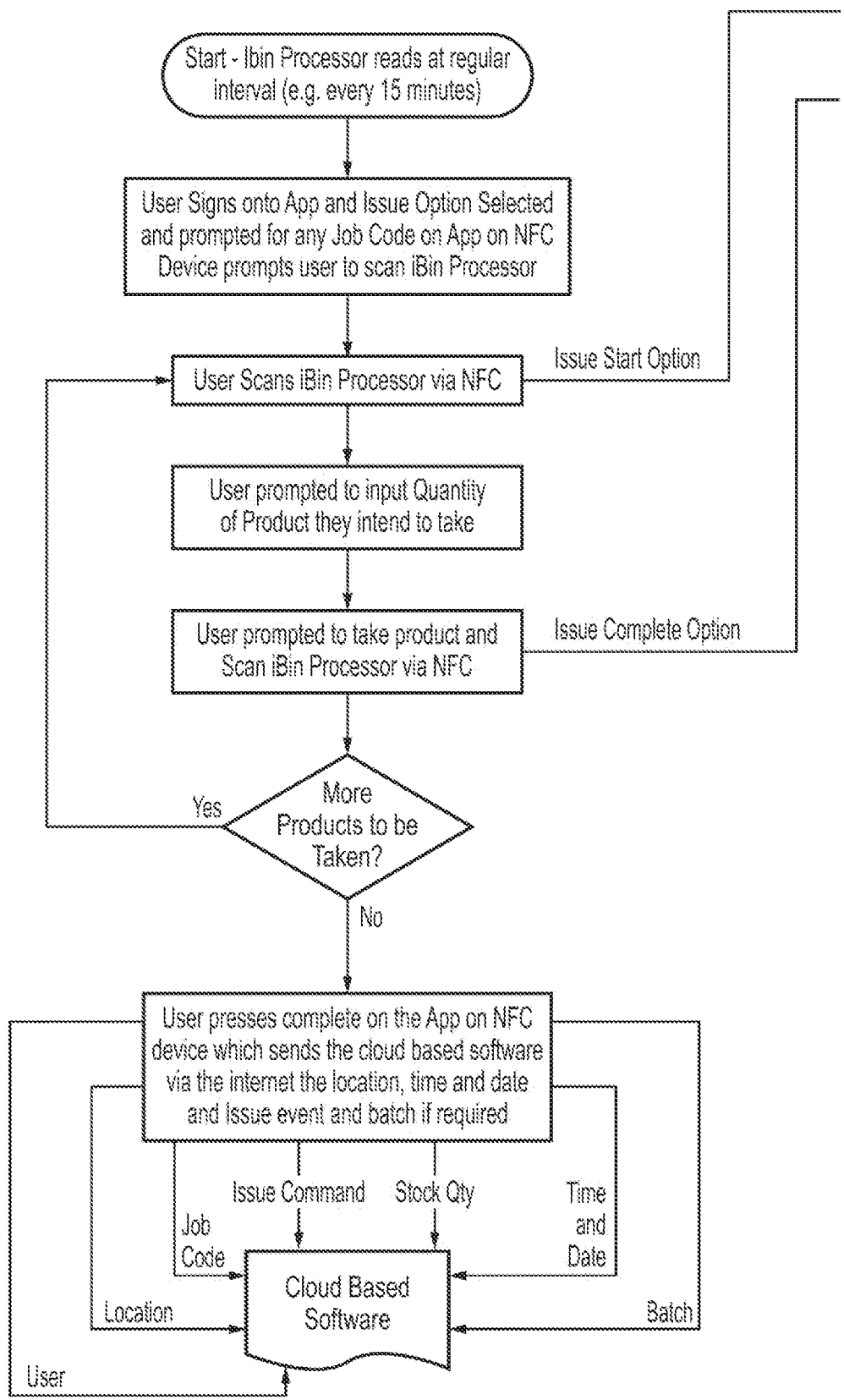
Figure 14D:
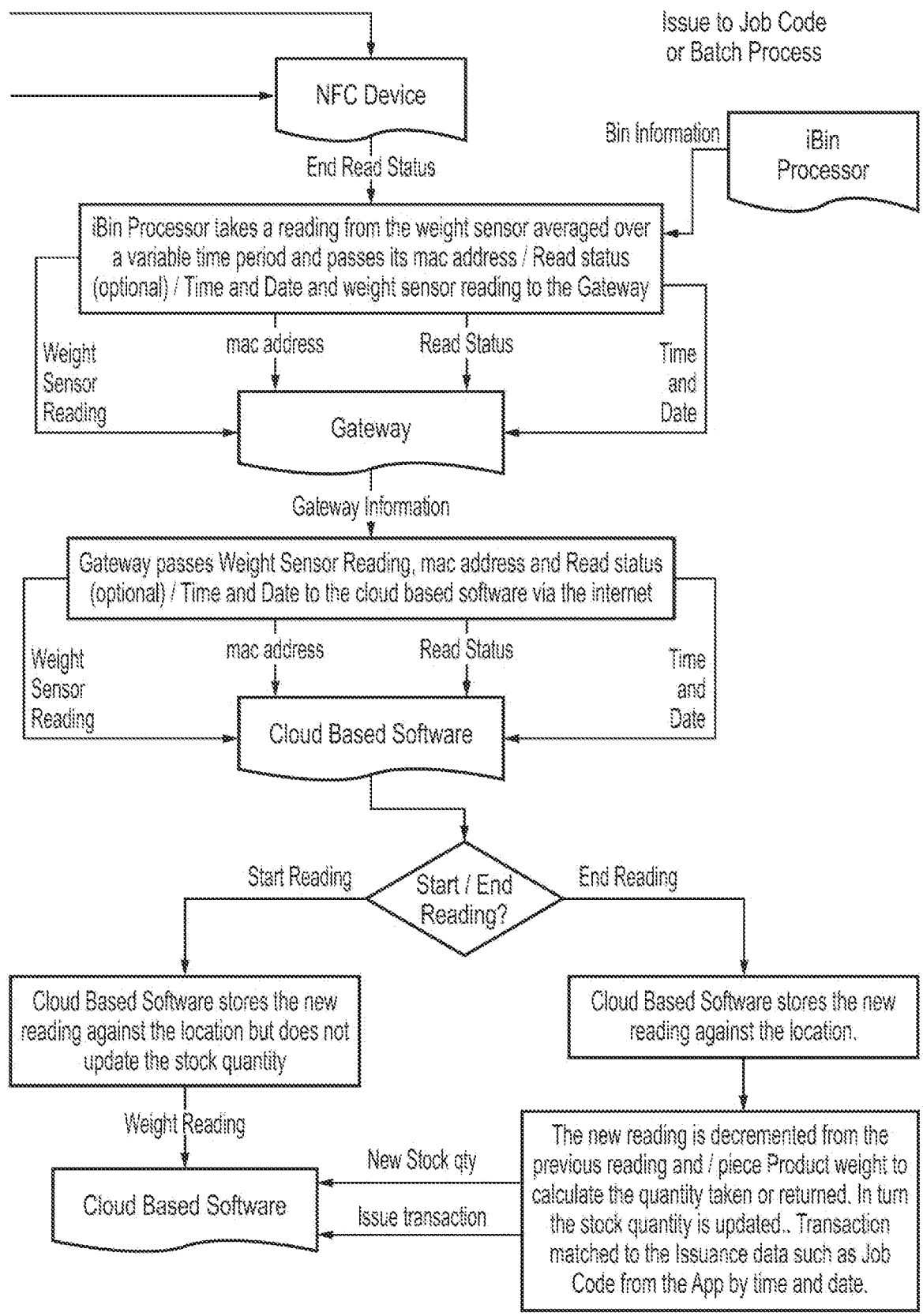
Figure 14E:
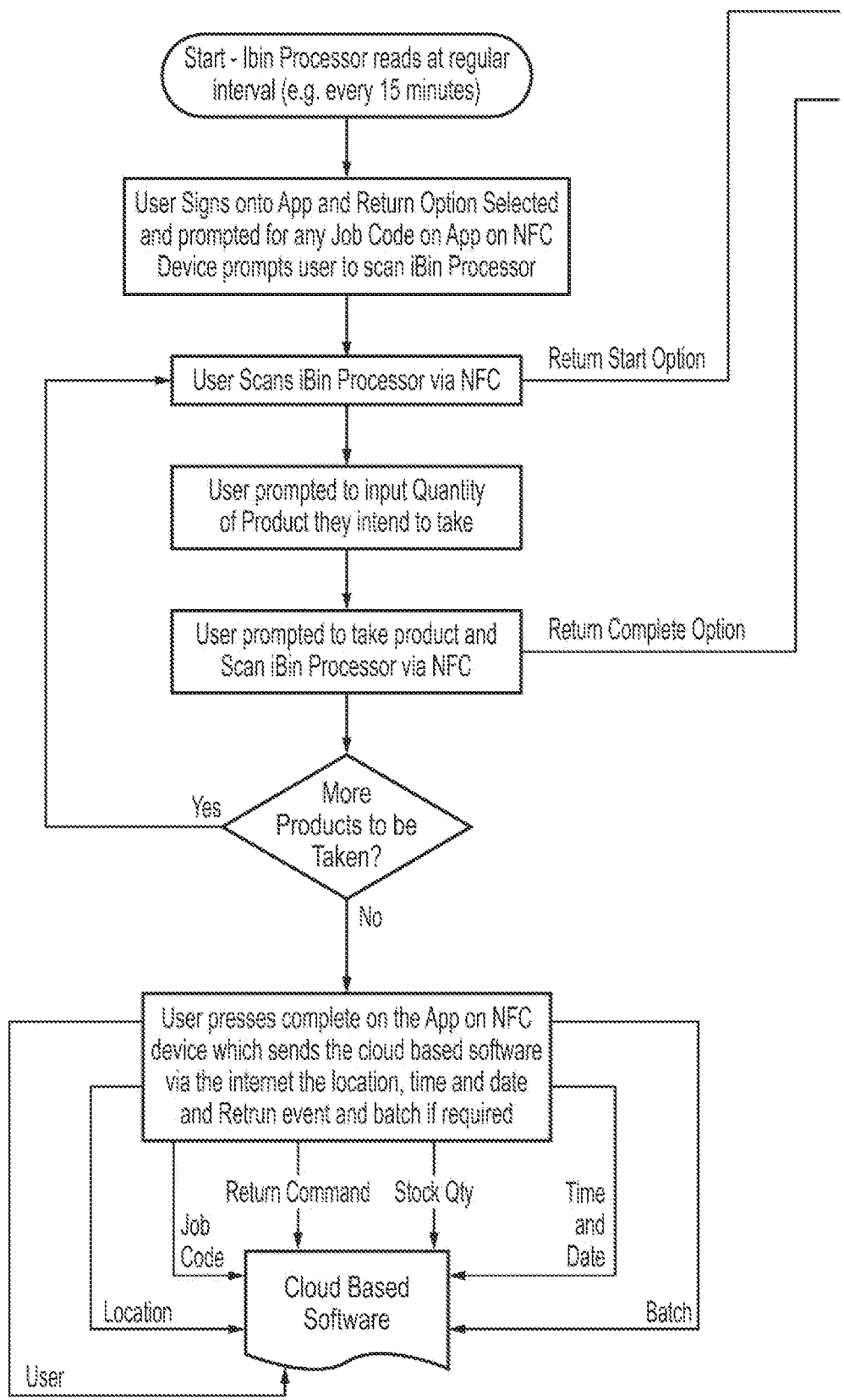
Figure 14E:
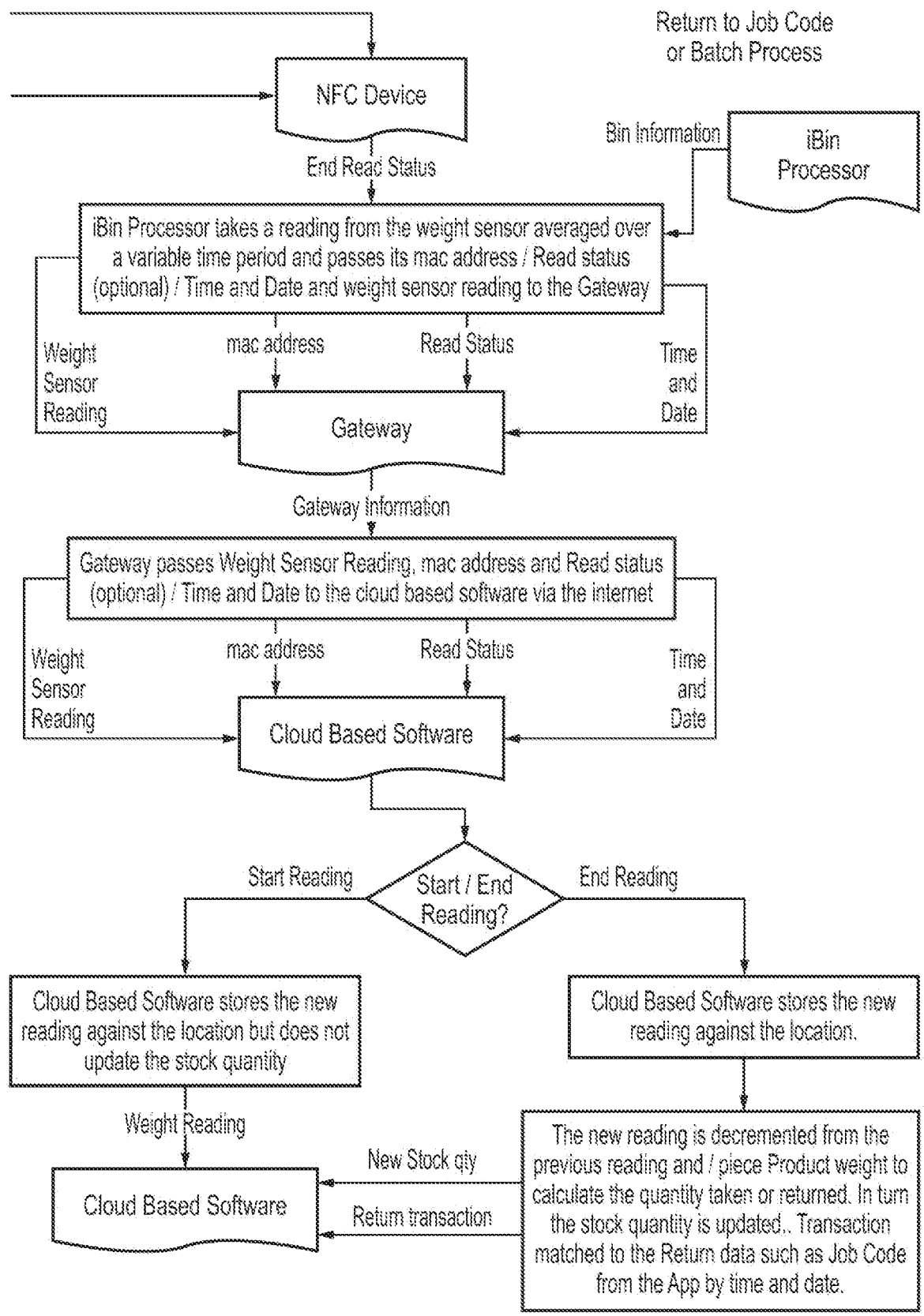
Figure 14F:
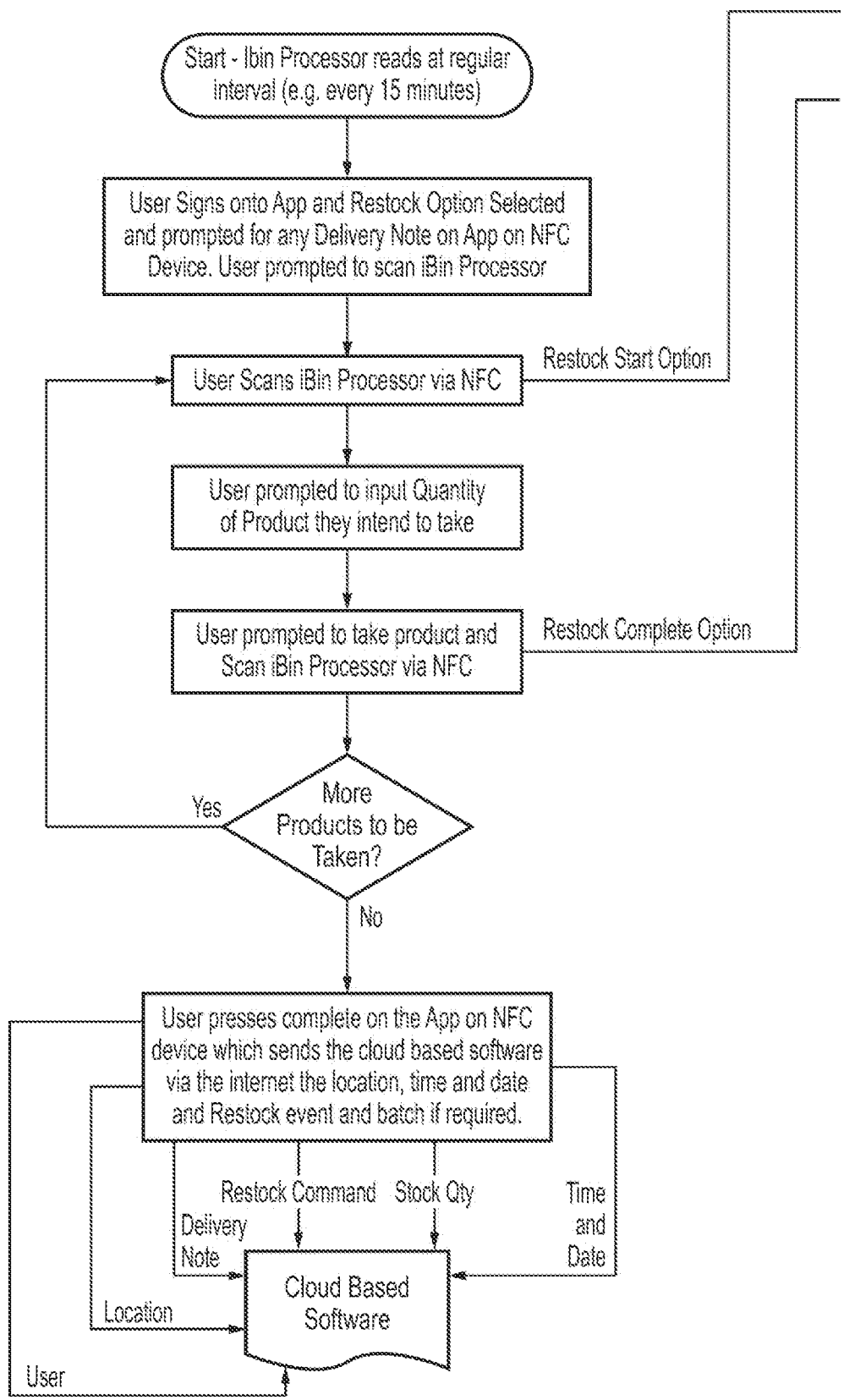
Figure 14F:
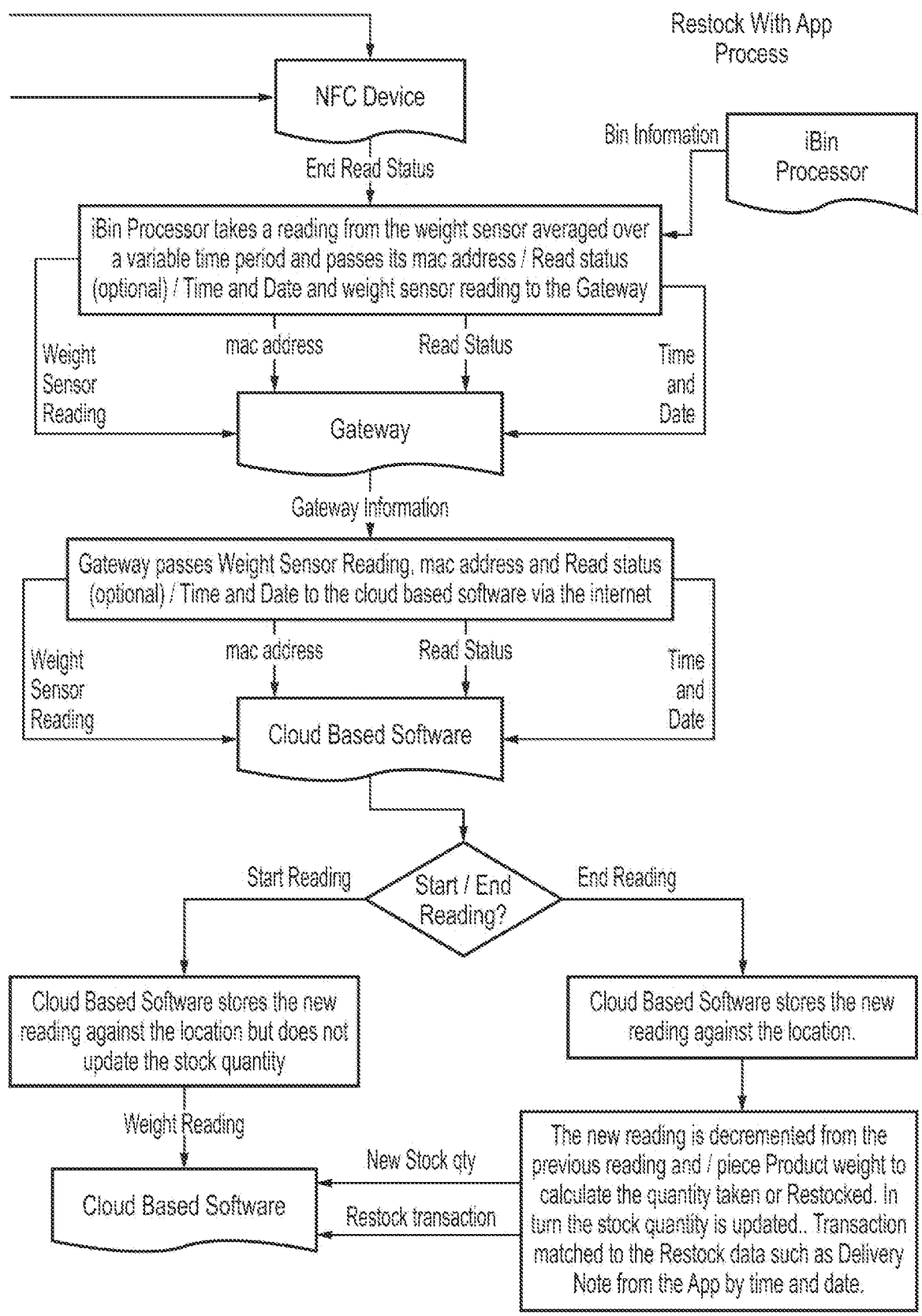
Figure 14G:
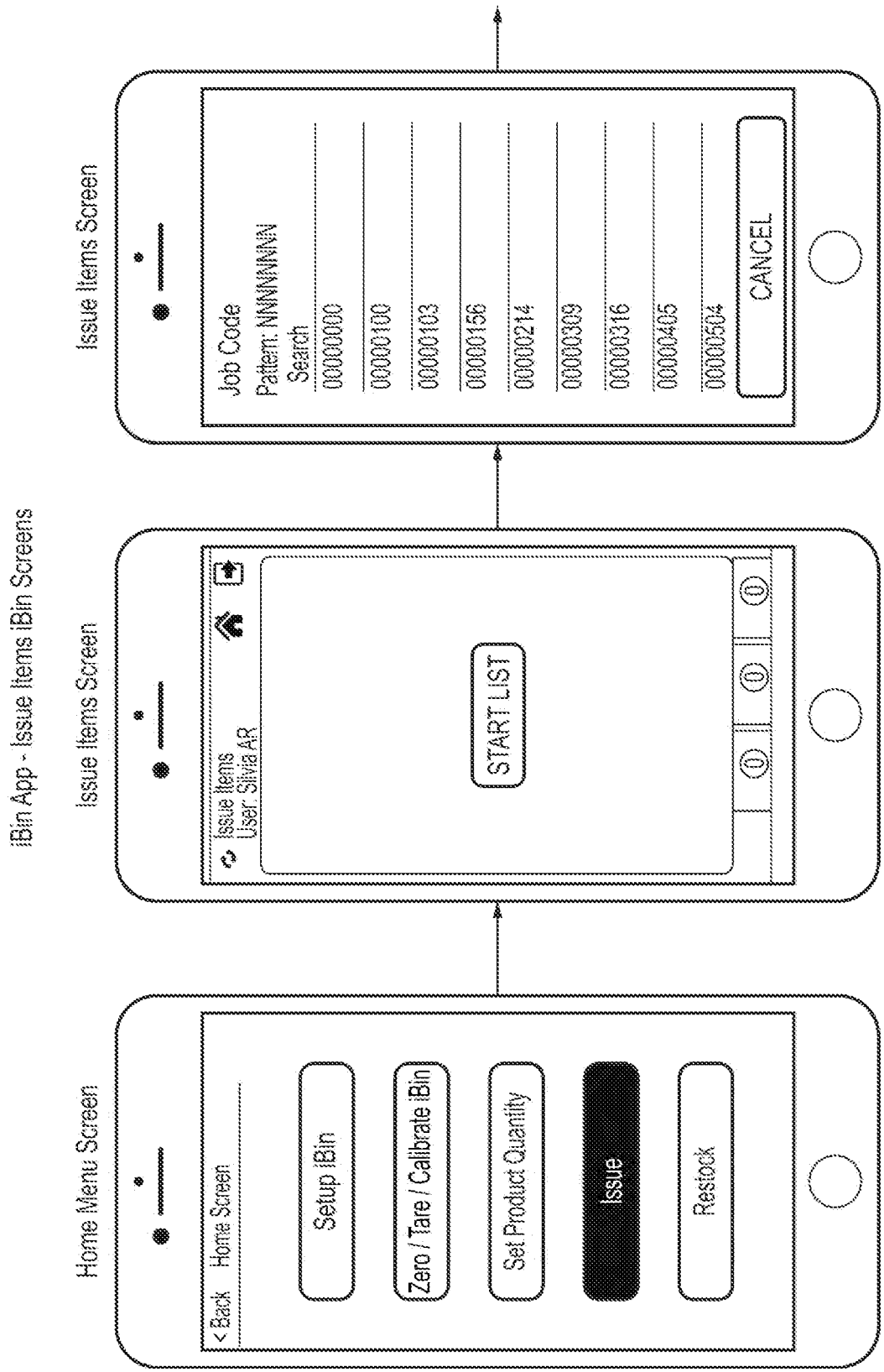
Figure 14G:
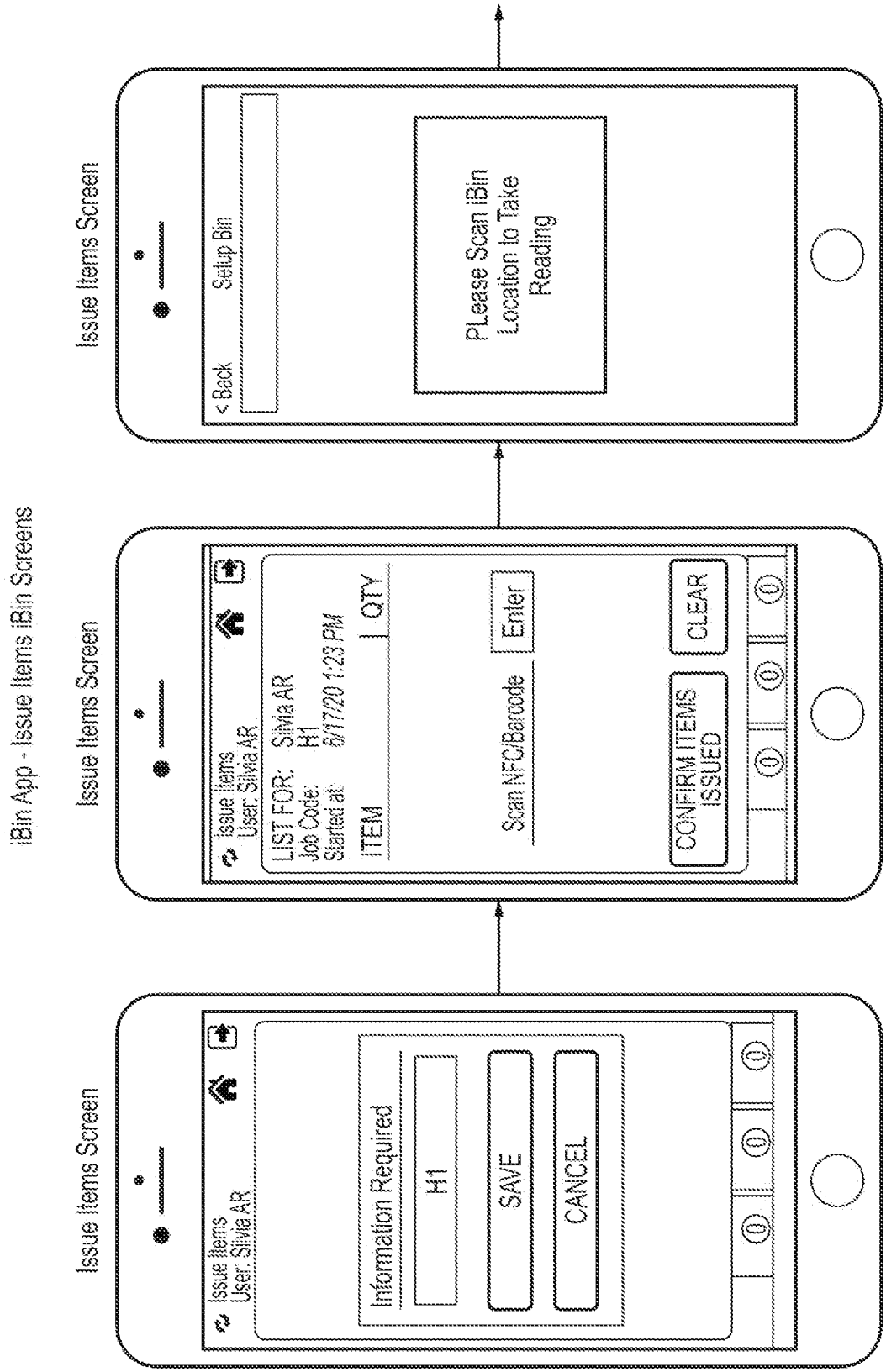
Figure 14G:
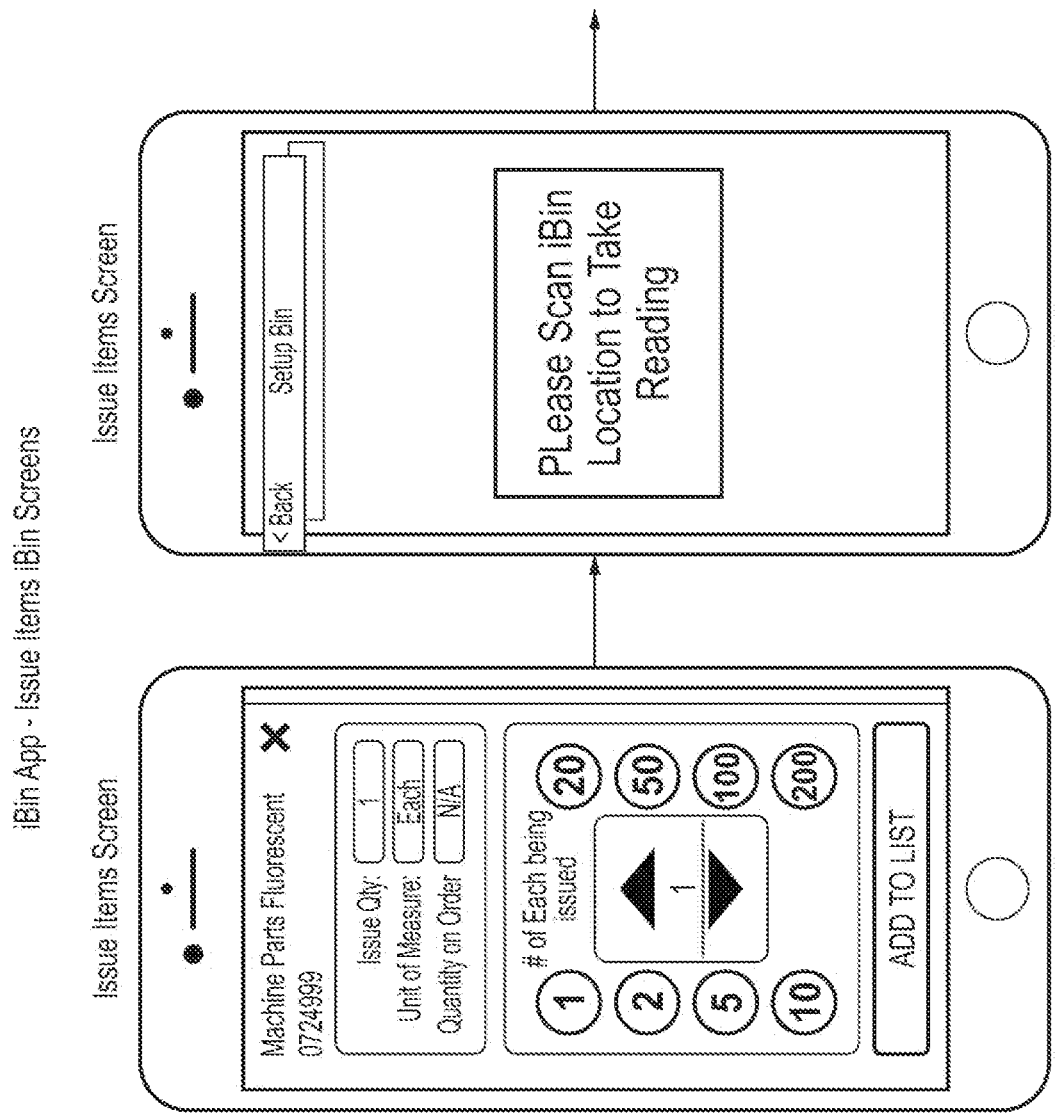
Figure 14G:
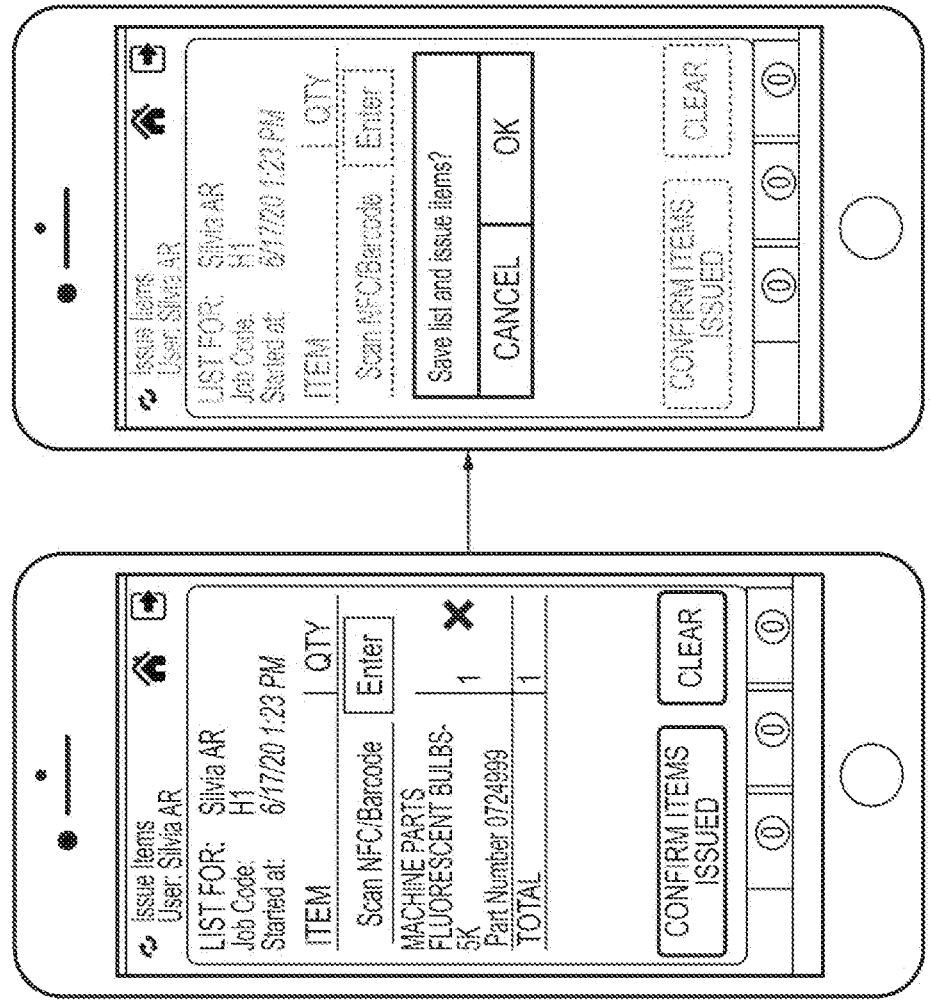
Figure 14H:
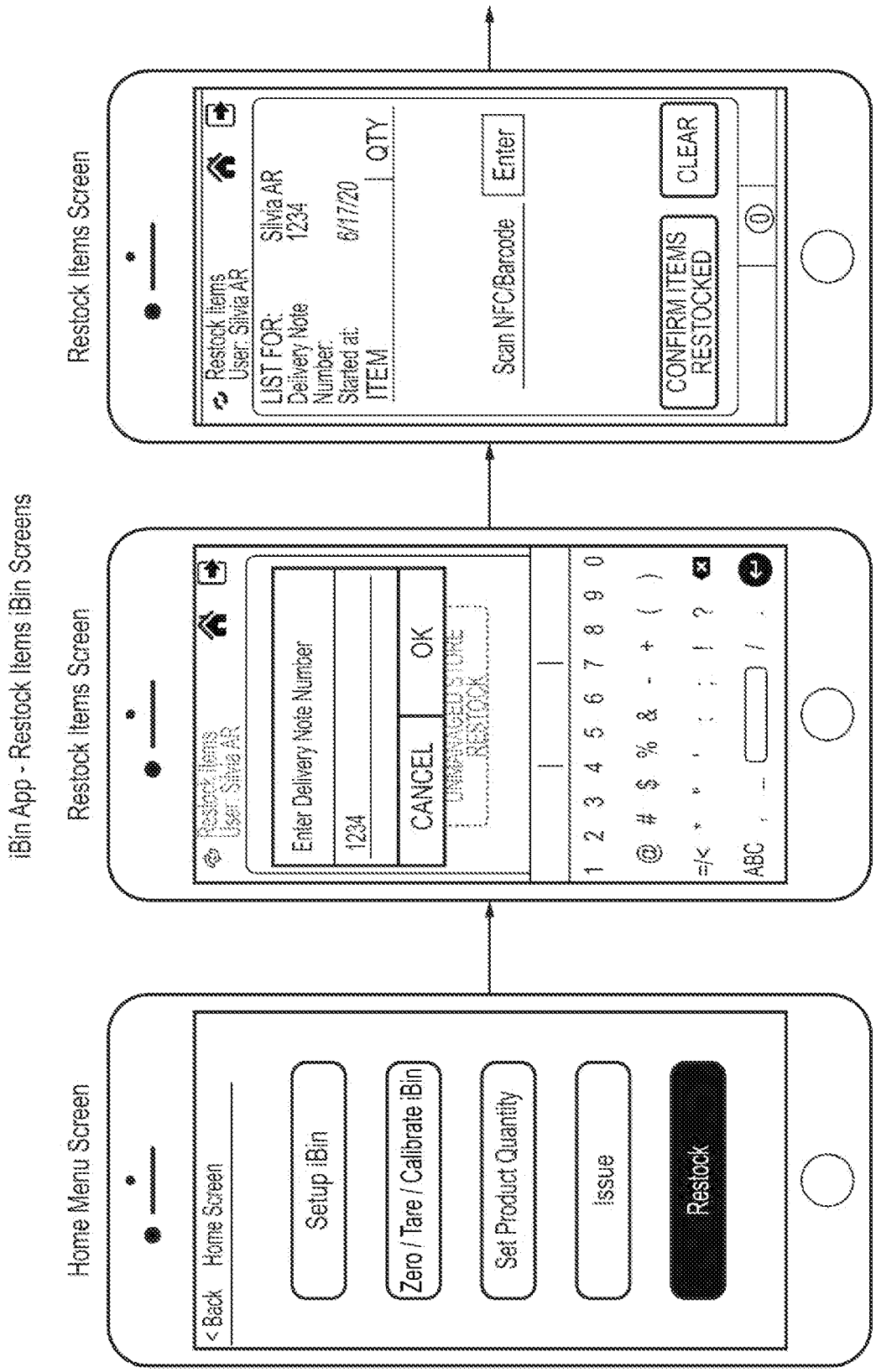
Figure 14H:
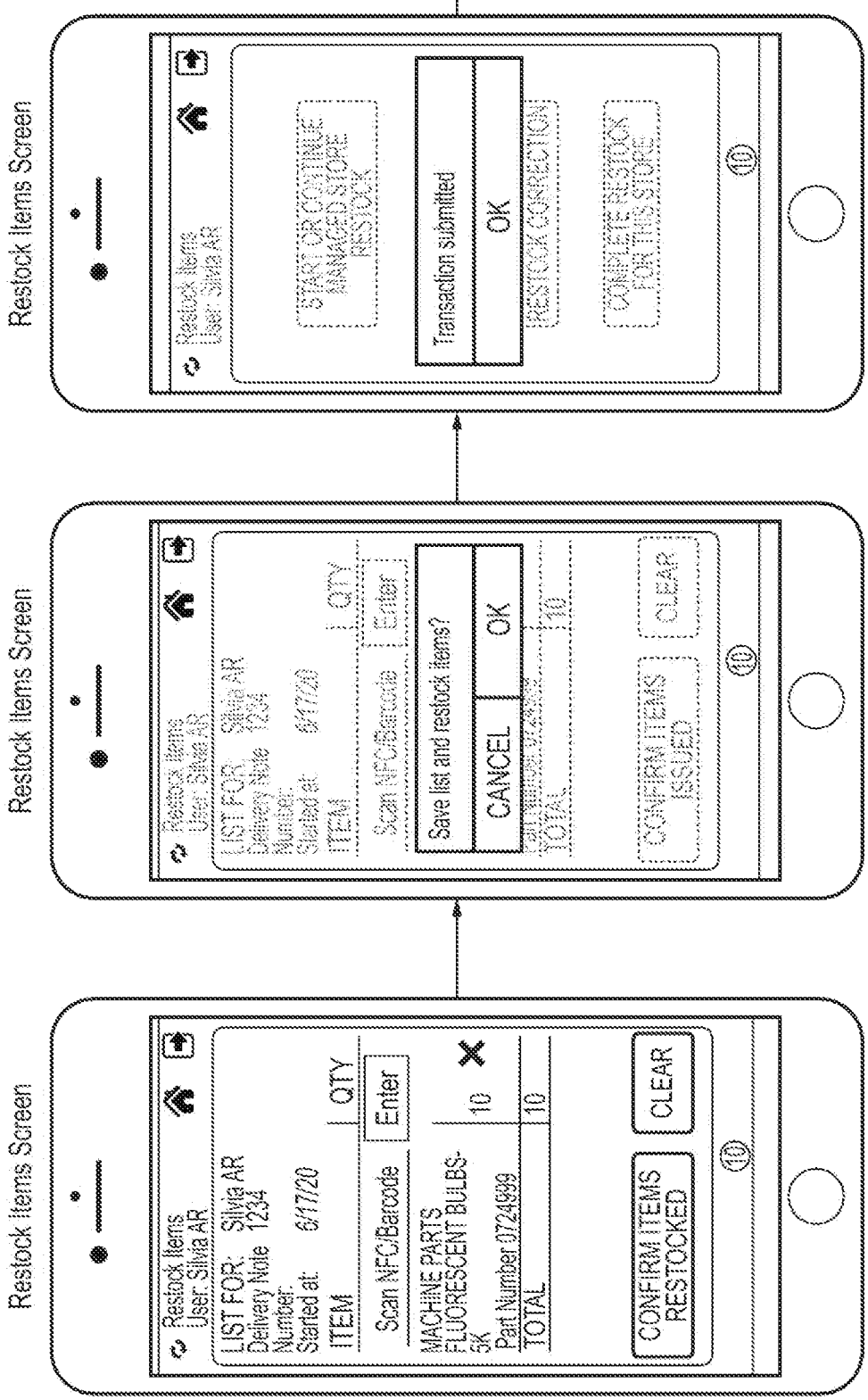
Figure 15A:
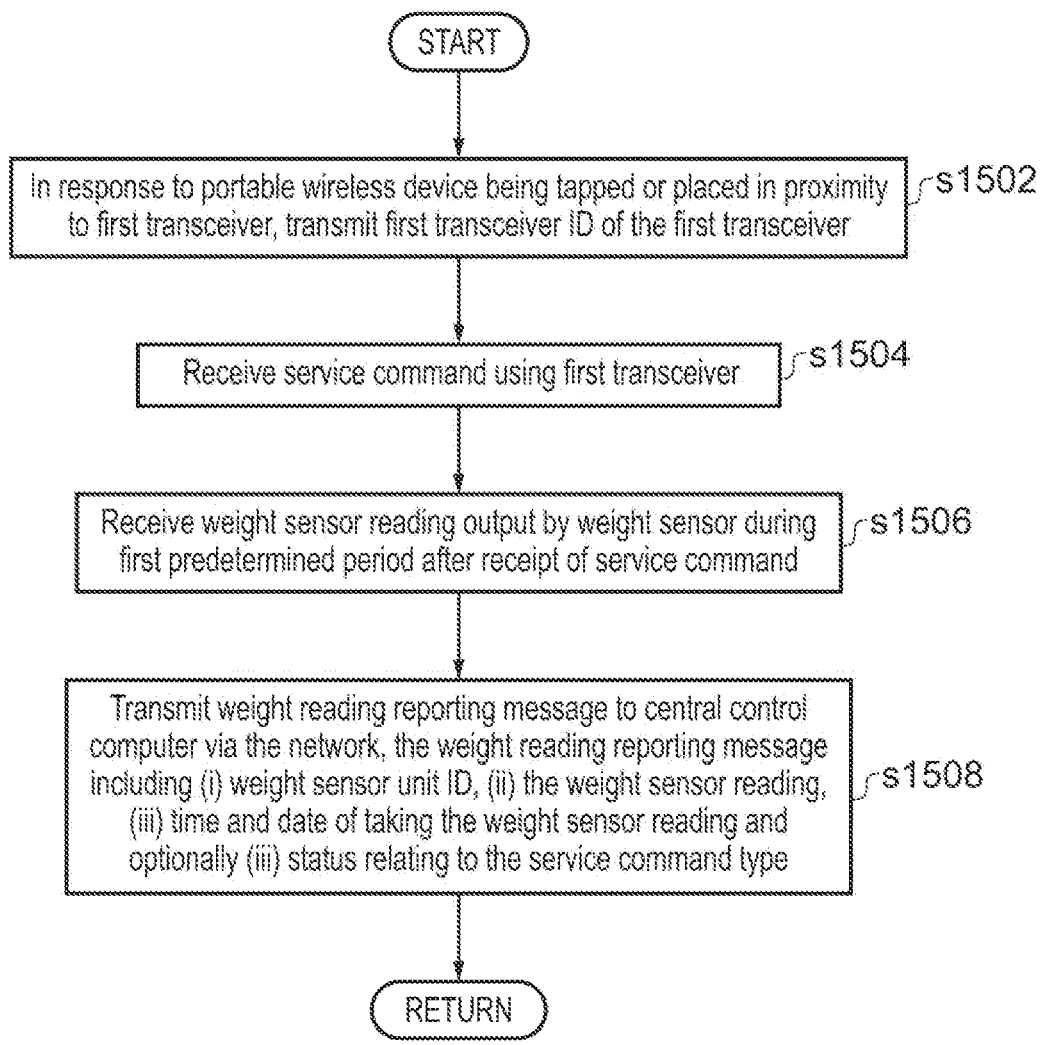
Figure 15B:
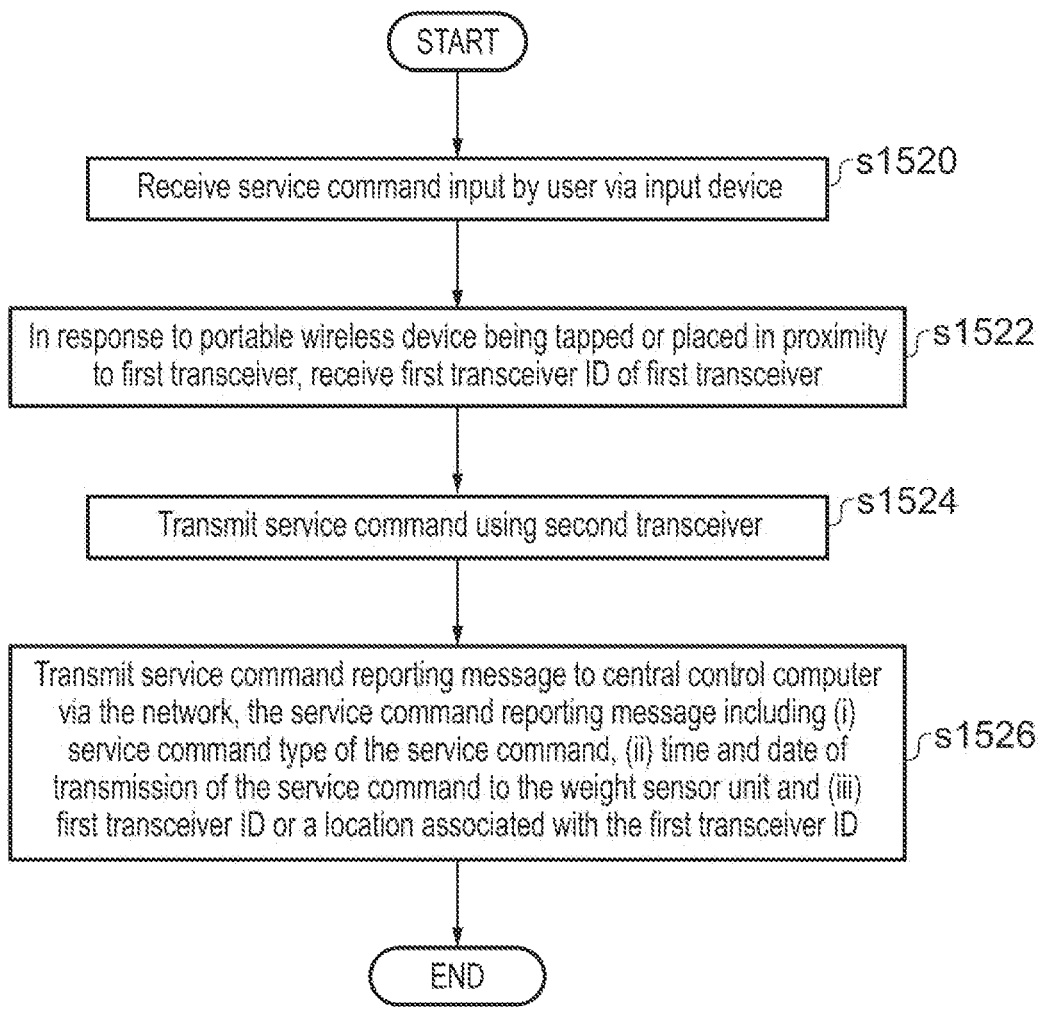
Figure 15C:
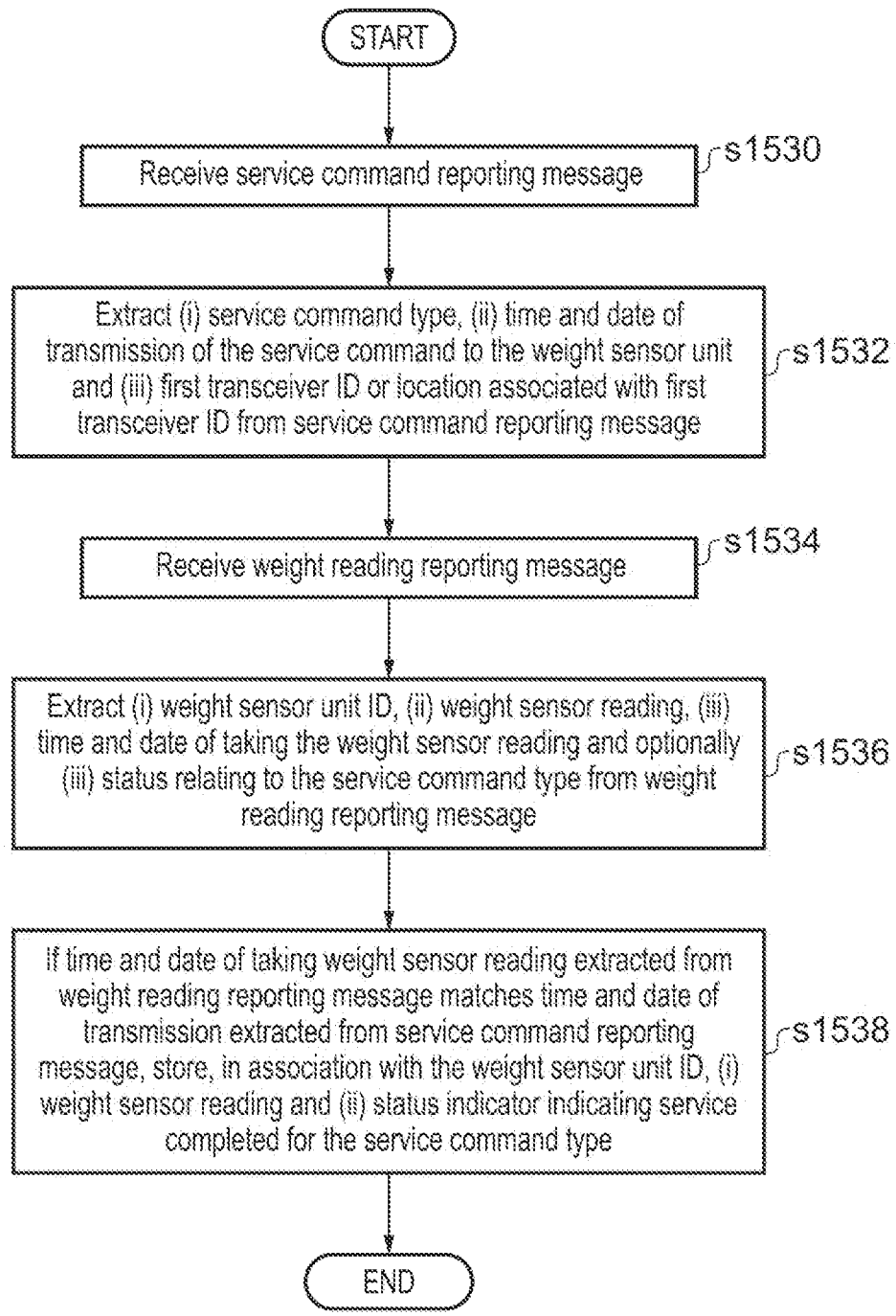
Figure 15D:
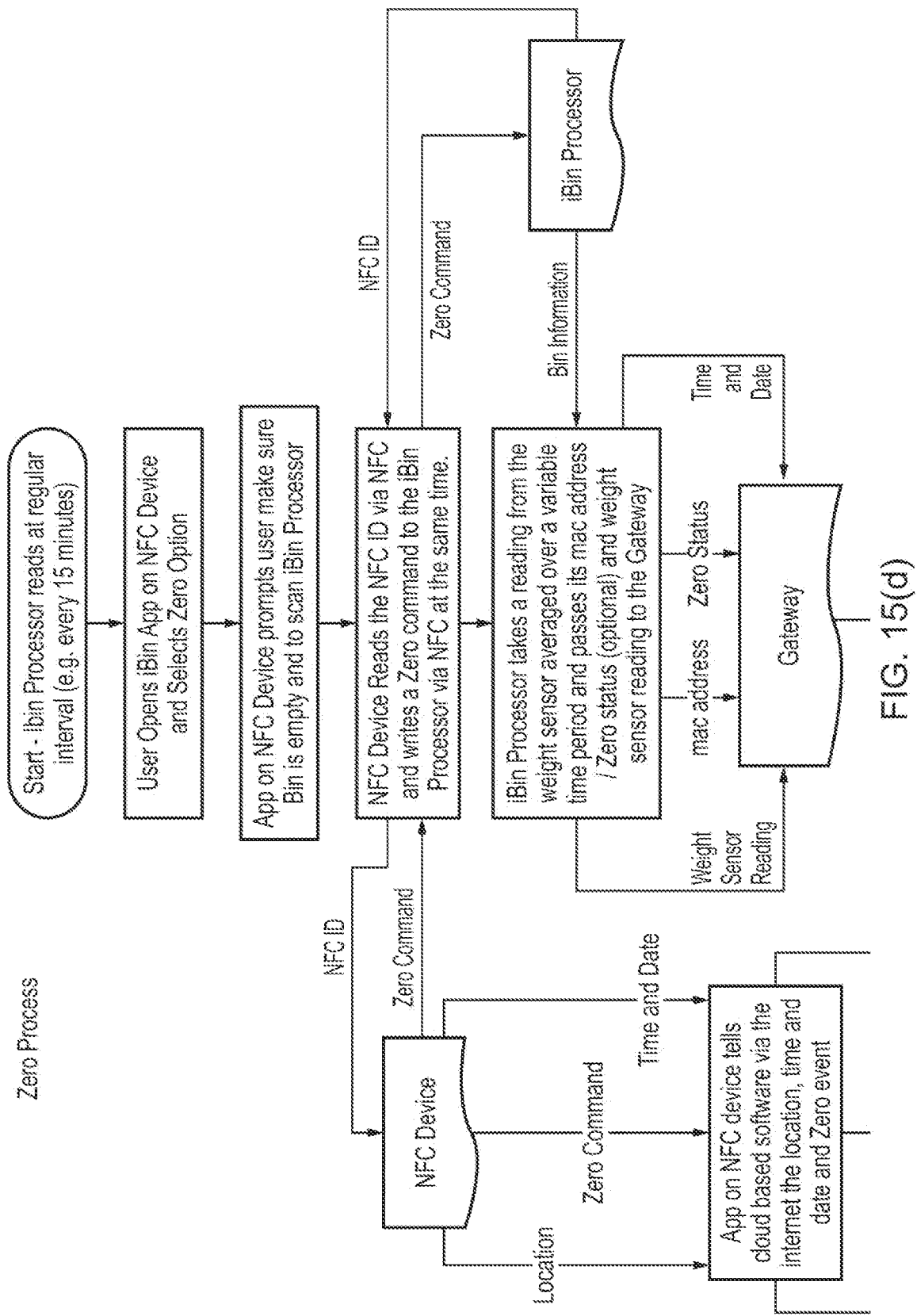
Figure 15D:
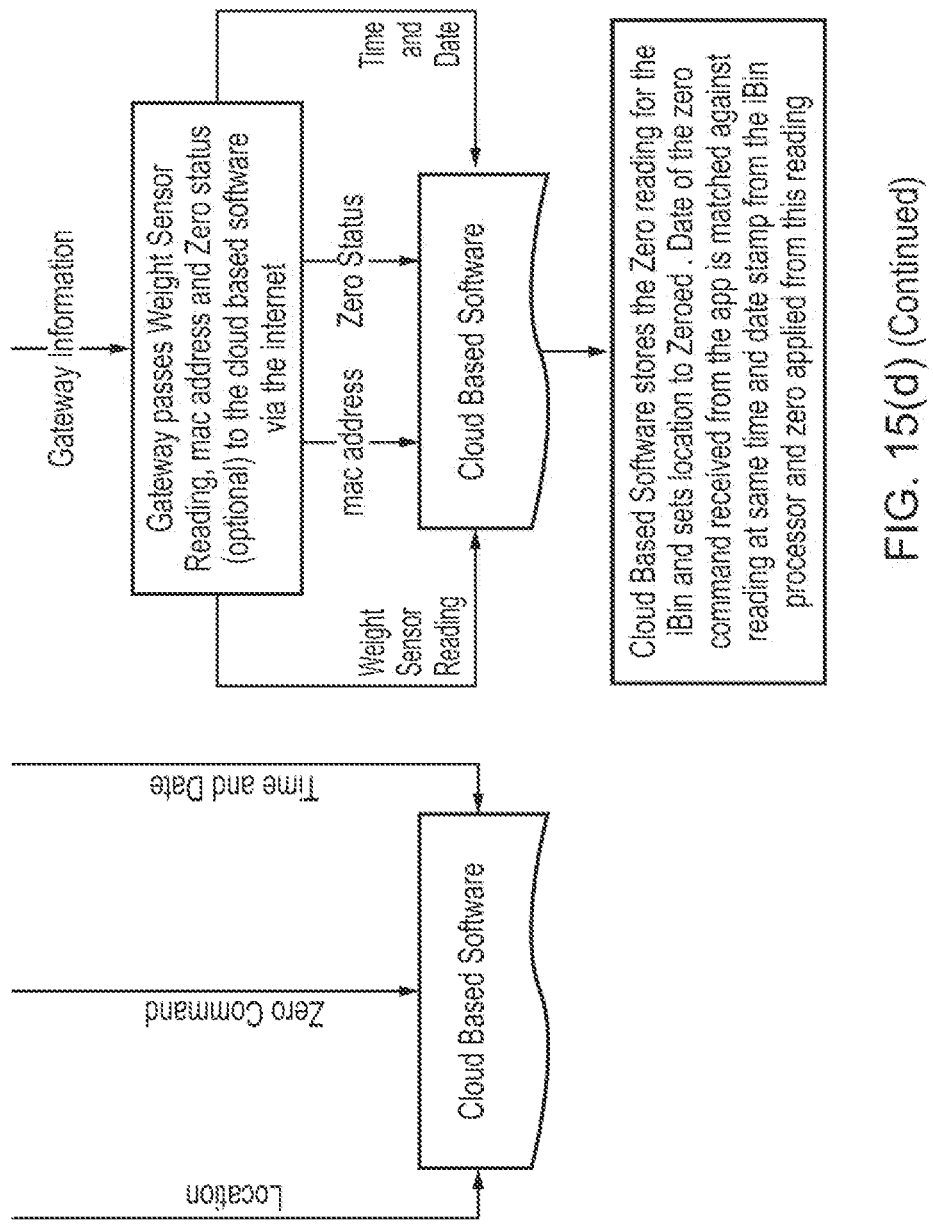
Figure 15E:
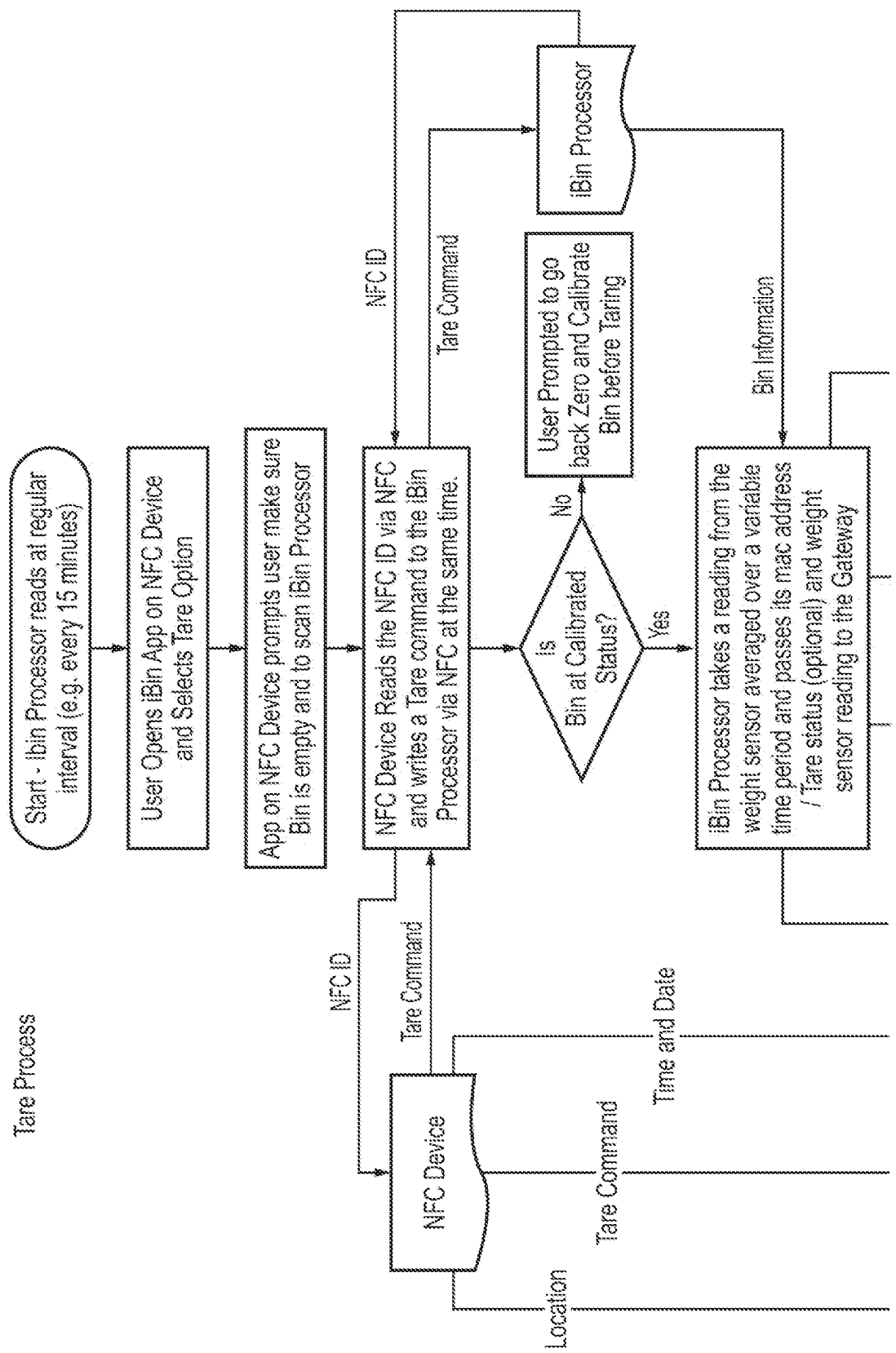
Figure 15E:
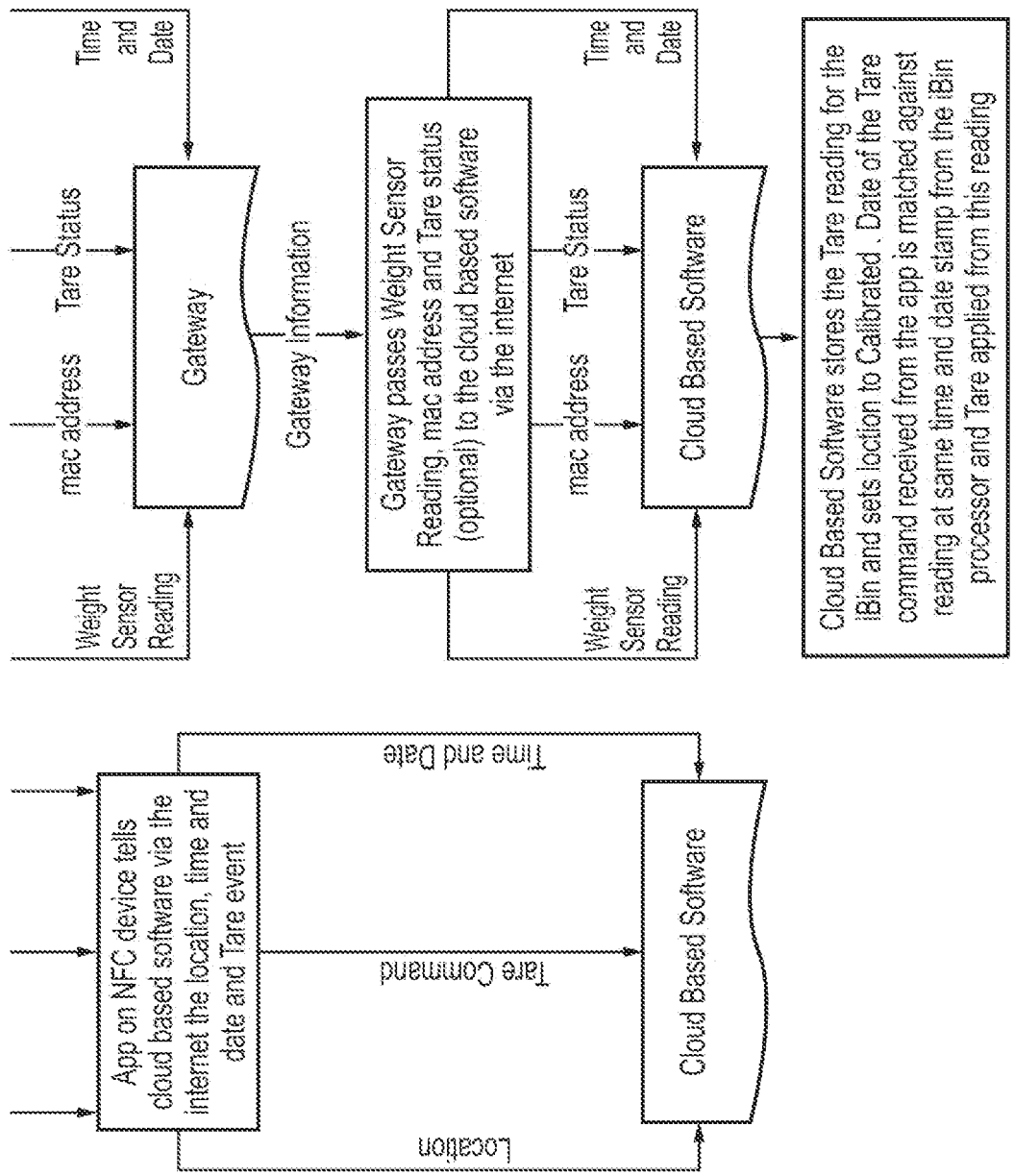
Figure 15F:
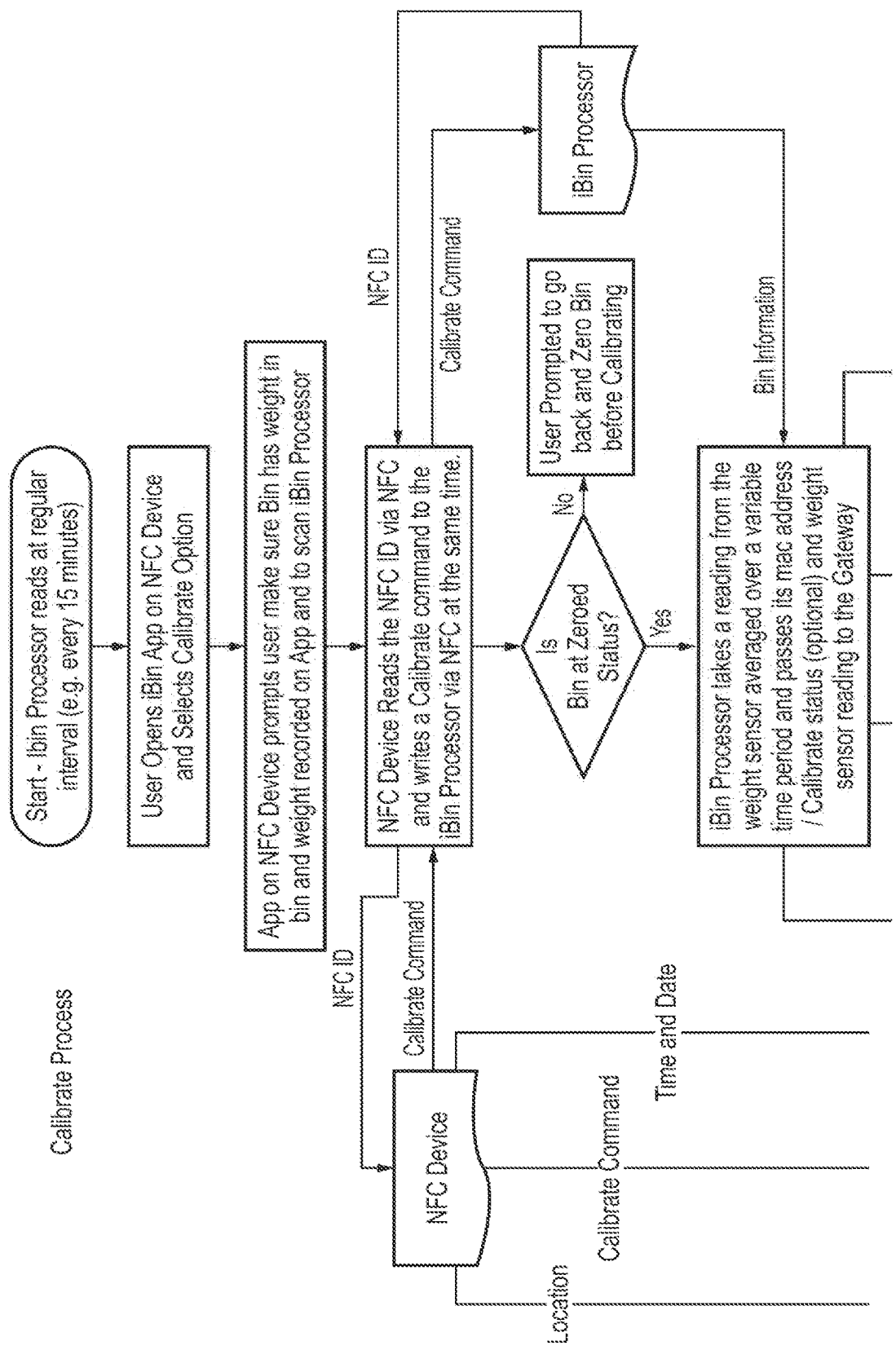
Figure 15F:
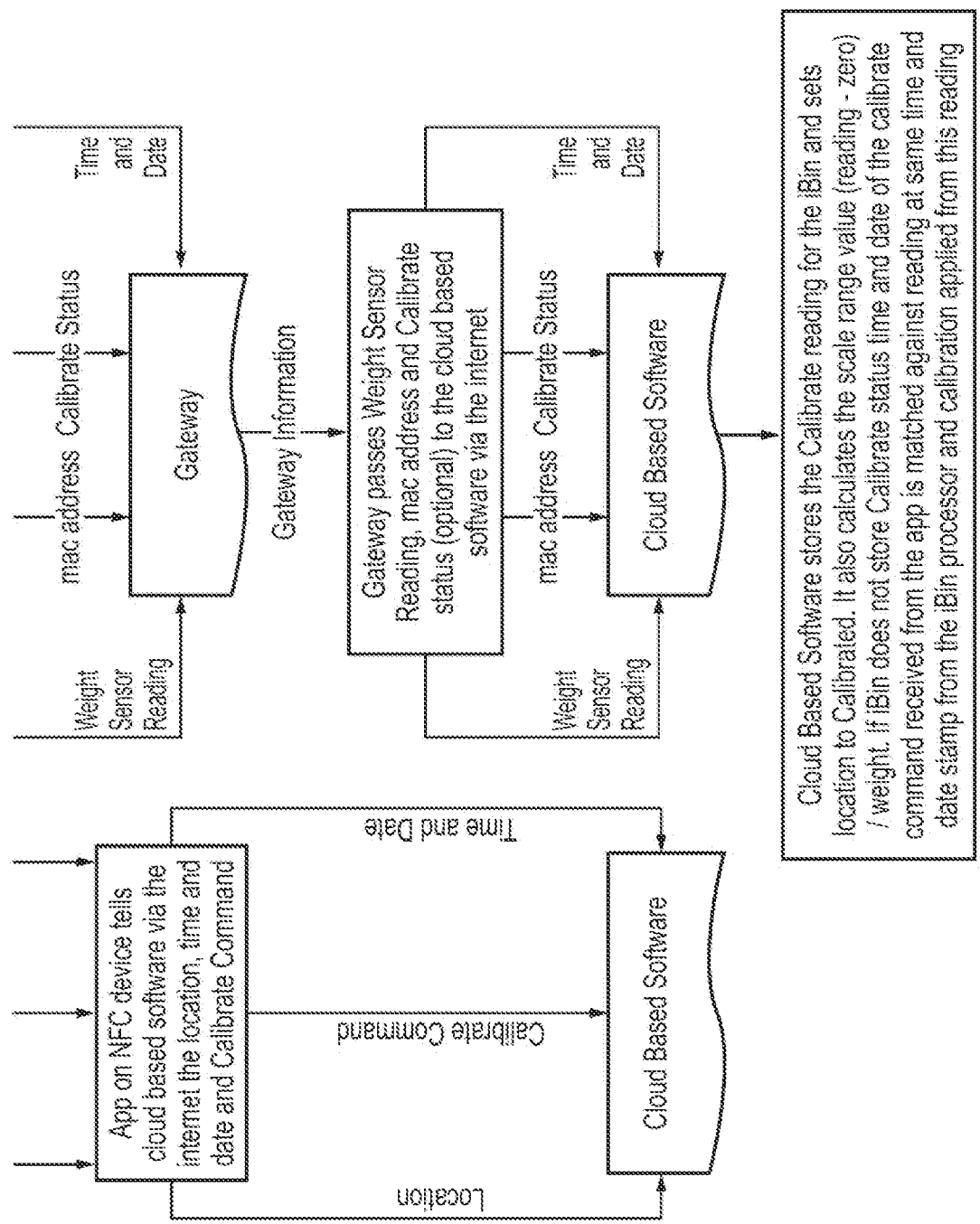
Figure 15G:
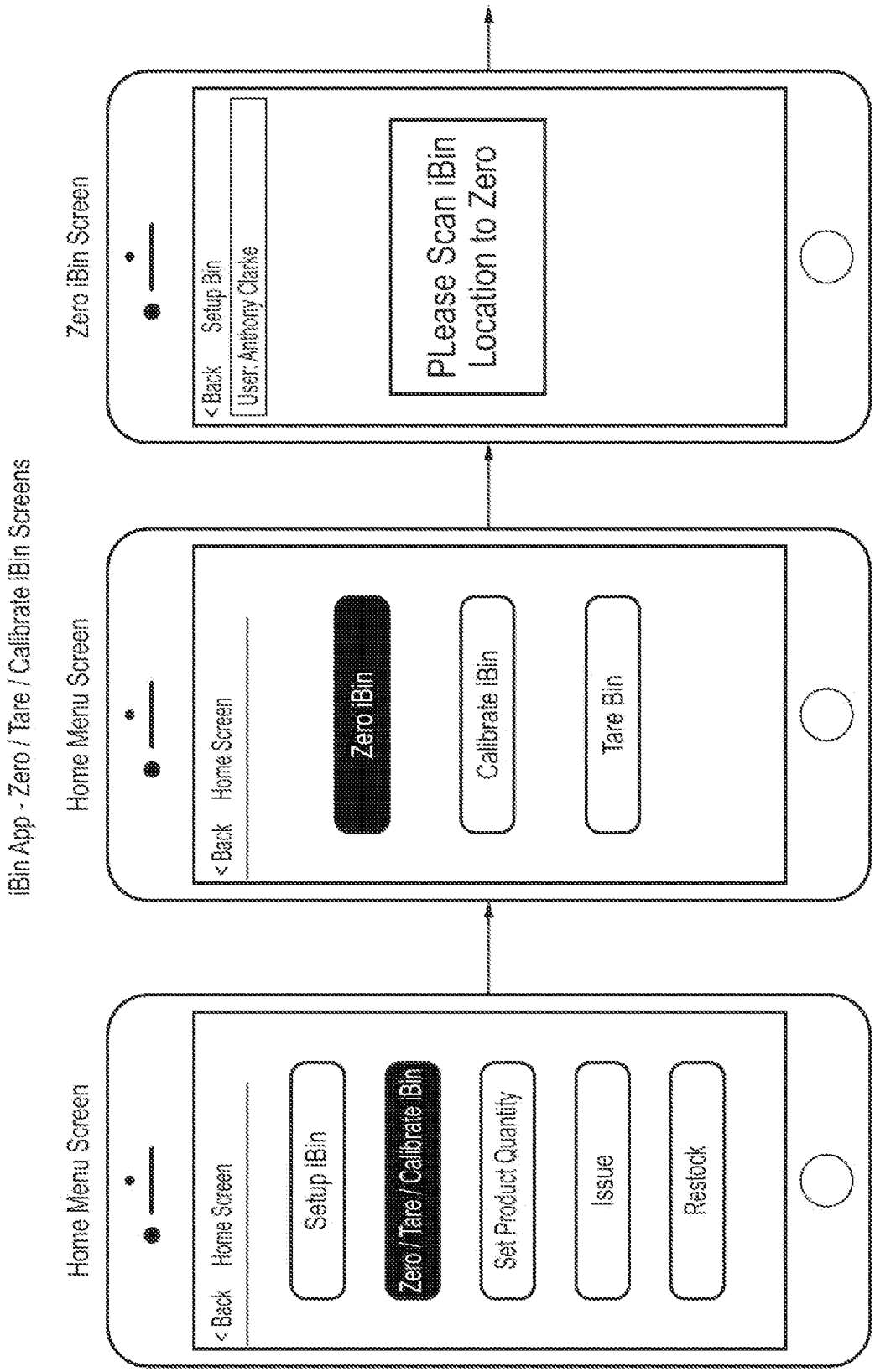
Figure 15G:
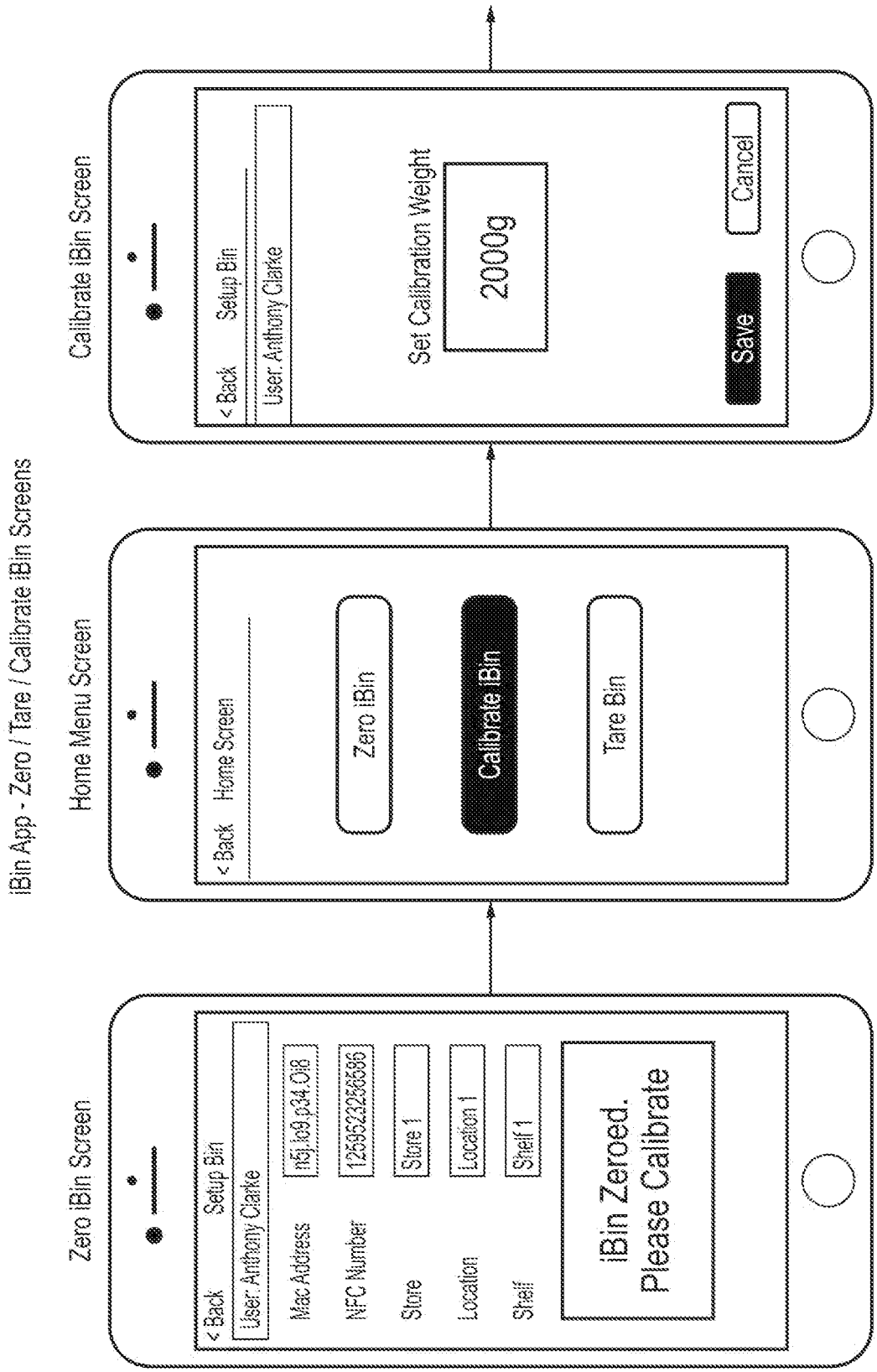
Figure 15G:
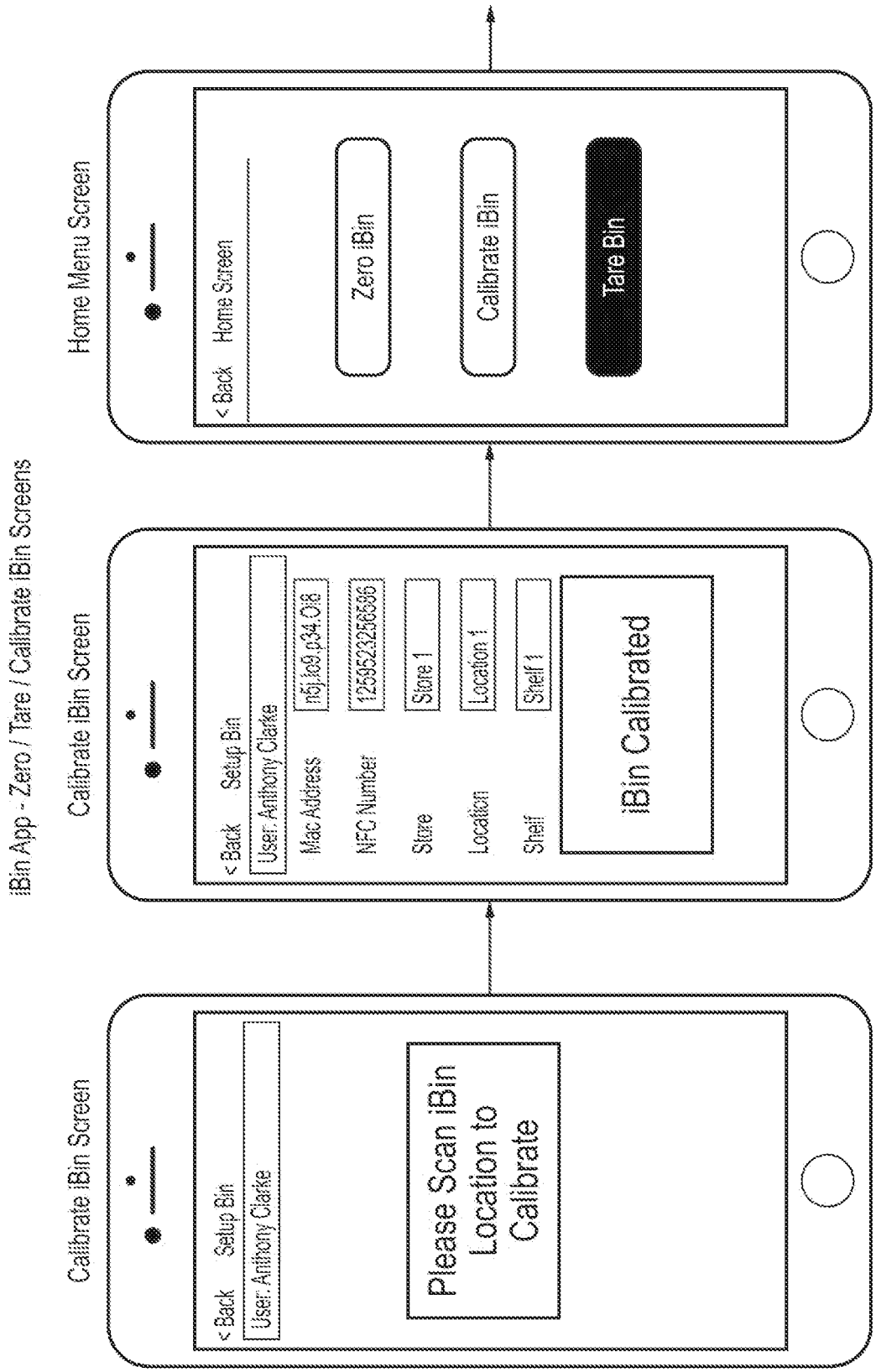
Figure 15G:
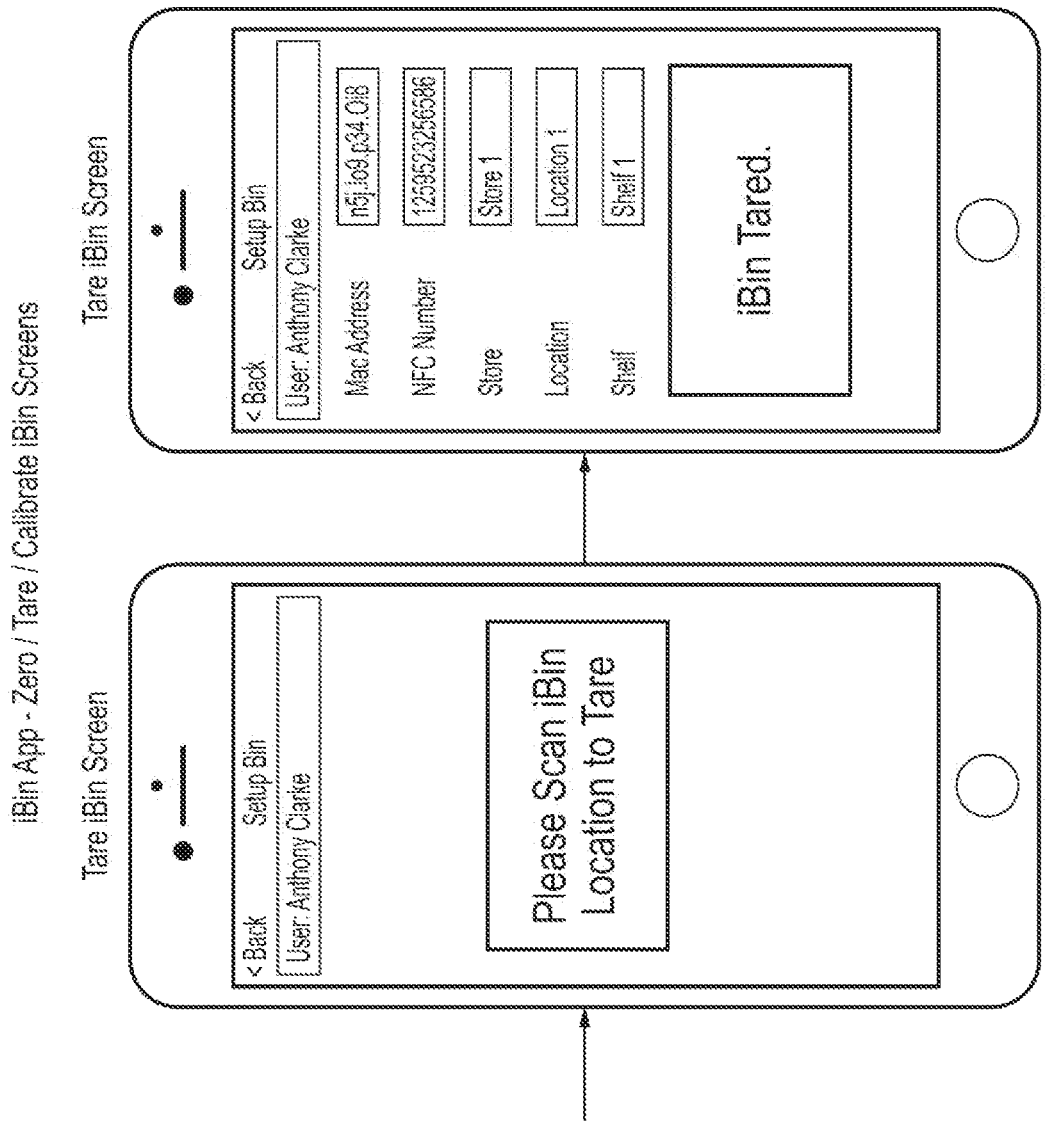
Figure 16A:
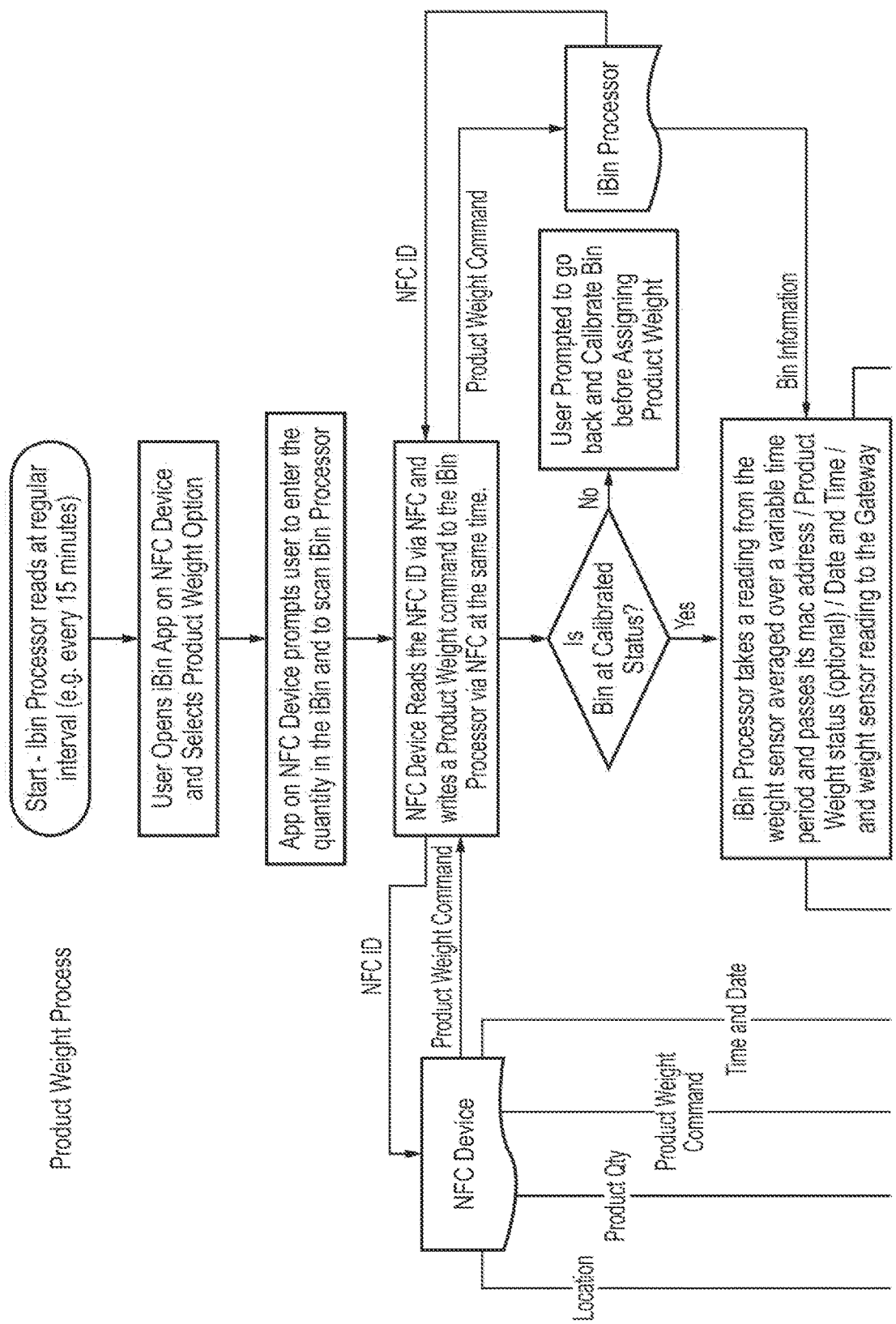
Figure 16A:
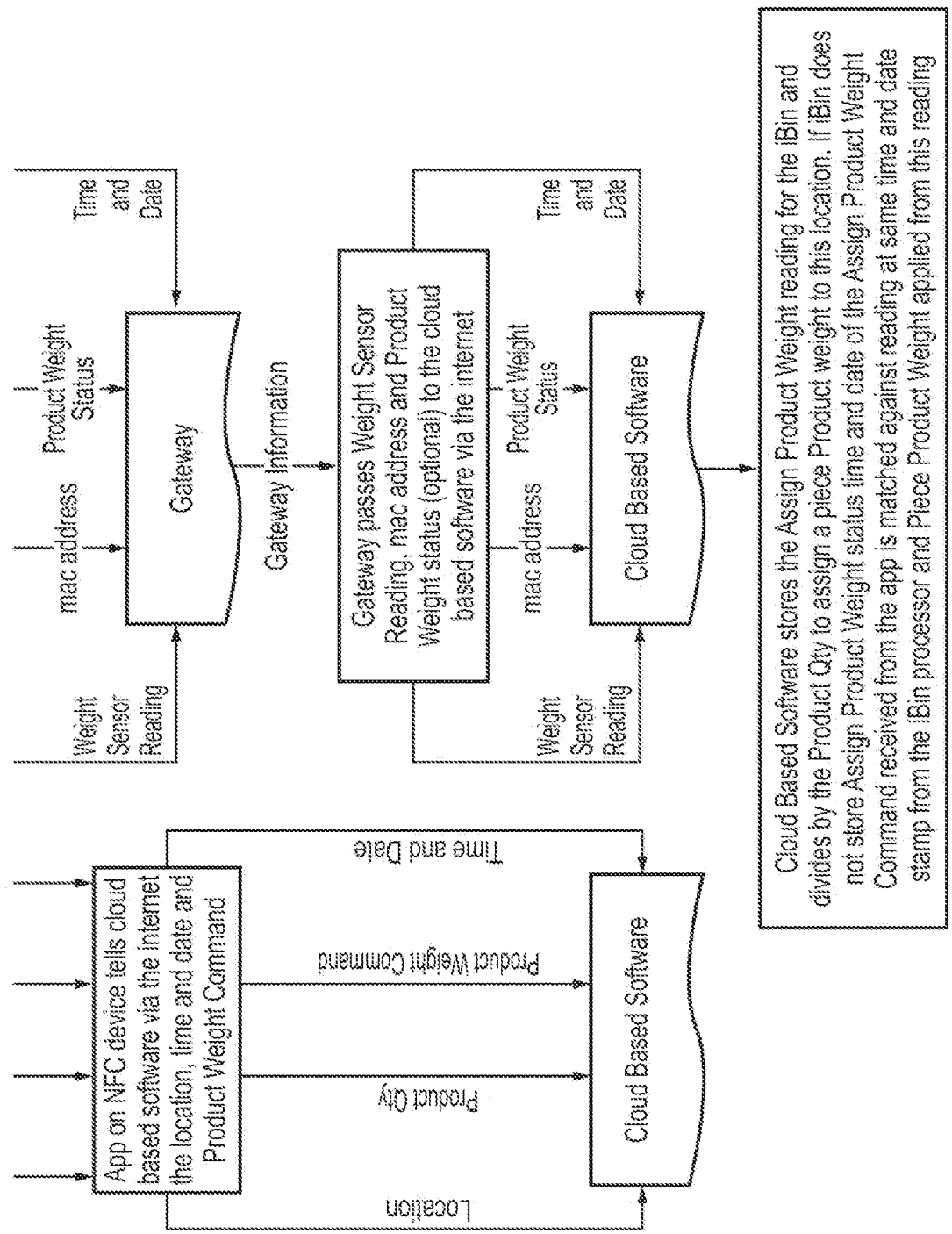
Figure 16B:
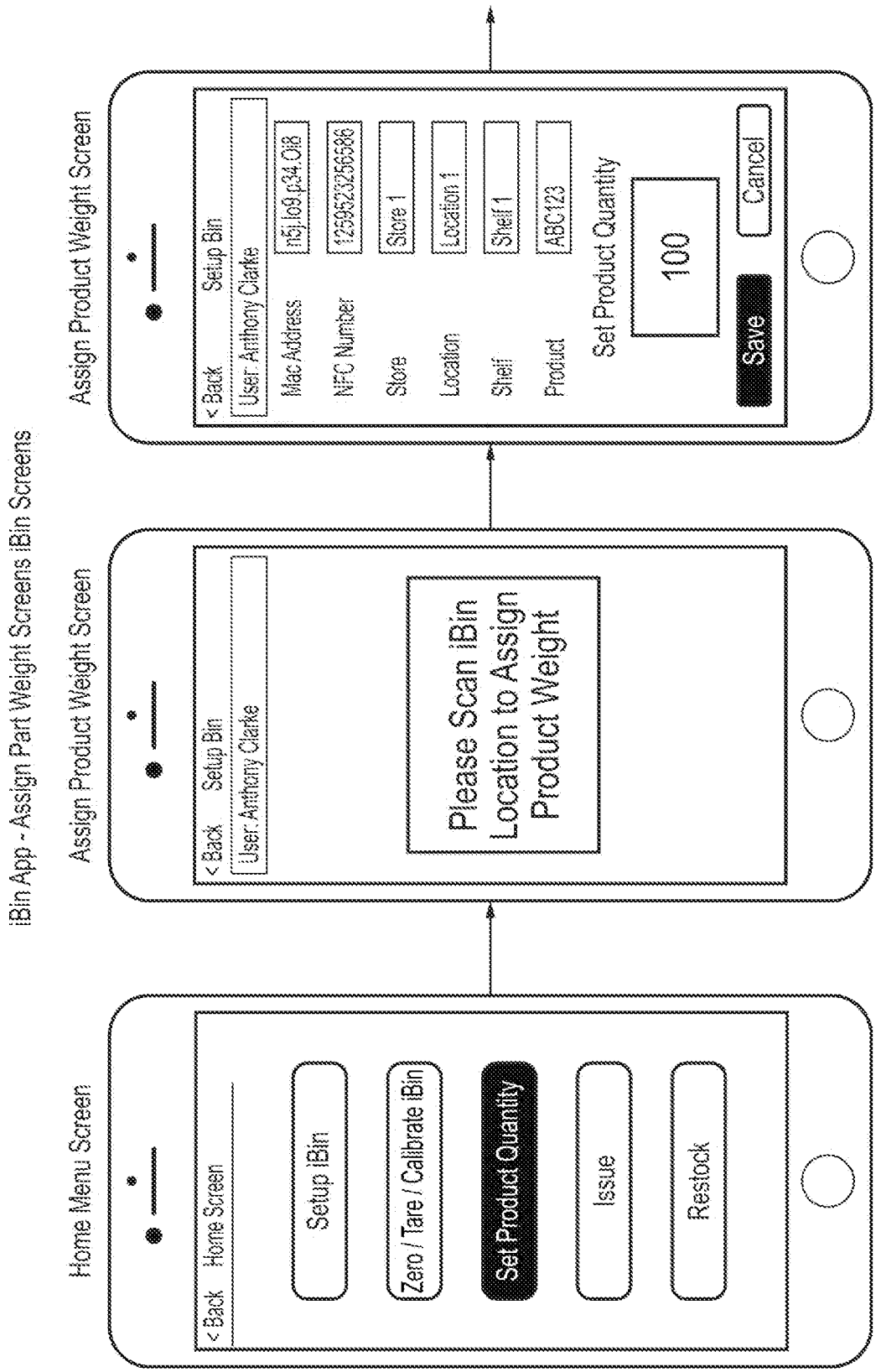
Figure 16B:
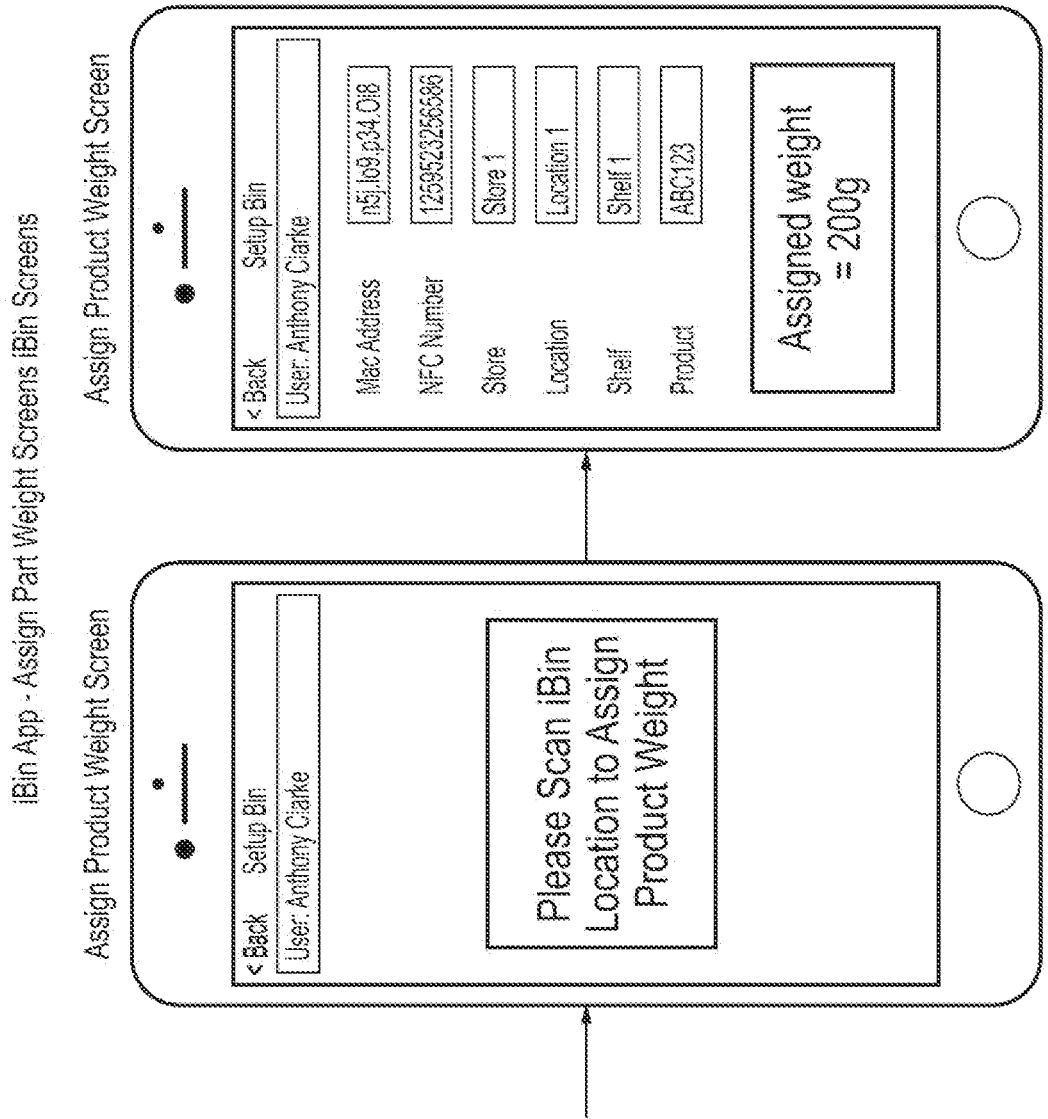

FIGS. 4(a) to 4(h) show various views of a dispensing unit 120a and a weight sensor unit 122a of FIG. 2, according to embodiments;

FIG. 5 is an exploded perspective view of the weight sensor unit 122a of FIG. 2, in an embodiment;

FIGS. 6(a) to 6(e) show various views of a dispensing unit 120a and a weight sensor unit 122a of FIG. 2, according to embodiments, illustrating a battery compartment of the weight sensor unit 122a;

FIG. 7 is a flow chart of the operations performed by a processor 302 (FIG. 3) of the or each weight sensor unit 122, in an embodiment;

FIGS. 8(a) to 8(h) show various views of a dispensing unit 702a and a weight sensor unit 122a of FIG. 2, according to different embodiments, in which a dispensing unit 702 has a different form of container 704a including one or more bin lids 706a, 708a;

FIG. 9(a) is a flow chart of the operations performed by a processor 302 (FIG. 3) of the or each weight sensor unit 122, in an embodiment; FIG. 9(b) is a flow chart of the operations performed in an issue/return process, in an embodiment; FIG. 9(b) is a flow chart of the operations performed in an issue/return process involving multi-compartment configurations, in an embodiment; and FIG. 9(c) is a flowchart of an issue/return process using a multicompartment dispensing unit according to an embodiment;

FIG. 10(a) is a front view of a dispensing enclosure (cabinet 1000) according to an embodiment, and FIG. 10(b) is a schematic block diagram of the internal electronics of the cabinet 1000 of FIG. 10(a), in an embodiment;

FIG. 11(a) is a flow chart of the operations performed by a controller 1012 (FIG. 10(b)) of the cabinet 1000, in an embodiment; FIG. 11(b) is a flow chart of the operations performed by a processor 302 (FIG. 3) of the or each weight sensor unit 122, in an embodiment; and FIG. 11(c) is a flowchart of an issue/return process using a dispensing enclosure having an optical transmitter, according to an embodiment;

FIG. 12 illustrates the internal configuration of an electronic device (portable wireless device) 201 of FIG. 2, in an embodiment;

FIG. 13(a) is a flow chart of the operations performed by a processor 240 (FIG. 12) of the portable wireless device 201, in an embodiment; FIGS. 13(b) and 13(c) show user interface screens displayed on display 204 (FIG. 12) of the portable wireless device 201 during a process, in embodiments; FIG. 13(d) is a flow chart of the operations performed by a processor 302 (FIG. 3) of the weight sensor unit 122a, in an embodiment; and FIG. 13(e) is a flowchart of a process for setting up or changing parameters, according to an embodiment;

FIG. 14(a) is a flow chart of the operations performed by a processor 302 (FIG. 3) of the weight sensor unit 122a, in an embodiment; FIG. 14(b) is a flow chart of the operations performed by a processor 240 (FIG. 1) of the portable wireless device 201, in an embodiment; FIG. 14(c) is a flow chart of the operations performed by a processor of the central control computer 116 (FIG. 1), in an embodiment; FIG. 14(d) is a flowchart of an issue to job code or batch process according to an embodiment;

FIG. 14(e) is a flowchart of a return to job code or batch process according to an embodiment; FIG. 14(f) is a flowchart of a restock process using an app, according to an embodiment; and FIGS. 14(g) to 14(h) show screens that may be displayed by an app on the portable wireless device 201 during the process of FIGS. 14(d) to 14(f), according to an embodiment of FIGS. 14(d) to 14(f);

FIG. 15(a) is a flow chart of the operations performed by a processor 302 (FIG. 3) of the weight sensor unit 122a, in an embodiment; FIG. 15(b) is a flow chart of the operations performed by a processor 240 (FIG. 1) of the portable wireless device 201, in an embodiment; FIG. 15(c) is a flow chart of the operations performed by a processor of the central control computer 116 (FIG. 1), in an embodiment; FIG. 15(d) is a flowchart of a zeroing process according to an embodiment; FIG. 15(e) is a flowchart of a tare process according to an embodiment; FIG. 15(f) is a flowchart of a calibration process according to an embodiment; and FIG. 15(g) shows screens that may be displayed by an app on the portable wireless device 201 during the process of FIGS. 15(d) to 15(f), according to an embodiment; and FIG. 16(a) is a flow chart of operations in an embodiment in which the portable wireless device 201 is used in conjunction with other devices to set a product weight (unit weight for an item/product), in an embodiment; and FIG. 16(b) shows screens that may be displayed during the process of FIG. 16(a).

DETAILED DESCRIPTION

In the following, like numerals will be used to denote like elements. Unless indicated otherwise, any individual design features, components or steps mentioned herein (e.g., in relation to one embodiment) may be used in combination with any other features, components or steps disclosed herein (e.g., in relation to one or more other embodiments).

Embodiments of this disclosure concern systems and methods for providing monitoring of quantities of stock or assets in an accurate and preferably secure manner, in storage environments where hand-portable stock items can be stored and accessed by a user or, more typically, a multitude of different users or employees. Such storage environments are typically found at manufacturing, construction, aerospace, healthcare and other sites. The assets may include tools, consumable materials, and single-use and reusable items. As used herein, "stock item", "item", "product" and "asset" may be used interchangeably; and assets may be referred to generally as "indirect materials" or "inventory".

However, it will be appreciated that techniques according to embodiments of this disclosure may be used in other settings and for other purposes, such where it is desirable to detect conditions or take measurements relating to objects or attributes of the objects, e.g., temperature and pressure sensing, or in the monitoring of the presence or absence of objects or persons.

As noted, in the case of monitoring of quantities of stock or assets, a problem with such systems is that some organisations have thousands of stock items across their sites, accessible via numerous (wired) dispensing units (which are or include bins for the assets) spread across one or multiple locations within a site, and/or across numerous sites, and the process of setting up monitoring and/or tracking of at least removal of stock items by any of numerous users is onerous, inflexible and time consuming.

Figure 1:
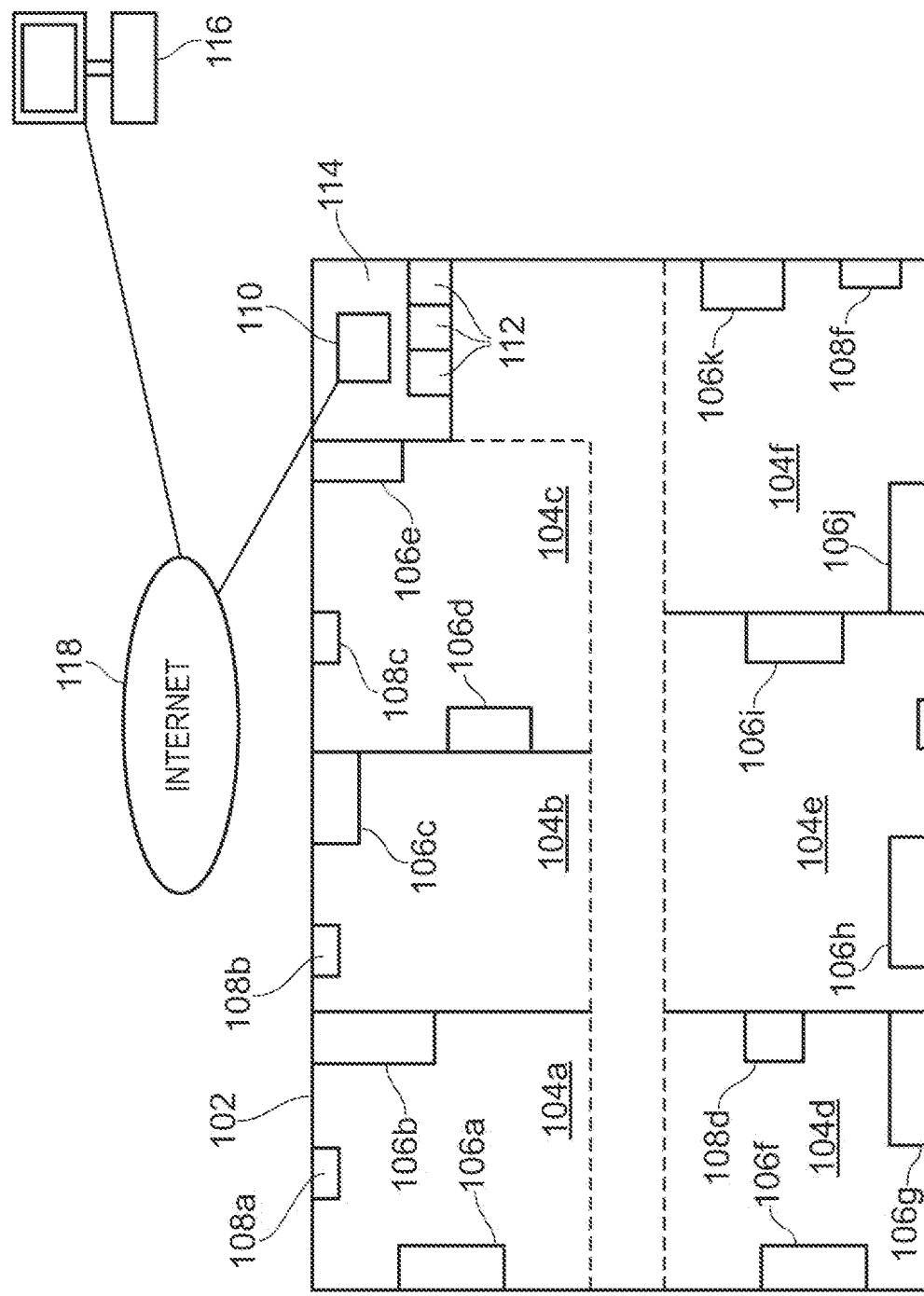
FIG. 1 is a schematic diagram illustrating a distributed stock dispensing, monitoring and/or and tracking system in which techniques according to embodiments of this disclosure can be used.

As used herein, (i) "App" means an application running on the portable wireless device 201 (FIG. 12) and configured to implement one or more of the techniques illustrated and/or described herein, (ii) "NFC device" means a processor-based, NFC-enabled device, such as portable wireless device 201, (iii) "WSU" means weight sensor unit (FIGS. 3-6), and (iv) "cloud based software" means specially configured (e.g. server-executed) software running on the central control computer ("CCC") or server 116 (see FIG. 1). To the extent it is used herein, "iBin" means a weight sensor unit 122a (FIGS. 3-6).

FIG. 1 is a schematic diagram illustrating a distributed stock dispensing and tracking system in which devices and methods according to embodiments of the invention can be used. A manufacturing site or factory 102 may include operational areas 104a to 104f, in which manufacturing and/or repair operations, for example, may performed, requiring, periodically, supply of stock items (not shown). In each operational area 104a to 104f may be one or two respective dispensing stations 106a to 106k. For example, users in operational area 104a may obtain stock items from dispensing stations 106a and 106b, although they may where necessary obtain such items from and of dispensing stations 106a to 106k. In this disclosure, "dispensing" and "dispensing" are used interchangeably, and "dispensing unit" and "dispensing unit" are used interchangeably. For example, using the latter, an operative (user) may replenish his supplies/stock items for manufacturing/maintenance activity, and the overall system dispenses such supplies/stock items.

A respective gateway 108a to 108f may be provided in each operational area 104a to 104f; alternatively, one of the gateways 108a to 108f may serve multiple or all areas operational area 104a to 104f. In use, dispensing devices (not shown) at the dispensing stations 106a to 106k communicate wirelessly with a respective, or with one or more, gateways 108a to 108f, as will be described further below. In this disclosure, "wireless access point" and "gateway" are used interchangeably, and such devices are, in embodiments, to be understood as devices configured to receive signals wirelessly from, and in embodiments transmit signals wirelessly to, first devices (e.g. weight sensor unit as discussed below), and to forward the content of such wireless signals (e.g. as further signals or messages transmitted over a wired or wireless network) to a second device, such as a server, control computer, further gateway, router, etc.

In an embodiment, each gateway 108a to 108f is coupled to router/further gateway 110 and/or local servers 112 in server room 114, e.g., over LAN (not shown). In turn, the router/gateway 110 and/or local servers 112 may communicate with a central computer (central server) 116 via a WAN, e.g., the internet 118. In this disclosure, "central computer", "central control computer", "CCC" and "central server" are used interchangeably to mean the central computer 116 of FIG. 1.

In embodiments, alternatively or additionally one or more of the gateways 108a to 108f comprises a cellular interface (not shown) including or coupled to a cellular antenna (not shown); and, in this manner, one or more of the gateways 108a to 108f may transmit data in signals or messages to central computer (central server) 116 via a cellular network (not shown).

FIG. 2 shows a dispensing station 106a according to an embodiment. In an embodiment, arranged on separate shelves are one or more dispensing units 120a to 120s. In the case of dispensing unit 120a, this comprises a weight sensor unit 122a, and the dispensing unit 120a may further comprise a container, such as bin 124a, the bin 124a being supported, in use, on the weight sensor unit 122a, such as through cooperating (e.g. planar or part-planar) surfaces. As will be appreciated, in a similar manner, each of the other dispensing units 120b to 120s may include a respective weight sensor unit (not labelled), and optionally a respective bin (not labelled). In embodiments involving the use/dispensing of stock items, the bins 124a-124s etc. are configured to receive and/or support stock items (not shown). The bins 124a-124s are suitably made of plastics material. The weight sensor units 122a-122s may be referred to collectively herein as weight sensor units 122. The bins 124a-124s may be referred to collectively herein as bins 124.

As discussed in further detail below, in embodiments, an electronic device (portable wireless device) 201 may interact/communicate wirelessly with any weight sensor units (e.g. weight sensor unit 122a), such as via respective short-range communication interfaces, e.g. NFC interfaces. As used herein, "short-range" means a transmission range (range of reception) lying in the range 0-10 cm.

In embodiments, the dispensing station 106a may be provided with wheels or casters (not shown), so as to be movable, in an untethered fashion, to anywhere throughout the manufacturing site or factory 102.

FIG. 3 is a block diagram of the internal electronics of the weight sensor unit 122a, in an embodiment (all other weight sensor units may be identical or similarly configured). In this embodiment, the weight sensor unit 122a includes a microprocessor 302 which handles all operations of the weight sensor unit 122a. In an embodiment, coupled to the microprocessor 302 is a weight sensor 304 which is physically disposed within a housing (not shown) of the weight sensor unit 122a so as to support the weight of a respective bin 124a. In an embodiment, the weight sensor 304 is a strain gauge type load cell. Accordingly, the weight sensor 304 is configured to provide one or more, e.g. periodic, weight sensor readings indicative of the weight of the bin 124a, e.g. by being polled by the microprocessor 302. A drop in sensed weight corresponds to a stock item being removed from the bin 124a, while an increase in sensed weight corresponds to a stock item being added to the bin 124a. By comparing with unit weights for stock items within that bin 124a, the number of stock items removed or added can be determined (e.g. by the microprocessor 302) based upon the weight sensor readings received. More suitably, in embodiments, such weight sensor readings are transmitted to and received at a remote computer such as central computer 116, at which determinations of a number of items currently present in a bin 124a and/or a number of items removed from or inserted into the bin 124a may be made.

In embodiments, the weight sensor unit 122a includes one or more memory devices, such as ROM 306, in which programs for execution by the processor are stored, and the weight sensor unit 122a may include RAM 306 for execution of the programs.

In embodiments, the weight sensor unit 122a includes a transmitter device (which is suitably a transceiver), for communication unidirectionally or bidirectionally with a respective gateway 108a (see FIG. 1). That is, in embodiments, the transmission device is configured to transmit wireless signals with a signal power sufficient to reach a wireless gateway (or a wireless access point). As used herein, in embodiments, the transmission device is an "intermediate range" transmission device, whereas a cellular interface is considered a "long-range" transmission device. Thus, as used herein, "long-range" means 1 to 10 km or 1 to 50 km.

In embodiments, the transmission device is configured to transmit wireless signals with a signal power providing a range of signal reception lying in the range of (i) 1 to 500 m, (ii) 50 to 500 m, (iii) 50 to 400 m or (iv) 100 to 400 m. Thus, as used herein, "intermediate range" means a transmission range lying within the ranges according to the preceding sentence.

In embodiments, the transmitter device comprises a Bluetooth Low Energy (BLE) interface 308. Wireless signals and/or messages (including weight sensor signals, stock item quantities, commands etc.) may by transmitted by the BLE interface 308 to the gateway 108a, for forwarding to the router/gateway 110 and/or local servers 112 in server room 114, and/or to central computer (central server) 116 (FIG. 1).

In embodiments, the weight sensor unit 122a also includes a (second) transceiver configured for communication with another device (e.g. a user's portable wireless device, such as a smartphone or PDA). In an embodiment, the (second) wireless transceiver is configured to wirelessly interact with devices placed in proximity thereto. For example, the (second) wireless transceiver is a short-range transceiver configured to wirelessly communicate with a respective short-range transceiver of the portable wireless device. Suitably, the transceiver comprises a Near Field Communication (NFC) interface 310. In embodiments, wireless communications (including weight sensor signals, stock item quantities, commands or other data, etc.) may by transmitted by the NFC interface 310 to the portable wireless device (not shown), and/or other wireless signals (including stock item quantities, commands or other data, etc.) may be received therefrom, as will be described in more detail below.

Optionally, the weight sensor unit 122a also includes a bin lid sensor 312, in embodiments where the container (bin) 124a includes a bin lid. The bin lid sensor 312, which alternatively may be disposed within the bin 124a or bin lid, may be configured to provide a signal to the microprocessor 302 indicative of the bin lid transitioning from closed to open. Thus, although illustrated as being part of the weight sensor unit 122a, the bin lid sensor 312 may be part of the bin 124a, as discussed in further detail below. In this respect, as appropriate in embodiments, the bin lid sensor may be an analog device mounted on the bin 124a, and the component labelled 312 may be lid sensor interface 312', such as a thresholding device (e.g. comparator) or an analog-to-digital converter. In any event, in such embodiments, the lid sensor interface 312' is configured to issue or to convey to the microprocessor 302 a lid open signal in the event that a transition of the lid (not shown) from closed to open is detected by the lid sensor and/or a lid close signal in the event that a transition of the lid (not shown) from open to closed is detected by the lid sensor (not shown).

Optionally, the weight sensor unit 122a also includes a temperature sensor (thermometer) 314 configured to provide a signal to the microprocessor 302 indicative of the temperature of the weight sensor unit 122a or the ambient temperature.

Optionally, the weight sensor unit 122a also includes an accelerometer 316 configured to provide a signal to the microprocessor 302 indicative of, for example, whether the weight sensor unit 122a is moving, has moved more than a predetermined amount, and/or of the speed of movement of the weight sensor unit 122a.

Optionally, the weight sensor unit 122a also includes an optical sensor 320. The optical sensor may be an infrared (IR) photodetector or an IR photodiode.

In embodiments, one, any subset or (preferably) all components 302 to 320 within the weight sensor unit 122a are powered, in use, by battery 318. This may be a rechargeable battery, such as a Lithium-ion battery.

An advantage is that the weight sensor unit is an autonomous unit, and can be independently deployed to a wide range of locations. In addition, no connecting up of cabling is necessary, greatly simplifying and expediting the process of deploying a weight sensor unit. For a large number of weight sensor units to be deployed across a site or at multiple sites, the technical installation time and effort is considerably reduced.

FIGS. 4(a) to 4(h) show various views of a dispensing unit 120a and a weight sensor unit 122a according to embodiments. Further, FIG. 5 is an exploded perspective view of the weight sensor unit 122a of FIG. 2. (Any subset of the dispensing units 120b to 120s, the weight sensor units 122b to 122s, and the bins 124b to 124s may be identical.)

Referring initially to FIG. 5, the weight sensor unit 122a includes a housing generally designated 400. In this embodiment, the housing 400 includes an upper housing section 402 and a lower housing section 404. The upper housing section 402 may include an upper front piece 406, an upper housing part 408 and/or an upper end piece 410, with the foregoing components 406-410 assembled by means of screws 412. The lower housing section 404 may include a lower front piece 414, a lower housing part 416 and/or a lower end piece 418, with the foregoing components 414-418 assembled by means of screws 420. Preferably, upper housing part 408 and/or lower housing part 416 is a plastic extrusion, and/or the other components of upper housing section 402 and lower housing section 404 are plastics items, formed from moulds.

In this embodiment, the lower housing part 416 includes a base channel 422, e.g. extending centrally and/or longitudinally and/or defined by base ribs 424 and 426. The base channel 422 is shaped and sized to receive the weight sensor 304 (FIG. 3). The weight sensor 304 may be attached to the lower housing part 416 by means of screws 428. In addition, the weight sensor 304 may be attached to the upper housing part 408 by means of screws 430.

In this embodiment, the lower housing part 416 includes a one or more (here, two) groove portions 432 and 434, which may extend longitudinally and/or parallel to the base channel 422, and/or be disposed at a transverse position between the base channel 422 and a respective distal edge of the lower housing part 416. The or each groove portion 432 and 434 may be shaped and sized to receive a respective anti-vibration member 436, 438, which may be a foam or foam rubber member. The or each anti-vibration member 436, 438 may be an elongated foot member and/or may have a length of 90-100% of the length of the respective groove portion 432, 434.

In an embodiment, the lower front piece 414 includes one or more (here, two) chambers 440 and 442, which may extend longitudinally and/or parallel to the base channel 422. Each chamber 440, 442 is shaped and sized to receive a respective battery 318 (FIG. 3); and the battery(ies) 318, 318' powers one, a subset or all of the components of the weight sensor unit 122a.

In an embodiment, engaging the lower housing section 404 is a faceplate assembly 444. In this embodiment, the faceplate assembly 444 comprises, e.g. in sequence in the longitudinal direction, a faceplate 446, a PCB 448 and an endplate 450. In embodiments, the circuit of FIG. 3 is incorporated in the PCB 448.

In an embodiment in which the circuit of FIG. 3 includes an optical sensor 320, a window 452 and/or an optical channel (not shown) may be provided in the faceplate 446 in order to convey optical energy to the optical sensor 320. Alternatively, the optical energy receiving portion of the optical sensor 320 may be exposed at or protrude from the window 452.

In embodiments, the bins 124 and weight sensor units 122 may include cooperating elements whereby each weight sensor unit 122 engages a respective bin 124 in a supporting configuration and/or each weight sensor unit 122 is detachably physically coupled to a respective bin 124.

In embodiments, the bins 124 have on one or more lower edges thereof an elongate flange part. For example, in an embodiment illustrated in FIG. 4(f), at right lower lateral edge 460, left lower lateral edge 462 and/or rear lower lateral edge 464 are elongate flange parts 466, 468 and 470, respectively. In embodiments, one, some or all of the elongate flange parts 466, 468 and 470 are integral with the rest of the bin 124a. In embodiments, one, some or all of the elongate flange parts 466, 468 and 470 extend partly or fully along the length of a respective edge 460, 462 and 464.

Figure 4A:
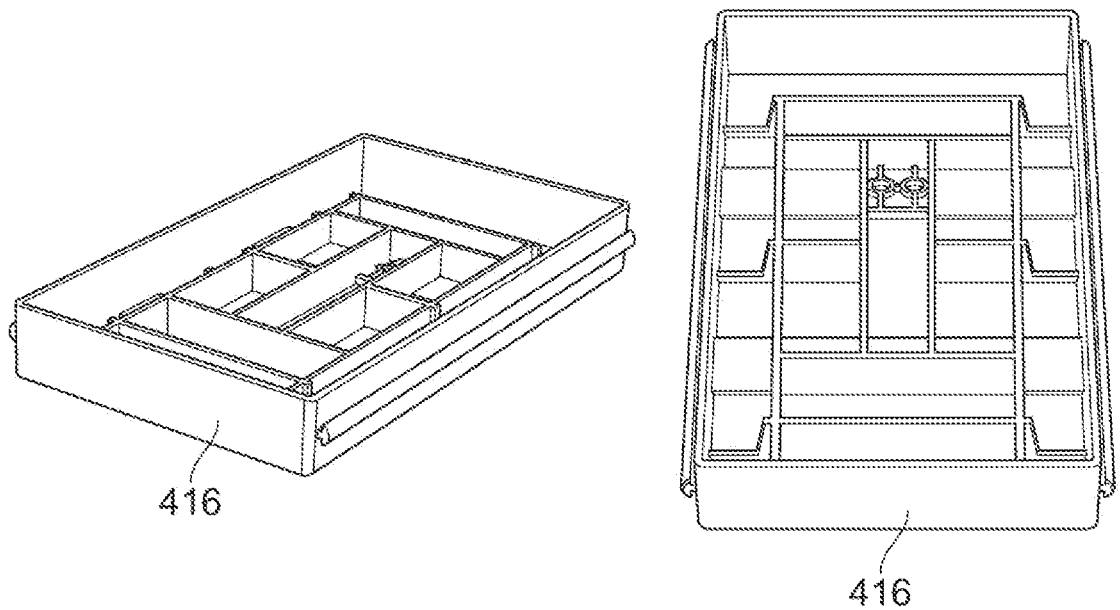
Figure 4B:
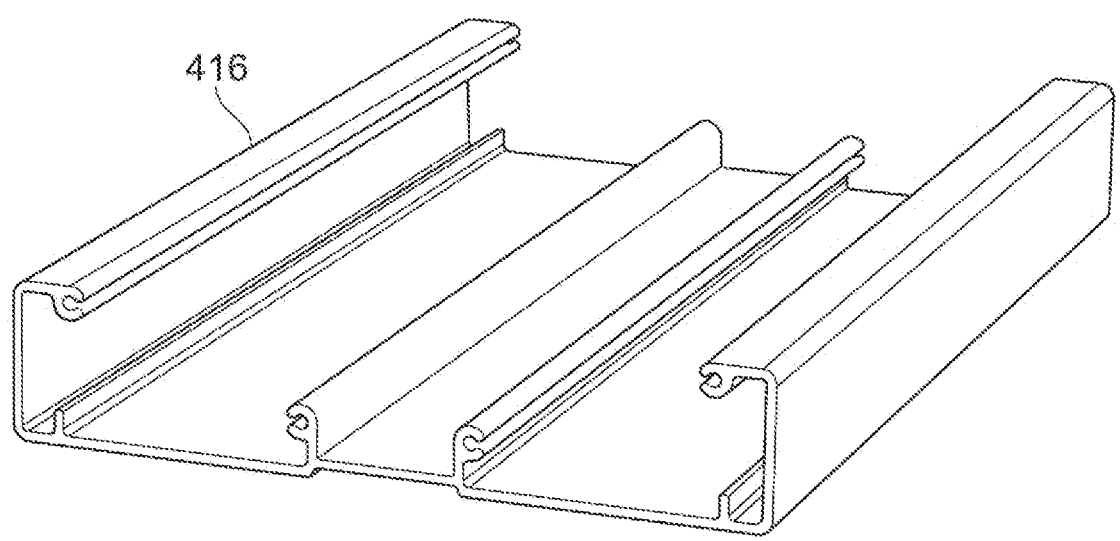
Figure 4C:
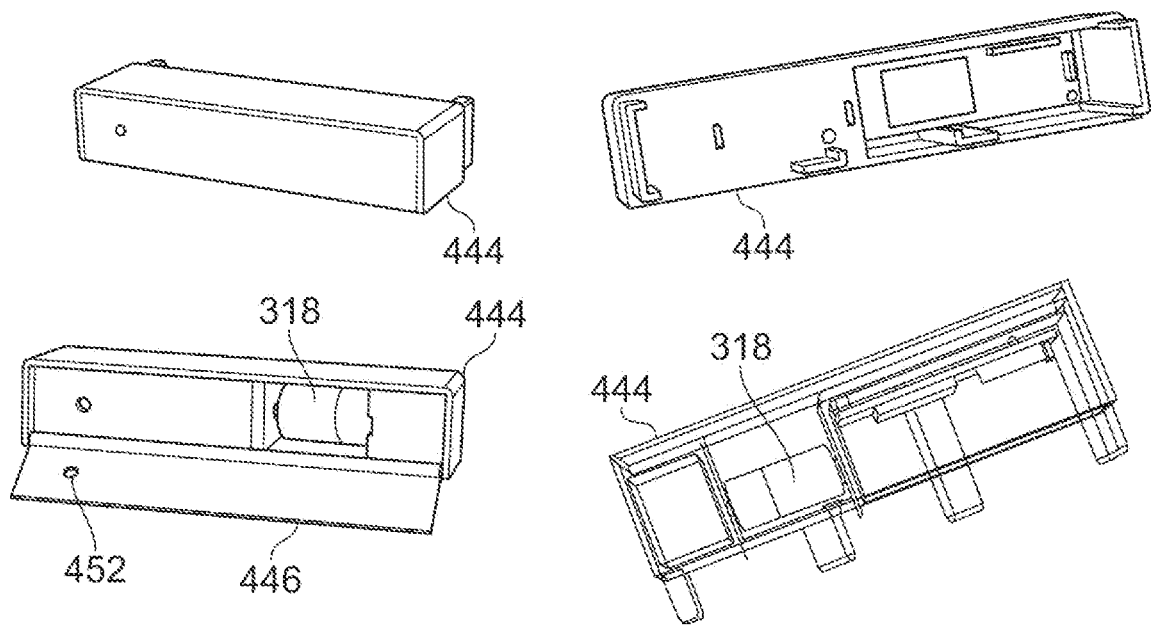
Figure 4D:
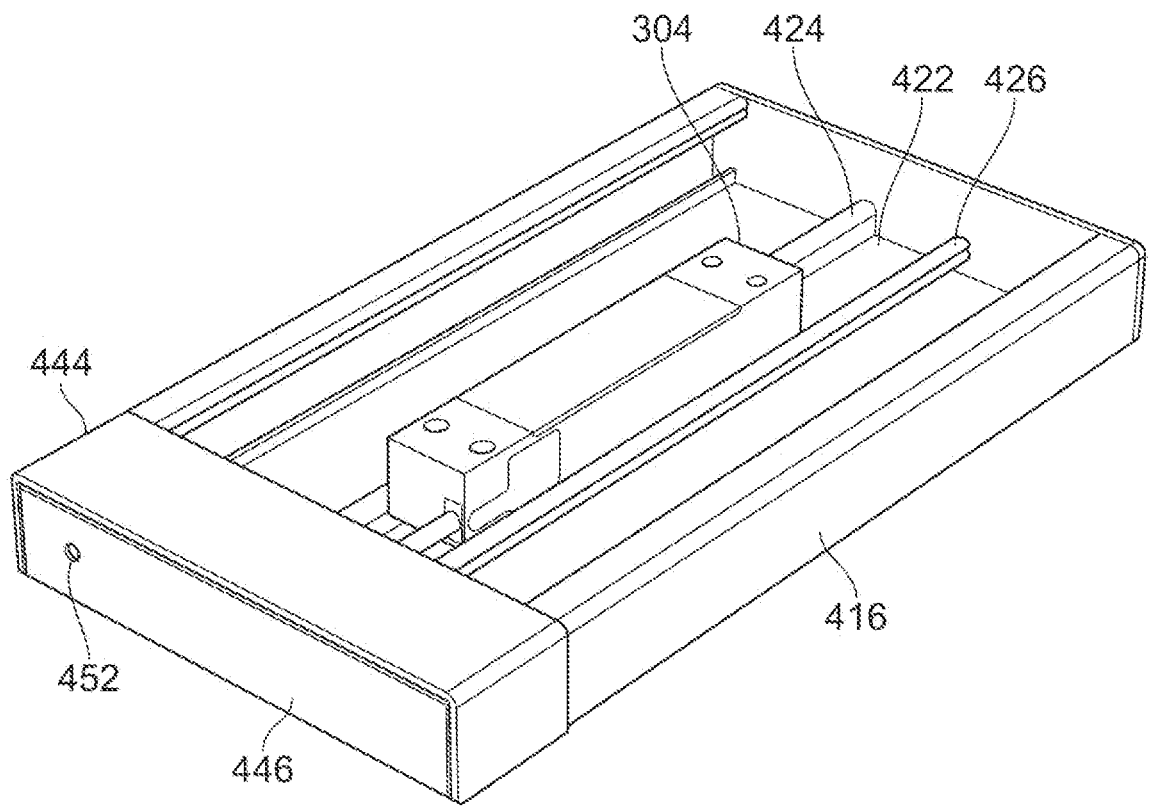
Figure 4E:
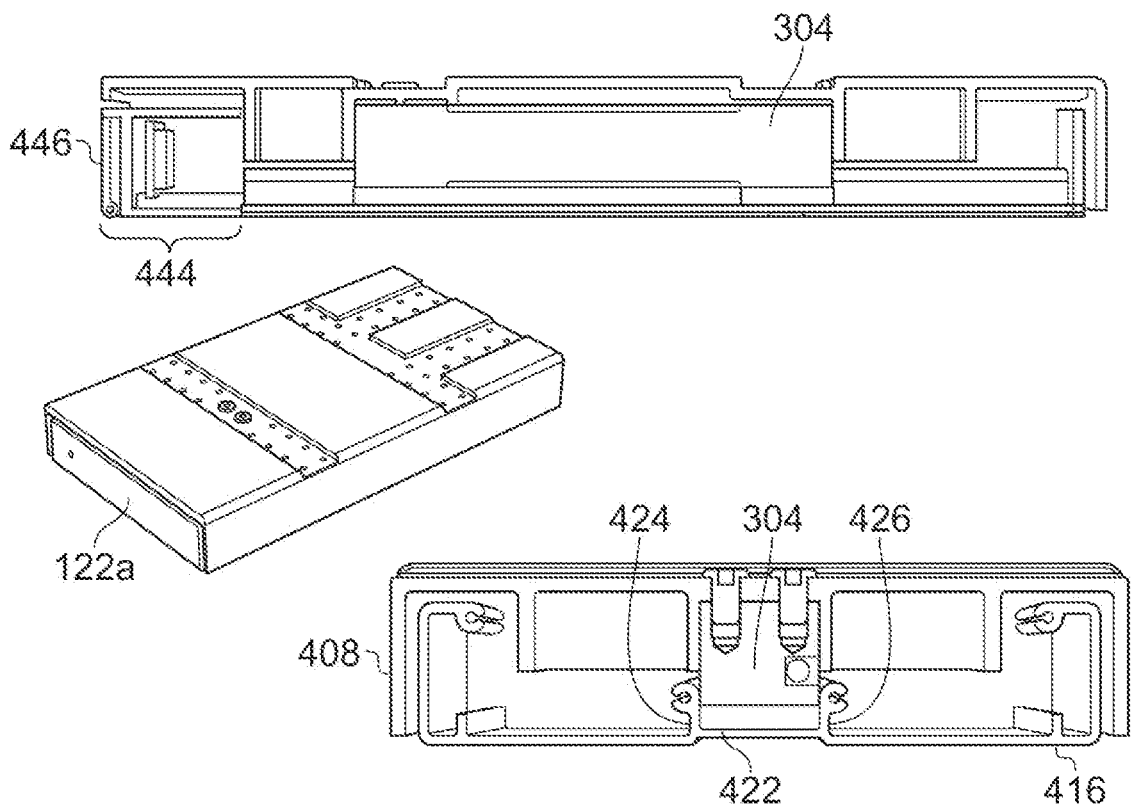
Figure 4F:
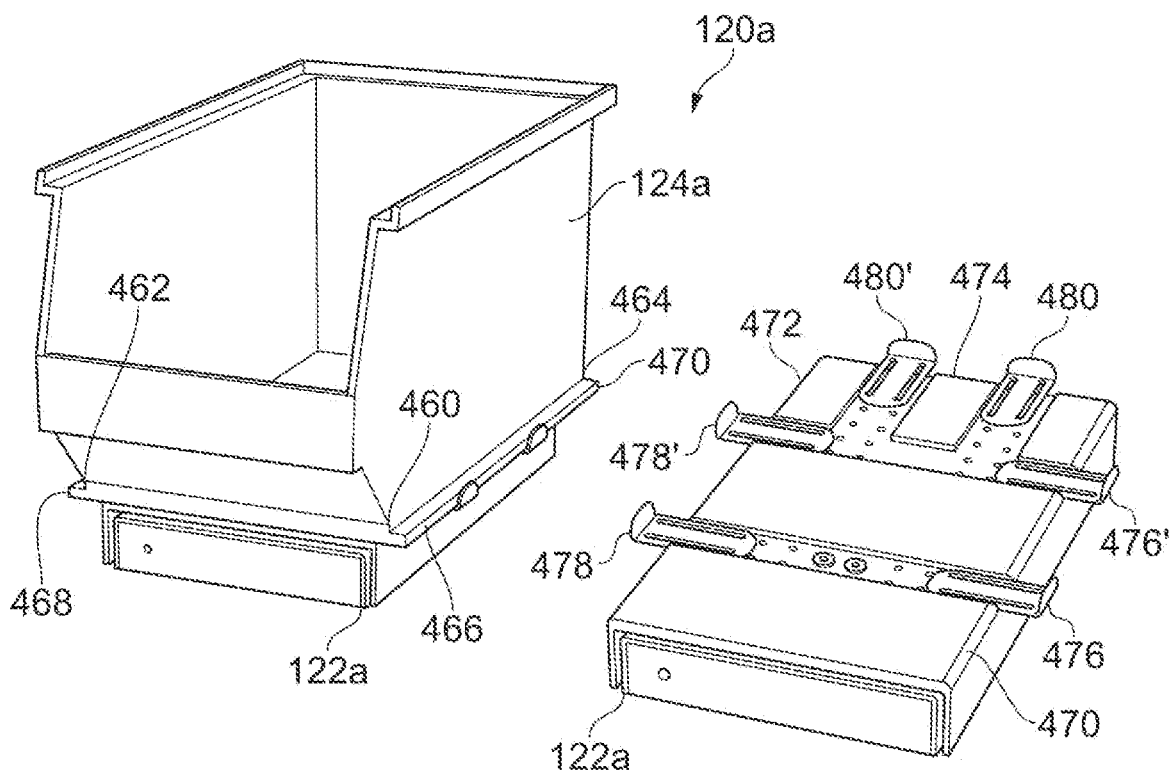

In embodiments, weight sensor units 122 have, protruding transversely from one or more upper edges thereof, one or more retention members. In the embodiment of FIG. 4(f), at right upper lateral edge 470, left upper lateral edge 472 and/or rear upper lateral edge 474 of weight sensor unit 122a are disposed at least one respective retention member 476, 478, 480. In this embodiment, at right upper lateral edge 470, left upper lateral edge 472 and/or rear upper lateral edge 474 of weight sensor unit 122a are disposed respective pairs of retention members: 476, 476; 478, 478' and 480, 480'. In embodiments, one, some or all of the retention members 476, 476; 478, 478' and 480, 480' have an "L" shape longitudinal cross section. In embodiments, the long part of the "L" extends parallel to an upper surface of the weight sensor unit 122a and/or a at least a distal end thereof is attached to said surface, e.g. through snap fit or by screwing. In embodiments, the short part of the "L" extends perpendicular to an upper surface of the weight sensor unit 122a and/or extends vertically up from a proximal end of the long part of the "L".

Figure 4G:
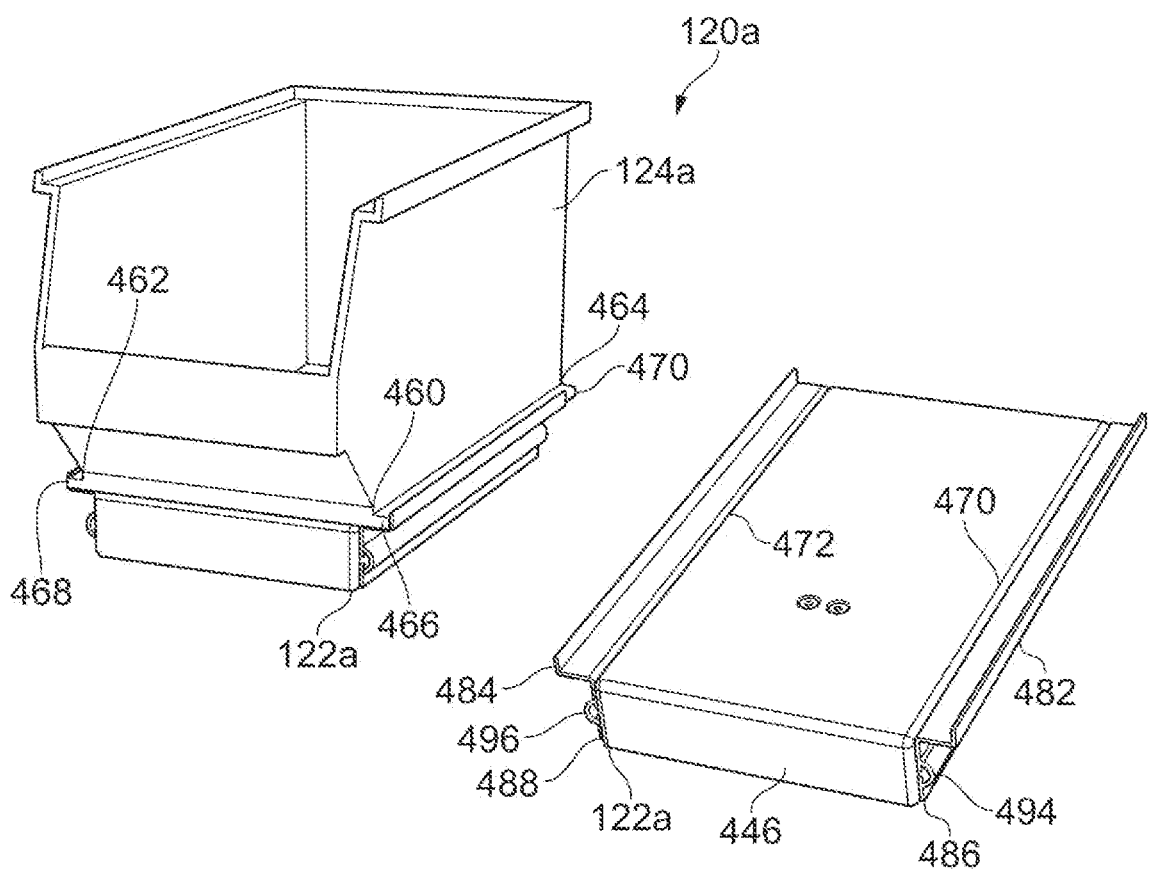
Figure 4H:
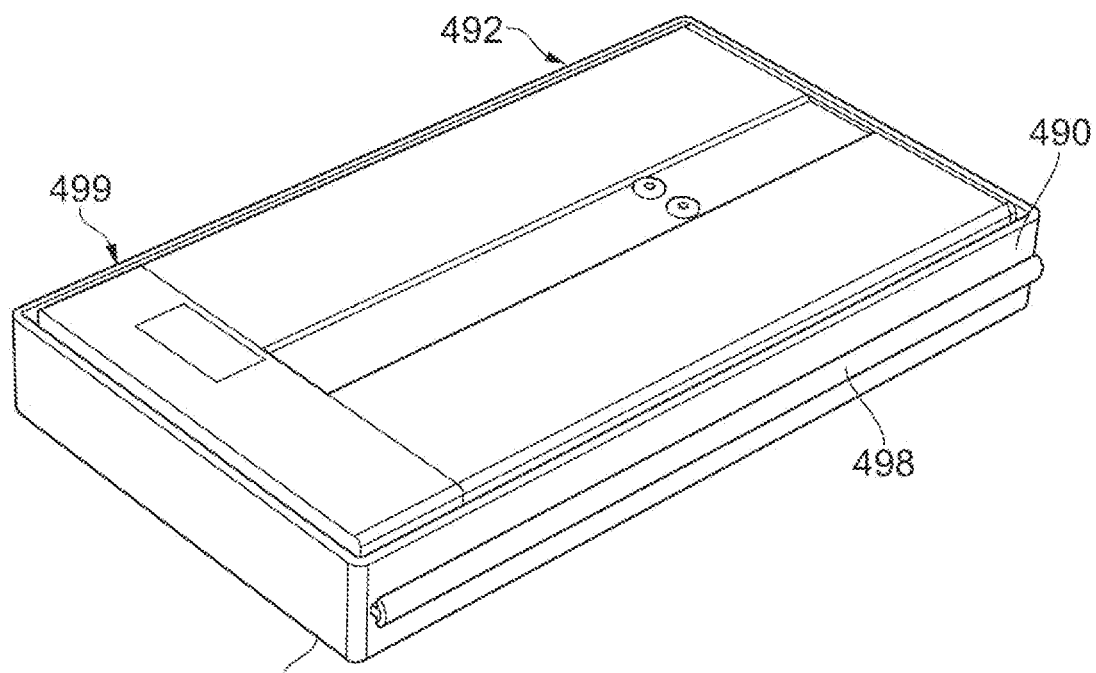

In the embodiment of FIG. 4(g), at right upper lateral edge 470 and left upper lateral edge 472 of weight sensor unit 122a are disposed at least one respective retention member 482, 484. In this embodiment, the or each retention member 482, 484 may extend partly or fully along the length of a respective edge 470, 472. In embodiments, one or both of the retention members 482, 484 have an "L" shape longitudinal cross section. In embodiments, the long part of the "L" extends parallel to an upper surface of the weight sensor unit 122a and/or at least a distal end thereof is attached to the weight sensor unit 122a. In embodiments, the short part of the "L" extends perpendicular to an upper surface of the weight sensor unit 122a and/or extends vertically up from a proximal end of the long part of the "L". In embodiments, the distal end of the long part of the "L" is attached to or integral with a respective mounting piece 486, 488 configured to be attached to a respective side 490, 492 (see FIG. 4(h)) of the weight sensor unit 122a. In an embodiment, each mounting piece 486, 488 includes a mounting channel 494, 496 configured to be mounted on a respective elongate mounting flange 498, 499 on a respective side 490, 492 of the weight sensor unit 122a.

The weight sensor unit 122a according to the features of any one of the preceding eleven paragraphs, and/or as described with reference to any of FIGS. 5(a) to 5, may be provided independently of the other features, e.g. electronics, of weight sensor unit 122a disclosed herein and/or independently of the use of batteries (i.e. in the latter embodiment, the weight sensor unit 122a may be mains powered).

FIGS. 6(a) to 6(e) show various views of a dispensing unit 120a and a weight sensor unit 122a according to embodiments, illustrating a battery compartment generally designated 602 (and including chambers 440, 442) of the weight sensor unit 122a, a cover thereof (formed by face plate assembly 444) and the disposition of batteries 318, 318' within the battery compartment 602.

Autonomous weight reading reporting.

FIG. 7 is a flow chart of the operations performed by a processor 302 (FIG. 3) of the or each weight sensor unit 122, in an embodiment. Initially, the processor 302 waits for receipt of a weight sensor reading from the weight sensor 304. The receipt of the weight sensor reading may be in response to polling by the processor 302 and/or triggered by some other ever, as discuss in further detail hereinafter.

If it is determined (block s702) that weight sensor reading has been received, the processor 302 transmits (block s706) the one or more weight sensor readings wirelessly using the transmission device (e.g. BLE interface 308 in FIG. 3).

Optionally, prior to transmitting, the processor 302 receives a weight sensor reading output by the weight sensor 304 and constructs (block s704) a weight sensor reporting message, the weight sensor reporting message including the weight sensor reading, and transmits the weight sensor reporting message using the transmission device 308.

In an embodiment, the weight sensor reporting message also includes identifying data related to the dispensing unit 120a or to the weight sensor unit 122a. In an embodiment, the weight sensor unit 122a has a weight sensor unit ID and/or a weight sensor unit type ID, and the identifying data comprises or additionally includes the weight sensor unit ID and/or the weight sensor unit type ID. In an embodiment, the transmission device 308 has a transmission device ID (e.g. BLE ID) and/or a transmission device type ID, and the identifying data comprises or additionally includes the transmission device ID and/or the transmission device type ID. In an embodiment, the container (bin 124a) has a container ID and/or a container type ID, and the identifying data comprises the container ID and/or the container type ID. In an embodiment, the container ID is unique to the container (bin 124a), the weight sensor unit ID is unique to the weight sensor unit and/or the transmission device ID is unique to the transmission device 308.

In an embodiment, the processor 302 is configured to repeatedly poll the weight sensor for a weight sensor reading with a predetermined periodicity T. In embodiments, (i) T is in the range 1 to 10 minutes, (ii) T is in the range 2 to 5 minutes or (iii) T is 3 minutes.

In an embodiment in which the weight sensor unit is used in a stock monitoring system for monitoring the quantity of stock items in a respective dispensing unit 120a and or the number of stock items removed from or inserted/returned into a respective dispensing unit 120a, processing may proceed according to the central portion of FIG. 9(b), i.e. after the "event trigger" is received.

Due to being battery powered, the weight sensor unit 122a is able to be placed anywhere within the range of the (Bluetooth) gateway, greatly enhancing the flexibility of real time inventory control. An individual weight sensor unit 122a can be moved from manufacturing cell to manufacturing cell and continue to work seamlessly within, e.g., up to 400 metres with Bluetooth 5.0 in line of sight of the nearest (BLE) gateway 108a. In addition, racks of weight sensor units 122 can be on wheels and moved around factories and MRO (Maintenance Repair and Overhaul) facilities, so inventory can be moved to point-of-use easily. Closable dispensing units with trigger.

FIGS. 8(a) to 8(h) show various views of a dispensing unit 702a and a weight sensor unit 122a according to different embodiments. These are the same as the embodiments of FIGS. 1-6, except as described otherwise hereinafter. In the embodiments of FIGS. 8(a) to 8(h), the dispensing unit 702 has a different form of container (bin 704a) including one or more bin lids. In an embodiment, one of the bin lids is in the form of a top flap 706a. Preferably, the top flap 706a clips into mounting points at the rear of the bin 704a. In this way, the bin lid 706a may be rotatably about a transverse axis through points at the upper rear edge of the bin 704a.

In an embodiment, one of the bin lids is in the form of a front door 708a, for example that clips into mounting points at the front of the bin 704a. In an embodiment, the bin lid 708a is rotatable about a transverse axis through points at the front of the bin 704a, e.g. points disposed part way up the height of the bin 704a. In an embodiment, the bin lid 708a is rotatable from a closed position (in which the bin 704a is closed and items therein are inaccessible) to an open position (in which the bin 704a is open and items therein are accessible).

Figure 8A:
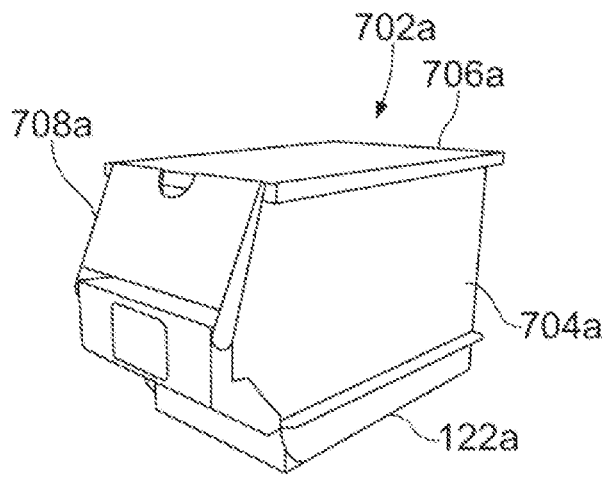
Figure 8B:
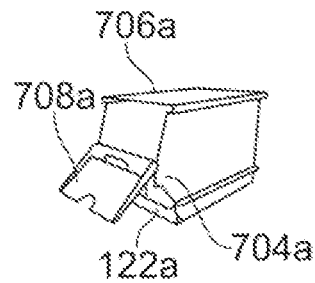
Figure 8C:
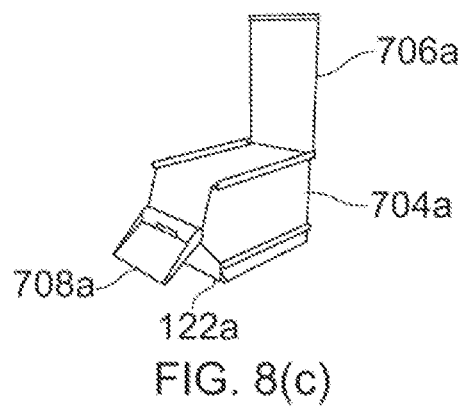
Figure 8D:
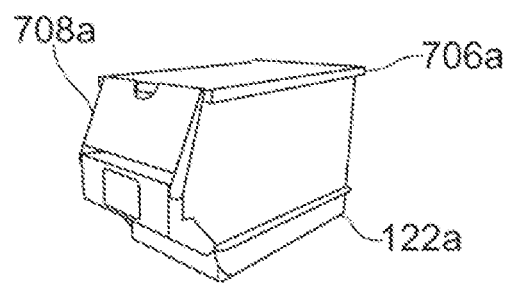
Figure 8E:
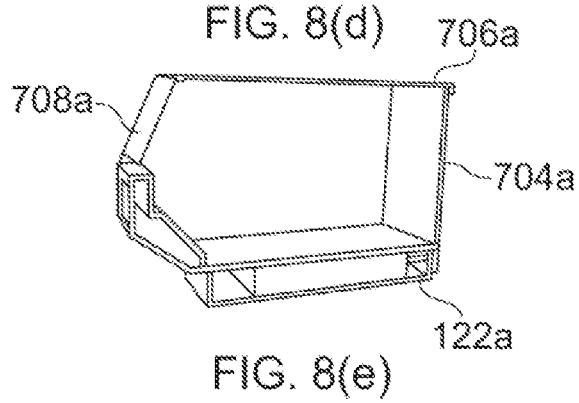
Figure 8F:
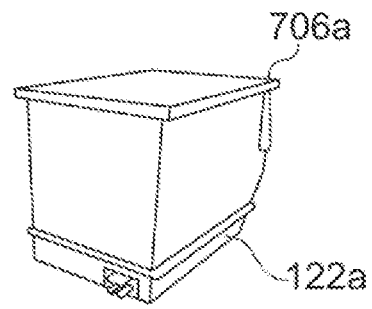
Figure 8G:
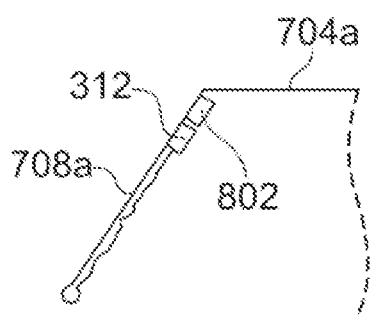
Figure 8H:
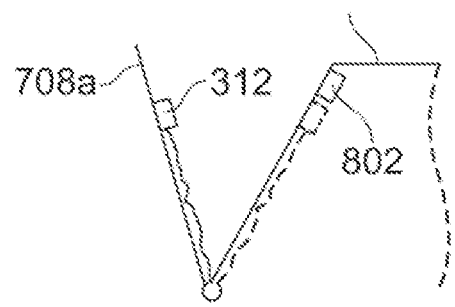

Referring to FIG. 8(g) (bin lid 708a closed) and FIG. 8(h) (bin lid 708a open), in an embodiment, the bin lid sensor 312 comprises an accelerometer, or a reed switch whereby in the latter case an actuating member of the reed switch moves into an out of engagement with contacts as bin lid 708a moves from closed to open, or vice versa. In an embodiment (FIGS. 8(g) and 8(h)), a magnet 802 is mounted on one of the bin 704a and the bin lid 708a and the bin lid sensor 312 comprises a hall effect sensor mounted on the other of the bin 704a and the bin lid 708a.

In embodiments, upon opening or closing of the bin lid 708a, the bin lid sensor 312 within the container (bin 704a), bin lids 706a, 708a or weight sensor unit 122a senses the change and issues (to the processor 302 of the weight sensor unit 122a), a bin lid open signal or a bin lid closed signal, respectively.

The dispensing unit 702a according to the features of any one of the preceding four paragraphs, and/or as described with reference to any of FIGS. 8(a) to 8(h), may be provided independently of all the other features, e.g. electronics, of weight sensor unit 122a disclosed herein and/or independently of the use of batteries. In the latter embodiment, the weight sensor unit 122a may be mains powered, and be provided with a socket (e.g. CAN socket for power and communications) at the rear of the weight sensor unit 122a.

As noted above, in an embodiment, the bin 704a is configured to receive or support stock items (not shown) and includes a lid 708a. In an embodiment, a lid sensor 312 on the container or lid is configured to issue at least a lid open signal in the event that a transition of the lid from closed to open is detected by the lid sensor.

FIG. 9(a) is a flow chart of the operations performed by a processor 302 (FIG. 3) of the or each weight sensor unit 122, in an embodiment. First, the processor waits (block s902) for an input from the lid sensor 312 (i.e. a lid open signal). If such signal has been issued by the lid sensor 312, the lid open signal is received at block s904. Then, only after receipt of the lid open signal, one or more weight sensor readings output by the weight sensor 304 are received (block s906). Then, the one or more weight sensor readings are transmitted (block s908) using the transmission device (e.g. BLE interface 308 in FIG. 3).

In an embodiment, the lid sensor 312 is further configured to issue a lid close signal in the event that a transition of the lid 708a from open to closed is detected by the lid sensor 312. In this embodiment, the processor 302 is further configured to: only after receipt of the lid close signal, receive one or more weight sensor readings output by the weight sensor 304, and transmit the one or more weight sensor readings using the transmission device 308. In an embodiment, the processor 302 is configured to transmit the one or more weight sensor readings using the transmission device 308 only after receipt (i) of the lid open signal and (ii) the lid close signal within a predetermined timeout period after the lid open signal.

In an embodiment, the transmission device 308 is configured to be operated in one of at least a first state in which the transmission device consumes power P1, and in a second state, in which the transmission device 308 consumes power P2, wherein P2 is greater than P1. In an embodiment, the processor 302 is configured to switch the transmission device 308 from the first state to the second state only after only after receipt (i) of the lid open signal and/or (ii) the lid close signal within a predetermined timeout period after the lid open signal. In an embodiment, in the first state the transmission device 308 is in deactivated mode, and in the second state the transmission device 308 is in activated mode whereby it is able to transmit the wireless signals. In an embodiment, (i) P1 is 2 to 50 times P2, or P1 is 5 to 15 times P2 or P1 is 10 times P2 and/or (ii) P3 is 2 to 50 times P4, or P3 is 5 to 15 times P4 or P1 is 10 times P2.

In an embodiment, after the lid close signal and until the next lid open signal the processor 302 is configured to repeatedly poll the weight sensor 304 for a weight sensor reading with a predetermined periodicity T. In embodiments, (i) T is in the range 1 to 10 minutes, (ii) T is in the range 2 to 5 minutes or (iii) T is 3 minutes.

In an embodiment, the processor 302 is configured to transmit the wireless signals using the transmission device 308 at a given time at a settable signal strength S, corresponding to a range R of signal reception. In an embodiment, (i) the signal strength S corresponds to a range R of signal reception lying in the range of (i) 1 to 500 m, (ii) 50 to 500 m, (iii) 50 to 400 m or (iv) 100 to 400 m.

In an embodiment, after the lid open signal and until the next lid close signal the processor 302 is configured to repeatedly poll the weight sensor to obtain a weight sensor reading, and to average the weight sensor reading obtained over a predetermined period lying within or contemporaneous with the period between the lid open signal and until the next lid close signal. In an embodiment, the processor 302 is configured to: poll the weight sensor 304 to obtain a weight sensor reading in response to receipt of the lid open signal; and/or poll the weight sensor to obtain a weight sensor reading in response to receipt of the lid close signal; and/or average weight sensor readings in a period commencing at a time point a first predetermined delay period after the lid open signal and/or ending at the next lid close signal.

In an embodiment in which the weight sensor unit is used in a stock monitoring system for monitoring the quantity of stock items in a respective dispensing unit 120a and or the number of stock items removed from or inserted/returned into a respective dispensing unit 120a, processing may proceed according to the flowchart of FIG. 9(b).

In an embodiment, a dispensing arrangement comprises a housing (not shown), wherein a plurality of compartments are configured or disposed within the housing. In this embodiment, each compartment is configured as a dispensing unit as described above with reference to any of FIGS. 3 and 5 to 9(a).

In an embodiment, a dispensing enclosure comprises a housing, a door mounted on the housing, whereby the door is openable and closable by a user, and one or more shelves mounted internally within the housing. In an embodiment, one or more dispensing units as described above with reference to any of FIGS. 3 and 5 to 9(a) is disposed on one or more of the shelves.

For the dispensing arrangement or the dispensing enclosure of the preceding two paragraphs, in embodiments, for each dispensing unit, the processor thereof the corresponding dispensing unit is configured to (i) obtain the weight sensor readings and/or (ii) transmit the one or more weight sensor readings using the transmission device, independently of the processor of the or each other dispensing unit. For the dispensing arrangement or the dispensing enclosure of the preceding two paragraphs, in embodiments, (i) the weight sensor readings are obtained and/or (ii) the one or more weight sensor readings are transmitted using the transmission device, only by the respective processor of those dispensing units in which the lid open signal and/or the next lid close signal is received.

In an embodiment in which the weight sensor unit is used in a stock monitoring system for monitoring the quantity of stock items in a respective dispensing unit 120a and or the number of stock items removed from or inserted/returned into a respective dispensing unit 120a, processing may proceed according to the flowchart of FIG. 9(c). To the extent appropriate, the operations of FIGS. 9(a) and 9(b) may be combined with one, some or all of the operations in FIG. 9(c).

FIG. 10(a) is a front view of a dispensing enclosure (cabinet 1000) according to an embodiment, and FIG. 10(b) is a schematic block diagram of the internal electronics of the cabinet 1000. As used herein, in embodiments the cabinet 1000 is also referred to as a vending solution.

In an embodiment, the cabinet 1000 comprises a housing 1002, one or more shelves 1004 mounted internally within the housing 1002, one or more dispensing units 120a (only one is shown, for illustration) as described above with reference to any of FIGS. 3 and 5 to 9(a) disposed on one or more of the shelves 1004. In an embodiment, the cabinet 1000 comprises a door 1006 mounted on the housing 1002, whereby the door is openable and closable by a user, and a door sensor 1008 configured to output a door open signal in the event of the door 1006 transitioning from closed to open and a door close signal in the event of the door 1006 transitioning from open to closed. The door sensor 1008 may take any of the forms of the bin lid sensor 312 described above in relation to FIG. 8. In an embodiment, the door 1006 is a glazed door incorporating a transparent pane. In an embodiment, the door 1006 is a solid and/or non-transparent door.

In an embodiment, the cabinet 1000 comprises an optical transmitter 1010 configured to transmit optical signals. In an embodiment, the cabinet 1000 comprises a controller 1012, the controller being connected to the door sensor 1008 and to the optical transmitter 1010. In an embodiment, (i) the optical transmitter 1010 is an infrared (IR) light emitter or (ii) an IR LED.

In an embodiment, the controller 1012 comprises a wireless gateway. In an embodiment, the controller 1012 includes or is connected to a first wireless receiver or first wireless transceiver 1022. In an embodiment, the first wireless receiver or first wireless transceiver 1022 is a Bluetooth Low Energy (BLE) receiver or transceiver, respectively, and the wireless signals are BLE signals.

In an embodiment, the controller includes or is connected to a cellular transceiver or wired network transceiver (not shown).

In an embodiment, the cabinet 1000 further comprises a keypad 1014 for controlling user access, a door lock 1016 and a touchscreen 1018 for user information and/or alternative access control. The cabinet 1000 may be powered by a mains power supply, indicated at 1020. In an embodiment, the controller has a secondary power source, such as a battery or UPS (not shown).

FIG. 11(a) is a flow chart of the operations performed by a controller 1012 (FIG. 10(b)) of the cabinet 1000, in an embodiment. FIG. 11(b) is a flow chart of the operations performed by a processor 302 (FIG. 3) of the or each weight sensor unit 122, in an embodiment.

Referring initially to FIG. 11(a), first the controller 1012 waits (block s1102) for an input from the door sensor 1008. If issued by the door sensor 1008, the door open signal is received at block s1104. In response to the door open signal, a first optical signal is transmitted using the optical transmitter 1010 at block s1106. the controller 1012 waits (block s1108) for a predetermined period and if no further input is received, there is a timeout and processing returns to block s1102.

If, on the other hand, there is no timeout, the controller 1012 waits (block s1110) for a further input from the door sensor 1008. If issued by the door sensor 1008, the door close signal is received at block s1112. Finally, in response to the door close signal, a second optical signal is transmitted using the optical transmitter at block s1114.

In an embodiment, the first optical signal is different to the second optical signal. In an embodiment, the first optical signal comprises a train of N1 optical pulses and the second optical signal comprises a train of N2 optical pulses, where N2 is not equal to N1. In an embodiment, (i) N2 is a×N1, where a is in the range 2-4, (ii) N1 is b×N2, where b is in the range 2-4 or (iii) or N1 is 2 and N2 is 4. In an embodiment, the first optical signal and/or second optical signal is an IR optical signal In an embodiment, the second electrical signal is a zero level signal corresponding to an absence of an optical signal.

In an embodiment, the controller 1012 has a secondary power source, whereby the controller 1012 is configured to cause the emission of the first optical signal and/or the second optical signal using the optical transmitter 1010 in the absence of power from a mains power source 1020. In an embodiment, the secondary power source is a battery.

In an embodiment, the controller is configured to receive weight sensor readings received wirelessly via the first wireless receiver or first wireless transceiver 1022.

In an embodiment, the controller transmits one or more weight reporting messages via the cellular transceiver or wired network transceiver, the one or more weight reporting messages including the weight sensor readings.

FIG. 11(b) is a flow chart of the operations performed by a processor 302 (FIG. 3) of the or each weight sensor unit 122a, in an embodiment. Here, the weight sensor unit 122a includes the optical sensor 320 (FIG. 3) configured to output electrical signals in response to the receipt of optical signals, whereby the weight sensor unit 122a is controllable via optical signalling.

Initially, a first electrical signal is received (block s1120) from the optical sensor in response to the receipt thereby of a first optical signal. Next, one or more weight sensor readings output by the weight sensor are received (block s1122). In an embodiment, it is then determined (block s1124) whether a timeout has occurred, e.g. whether a predetermined period has elapsed. The predetermined period may be, for example, 3-5 minutes. If a timeout occurs, processing proceeds to block s1002.

In an embodiment, in the event that no timeout occurs, a second electrical signal is received from the optical sensor in response to the receipt thereby of a second optical signal (block s1126). Then, only after receipt of the second electrical signal, the one or more weight sensor readings are transmitted wirelessly using the transmission device 308 (block s1128).

In an embodiment, the first optical signal is different to the second optical signal. In an embodiment, the first optical signal comprises a train of N1 optical pulses and the second optical signal comprises a train of N2 optical pulses, where N2 is not equal to N1. In an embodiment, (i) N2 is a×N1, where a is in the range 2-4, (ii) N1 is b×N2, where b is in the range 2-4 or (iii) or N1 is 2 and N2 is 4.

In an embodiment, the first optical signal and/or second optical signal is an IR optical signal. In an embodiment, the transmission device 308 is configured to be operated in one of at least a first state in which the transmission device consumes power P1, and in a second state, in which the transmission device consumes power P2, wherein P2 is greater than P1. In an embodiment, the processor 302 is configured to switch the transmission device 308 from the first state to the second state only after only after receipt (i) of the door open signal and/or (ii) the door close signal after the door open signal. In an embodiment, in the first state the transmission device 308 is in deactivated mode, and in the second state the transmission device 308 is in activated mode whereby it is able to transmit the wireless signals. In an embodiment, (i) P1 is 2 to 50 times P2, or P1 is 5 to 15 times P2 or P1 is 10 times P2 and/or (ii) P3 is 2 to 50 times P4, or P3 is 5 to 15 times P4 or P1 is 10 times P2. In an embodiment, P1 is zero.

In an embodiment, after the door close signal and until the next door open signal the processor is configured not to poll the weight sensor 304 for a weight sensor reading and/or not to transmit the one or more weight sensor readings using the transmission device 308.

In an embodiment, the processor 302 is configured to transmit the wireless signals using the transmission device 308 at a given time at a settable signal strength S, corresponding to a range R of signal reception. In an embodiment, the transmission device 308 is configured to transmit wireless signals with a signal power sufficient to reach a wireless gateway or a wireless access point. In an embodiment, (i) the signal strength S corresponds to a range R of signal reception lying in the range of (i) 1 to 500 m, (ii) 50 to 500 m, (iii) 50 to 400 m or (iv) 100 to 400 m. In an embodiment, the transmission device is a BLE transmitter, and the wireless signals are BLE signals.

In an embodiment, after the door open signal and until the next door close signal the processor 302 is configured to repeatedly poll the weight sensor 304 to obtain a weight sensor reading, and to average the weight sensor reading obtained over a predetermined period lying within or contemporaneous with the period between the door open signal and until the next door close signal. In an embodiment, the processor 302 is configured to: poll the weight sensor 304 to obtain a weight sensor reading in response to receipt of the door open signal; and/or poll the weight sensor 304 to obtain a weight sensor reading in response to receipt of the door close signal; and/or average weight sensor readings in a period commencing at a time point a first predetermined delay period after the door open signal and/or ending at the next door close signal.

In an embodiment in which the weight sensor unit 122a is used in a stock monitoring system for monitoring the quantity of stock items in a respective dispensing unit 120a and or the number of stock items removed from or inserted/returned into a respective dispensing unit 120a, processing may proceed according to the flowchart of FIG. 11(c). To the extent appropriate, the operations of FIGS. 11(a) and 11(b) may be combined with one, some or all of the operations in FIG. 11(c).

An advantage is that, a WSU 122a operates in a low power state until signalled optically to take measurements and transmit weight sensor readings. This reduces the amount of power consumed by the WSU 122a, and extends the life of the (battery of the) WSU 122a.

Further advantages of the foregoing include that when a lid is lifted, the WSU 122a can be activated to read the weight sensor 302 and broadcast the information to the (BLE) gateway 108a. This means the transmitter device (BLE module) consumes less power as it can be turned off between events. This extends the life of the WSU 122a significantly in the field between battery changes or recharges. The lid on bins in WSU 122a eliminates the requirement to read all the bins within a cabinet when an access door has been opened. Therefore, a number of WSUs 122 on an open rack no longer need to be on (activated), and waiting for a change in weight. The WSU 122a is only activated when the lid sensor is triggered. Only the bins that are accessed by the user need to be read. This reduces the number of messages that the (BLE) gateway 108a needs to manage per operation as all the bins within a cabinet do not need to be read. It also decreases the noise from erroneous readings of light items that trigger changes in measurement when there have been no transactions. This has the effect of increasing the inventory accuracy of the entire cabinet. The lid sensor in the form of a reed switch or magnetic sensor is preferable to an accelerometer, as the accelerometer may initiate readings due to a passing truck, or nearby bins being restocked.

Mode control via portable wireless device.

FIG. 12 illustrates the internal configuration of an electronic device (portable wireless device) 201 according to one or more embodiments. In the illustrated example embodiment, the electronic device 201 is a communication device, such as a mobile communication device. In at least some example embodiments, the electronic device 201 is a two-way communication device having data and voice communication capabilities, and the capability to communicate with other computer systems, for example, via the Internet. Depending on the functionality provided by the electronic device 201, in various example embodiments, the electronic device 201 may be a multiple-mode communication device configured for data and voice communications, a mobile telephone such as a smart phone, a tablet computer such as a slate computer, a wearable computer such as a watch, a PDA (personal digital assistant), or a computer system. In other example embodiments, the electronic device 201 may be of a type not specifically listed above.

The electronic device 201 includes a housing (not shown), housing the components of the electronic device 201. The internal components of the electronic device 201 are constructed on a printed circuit board (PCB). The electronic device 201 includes a controller including at least one processor 240 (such as a microprocessor) which controls the overall operation of the electronic device 201. It will be appreciated that, in at least some example embodiments, the controller may, instead of or in addition to the processor 240, include an analog circuit or other types of circuits capable of performing a part or all of the functions of the processor 240 that are described herein. The processor 240 interacts with device subsystems such as a wireless communication subsystem 211 for exchanging radio frequency signals with a wireless network 101 to perform communication functions. The processor 240 interacts with additional device subsystems including one or more input interfaces 206 (such as a keyboard, one or more control buttons, one or more microphones 258, and/or a touch-sensitive overlay associated with a touchscreen display 204), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces 205 (such as the touchscreen display 204, one or more speakers 256, or other output interfaces 205), a short-range communication subsystem 262, a global positioning system (GPS) 266 for communicating with a GPS satellite network, and other device subsystems generally designated as 264. Some of the subsystems shown in FIG. 4 perform communication-related functions, whereas other subsystems may provide "resident" or on-device functions. Although referred to herein as "short-range communication subsystem 262", as compared with NFC range, the communication subsystem 262 may, as the term is used herein, involve "intermediate-range" communication (e.g., a meter to a few hundred metres), as discussed hereinabove.

The electronic device 201 includes a touchscreen display 204. The touchscreen display 204 may be constructed using a touch-sensitive input surface connected to an electronic controller. The touch-sensitive input surface overlays the touchscreen display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display 204 acts as both an input interface 206 and an output interface 205.

The electronic device 201 is connected to a communication network such as a wireless network 101 which may include one or more of a Wireless Wide Area Network (VWVAN) and a Wireless Local Area Network (WLAN) or other suitable network arrangements. In at least some example embodiments, the electronic device 201 is configured to communicate over both the VWVAN and WLAN, and to roam between these networks. In at least some example embodiments, the wireless network 101 may include multiple VWVANs and WLANs.

The particular design of the wireless communication subsystem 211 depends on the wireless network 101 in which the electronic device 201 is intended to operate. The electronic device 201 may send and receive communication signals over the wireless network 101 after the required network registration or activation procedures have been completed.

In at least some example embodiments, the auxiliary input/output (I/O) subsystems 250 may include an external communication link or interface, for example, an Ethernet connection. The electronic device 201 may include other wireless communication interfaces for communicating with other types of wireless networks, for example, a wireless network such as an orthogonal frequency division multiplexed (OFDM) network. The auxiliary I/O subsystems 250 may include a pointing or navigational tool (input device) such as a clickable trackball or scroll wheel or thumbwheel, or a vibrator for providing vibratory notifications in response to various events on the electronic device 201 such as receipt of an electronic message or incoming phone call, or for other purposes such as haptic feedback (i.e. touch feedback).

In at least some example embodiments, the electronic device 201 also includes a removable memory module 230 (typically including flash memory) and a memory module interface 232. Network access may be associated with a subscriber or user of the electronic device 201 via the memory module 230, which may be a Subscriber Identity Module (SIM) card for use in a GSM network or other type of memory module for use in the relevant wireless network. The memory module 230 may be inserted in or connected to the memory module interface 232 of the electronic device 201 in order to operate in conjunction with the wireless network 101.

The electronic device 201 may store data 227 in an erasable persistent memory, which in one example embodiment is the flash memory 244. In various example embodiments, the data 227 may include service data having information required by the electronic device 201 to establish and maintain communication with the wireless network 101. The data 227 may also include user application data such as email messages, address book and contact information, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into a number of databases or data stores each containing data items of the same data type or associated with the same application. For example, email messages, contact records, and task items may be stored in individual databases within the memory of the electronic device 201.

In at least some example embodiments, the electronic device 201 is provided with a service routing application programming interface (API) which provides an application with the ability to route traffic through a serial data (i.e., USB) or Bluetooth<®>(Bluetooth<®> is a registered trademark of Bluetooth SIG, Inc.) connection to the host computer system using standard connectivity protocols.

The electronic device 201 also includes a battery 238 as a power source, which is typically one or more rechargeable batteries that may be charged, for example, through charging circuitry coupled to a battery interface 236 such as the serial data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The short-range communication subsystem 262 is an additional optional component which provides for communication between the electronic device 201 and different systems or devices, which need not necessarily be similar devices. For example, the short-range communication subsystem 262 may include an infrared device and associated circuits and components, or a wireless bus protocol compliant communication mechanism such as a Bluetooth<®> communication module to provide for communication with similarly-enabled systems and devices. In other embodiments, the short-range communication subsystem 262 comprises a Near Field Communication (NFC) interface.

In at least some example embodiments, the electronic device 201 may include a GPS 266. The GPS 266 communicates with a GPS compatible satellite network to provide location and time related information of the electronic device 201. For example, the GPS 266 may, in conjunction with an integrated or separate mapping application, provide current or past locations of the electronic device 201 on a map, notify a user of nearby landmarks on the map, provide driving directions and estimated travel time based on a current location and a planned destination, etc.

A pre-determined set of applications that control basic device operations, including data and possibly voice communication applications may be installed on the electronic device 201 during or after manufacture. Additional applications and/or upgrades to an operating system 223 or software applications 225 may also be loaded onto the electronic device 201 through the wireless network 101, the auxiliary I/O subsystem 250, the data port 252, the short-range communication subsystem 262, or other suitable device subsystems 264. The downloaded programs or code modules may be permanently installed, for example, written into the program memory (i.e. the flash memory 244), or written into and executed from the RAM 246 for execution by the processor 240 at runtime.

The processor 240 operates under stored program control and executes software modules 221 stored in memory such as persistent memory, for example, in the flash memory 244. As illustrated in FIG. 4, the software modules 221 include operating system software 223, and other software applications 225. In the example embodiment of FIG. 4, the operating system software 223 includes a user interface module 226 (i.e. the user interface module 226 is part of the operating system software 223). However, in other example embodiments, the user interface module 226 may be implemented as part of another application 225, or as a separate stand-alone application 225.

The electronic device 201 may include a range of additional software applications 225, including a stock item dispensing/tracking application as used in embodiments described herein, sometimes referred to as the "App". Each of the software applications 225 may include layout information defining the placement of particular fields and graphic elements (for example, text fields, input fields, icons, etc.) in a graphical user interface (GUI) associated with the application. A GUI is a type of user interface that allows the user to interact with a device and/or an application utilizing images, icons, text and other selectable graphical elements. The GUI represents information and actions available to the user through graphical icons and visual indicators. The software applications 225 may also include touch gesture information defining functionalities associated with the touch gestures received via the touchscreen display 204. The touch gesture information may define GUI specific user input gestures to perform functions within the GUI. For example, a software application 224 may determine a finger swiping movement (i.e., a touch gesture) on the touchscreen display 204 as a scrolling function to navigate within the GUI (for example, scrolling a display page provided by the GUI).

The software modules 221 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

The user interface module 226 provides a platform for a user to interact with one or more software applications 225. For example, the user interface module 226 may function as a user interface for one or more associated software applications 225 (and provide one or more display pages that a user may interact with). The user interface module 226 may enable a user to execute the various functions and features of the associated one or more software applications 225.

In at least some example embodiments, the user interface module 226 may include information for manipulating a display page provided by the user interface module 226 for associated software applications 225 based on the instructions input by a user. For example, the user interface module 226 may include touch gesture information defining particular functionalities for manipulating the display page based on touch gestures received from a user on the touchscreen display 204. For example, the user interface module 226 may receive a touch gesture that is a swiping gesture on the touchscreen display 204, and in response, manipulate the display page based on the appropriate functionality of the swiping gesture. For example, in at least some example embodiments, the swiping gesture may correspond to a scrolling function and accordingly, cause the user interface module 226 to manipulate the display page by scrolling the display page.

Although the present application uses the term "pages", it will be understood that in some contexts and implementations the term "pages" may be interchangeable with "windows", "layers" or other such terms.

In at least some example embodiments, the user interface module 226 may only display one display page. In such example embodiments, portions of the display page may also be independently and simultaneously manipulated based on gestures input by the user on different portions of the display page. For example, the display page may be displayed to encompass the first portion and the second portion of the touchscreen display 204. The first control element is associated with a first portion of the display page displayed in the first portion of the touchscreen display 204, and the second control element is associated with a second portion of the display page displayed on the second portion of the touchscreen display 204. Accordingly, in such example embodiments, the first event may include manipulating the first portion of the display page based on the first touch gesture input on the first portion of the touchscreen display 204 while the second event may include manipulating the second portion of the display page based on the second touch gesture input on the second portion of the touchscreen display 204.

Specific functions and features of the user interface module 226 will be discussed in greater detail below.

Additionally, as mentioned above, the user interface module 226 may be associated with one or more software applications 225. Accordingly, the functions may be implemented by the user interface module 226 with respect to a variety of different applications.

It will be appreciated that in at least some example embodiments, the operating system 223 may perform some or all of the functions of the user interface module 226. In other example embodiments, the functions or a portion of the functions of the user interface module 226 may be performed by one or more other applications. Further, while the user interface module 226 has been illustrated as a single block, the user interface module 226 may include a plurality of software modules. In at least some example embodiments, these software modules may be divided among multiple applications.

FIG. 13(a) is a flow chart of the operations performed by a processor 240 (FIG. 12) of the portable wireless device 201, in an embodiment. FIGS. 13(b) and 13(c) show user interface screens displayed on display 204 (FIG. 12) of the portable wireless device 201 during a process, in embodiments. FIG. 13(d) is a flow chart of the operations performed by a processor 302 (FIG. 3) of the weight sensor unit 122a, in an embodiment.

In one aspect, the process comprises, in response to the portable wireless device being tapped on or placed in proximity to the first transceiver, transmitting a first wireless signal using the second transceiver, the first wireless signal including a first setting command, the first setting command being a command to operate the multimode component of the weight sensor unit in the second state.

An embodiment will now be described with reference to FIGS. 13(a) to 13(c). Initially, at block s1302, on display 204 of the portable wireless device 201 a menu screen (1350 in FIG. 13(b)) may be displayed, a menu on the menu screen 1350 including a first graphical element (button 1352) corresponding to a settings change option. At block s1304, may be determined whether button 1352 has been selected (pressed). If not, processing may return to block s1302.

If, on the other hand, it is determined that button 1352 has been selected, a screen may be displayed (second screen in FIG. 13(c)) with a prompt icon 1354 requesting that the user tap the portable wireless device 201 on the (NFC) transceiver of the weight sensor unit 122a. In response to the portable wireless device being tapped on or placed in proximity to the first transceiver for a first time, the portable wireless device 201 may receive from the weight sensor unit via the first transceiver (i) a transceiver ID of the first transceiver, (ii) the current configuration settings of the weight sensor unit and optionally a device ID of the weight sensor unit.

In response to the portable wireless device being tapped on or placed in proximity to the first transceiver for a first time or button 1352 being selected, a setup screen 1356 (settings change screen; third screen in FIG. 13(c)) including first setting configuration graphical element 1358 and/or second setting configuration graphical element 1360 may be displayed (block s1306). In an embodiment, the first setting configuration graphical element 1358 is configured to display a first plurality of user-selectable settings options including at least a first settings option corresponding to the first state and a second settings option corresponding to the second state. In an embodiment, the second setting configuration graphical element 1360 is configured to display a second plurality of user-selectable settings options including at least a third settings option corresponding to the first state and a fourth settings option corresponding to the second state.

At block s1308 a check may be made as to whether a predetermined timeout period has expired. If so, the setup screen is undisplayed (block s1310), and processing returns to block s1302.

In an embodiment, if, before the timeout period has expired, a user selection of settings option corresponding to one of first setting configuration graphical element (1358) and second setting configuration graphical element (1360) is received (block s1312) (and optionally "Save" button 1361 selected), then, in response to user selection of settings option corresponding to the second state, a first message including a first command to operate multimode component in the second state may be constructed (block s1314), and a prompt 1362 to tap the portable wireless 201 device on WSU 122a may be displayed (fourth screen in FIG. 13(c)).

At block s1316 a check may be made as to whether a predetermined timeout period has expired. If so, the setup screen is undisplayed (block s1318), and processing returns to block s1302.

If, on the other hand, it is determined (block s1320) that the portable wireless device 201 has been tapped on or placed in proximity to the first transceiver (of the weight sensor unit 122a; for a second time), a first wireless signal may be transmitted (block s1322) using the second transceiver (of the portable wireless device 201), the first wireless signal including a first setting command, the first setting command being a command to operate the multimode component of the weight sensor unit in the second state.

Next, a confirmation screen 1363 (fourth screen in FIG. 13(c)) may be displayed (block s1324), including a message 1364 confirming that the setting has been applied. Then, for example in response to a predetermined timeout period expiring (block s1326), the confirmation screen may be undisplayed (block s1328) and processing may return to block s1302.

In an embodiment, the first setting configuration graphical element 1358 (third screen in FIG. 13(c)) is configured to display a first plurality of user-selectable settings options including at least a first settings option corresponding to the first state and a second settings option corresponding to the second state In an embodiment, the second setting configuration graphical element 1360 is configured to display a second plurality of user-selectable settings options including at least a third settings option corresponding to the first state and a fourth settings option corresponding to the second state.

In an embodiment, the first setting configuration graphical element 1358 corresponds to automatic read time of the weight sensor unit, the first settings option is a first periodicity T1 and the second settings option is a second periodicity T2, where T2 is greater than T1. In an embodiment, the processor 240 is further configured to: receive user selection of the second settings option via the input device 206; and construct a first message including (i) a first command to set an automatic read time of the weight sensor unit and (ii) to set the automatic read time to the second periodicity T2.

In an embodiment, the second setting configuration graphical element 1360 corresponds to a range of a transmitter of the weight sensor unit, the third settings option is a first range R1 and the fourth settings option is a second range R2, where R2 is less than R1. In an embodiment, the processor 240 is further configured to: receive user selection of the fourth settings option via the input device 206; construct a first message including (i) a first command to set a range of the transmitter of the weight sensor unit and (ii) to set the range to the second range R2.

In an embodiment, the first wireless signal is transmitted in response to portable wireless device 201 being tapped on or placed in proximity to the first transceiver 310 for a second time. In an embodiment, the processor 240 is further configured to: prior to displaying the setup screen 1350, in response to the portable wireless device 201 being tapped on or placed in proximity to the first transceiver 310 for a first time, receive from the weight sensor unit 122*a* via the first transceiver 310 (*i*) a transceiver ID of the first transceiver, (ii) the current configuration settings of the weight sensor unit and optionally a device ID of the weight sensor unit. In an embodiment, the content of the setup screen 1350 (*i*) includes one or more of the current configuration settings and/or (ii) is dependent upon the transceiver ID and/or (ii) the device ID of the weight sensor unit 122*a*.

In an embodiment, the processor 240 is further configured to incorporate the transceiver ID in the first wireless signal.

FIG. 13(*d*) is a flow chart of the operations performed by a processor 302 (FIG. 3) of the weight sensor unit 122*a*, in an embodiment. In one aspect, the process comprises, in response to a portable wireless device of a user being tapped on or placed in proximity to the transceiver, receiving a first wireless signal from the portable wireless device, the first wireless signal including a first setting command; and determining, from the first wireless signal, the first setting command; and if the first setting command corresponds to a command to change the state of the multimode component from one of the first state and the second state to the other of the first state and the second state, setting the state of the multimode component to the other of the first state and the second state.

An embodiment will now be described with reference to FIG. 13(*d*). Initially, at block s1340, the processor 302 of the WSU 122*a* waits to detect wireless interaction at the (e.g. NFC) transceiver 310. If it is detected at that the portable wireless device 201 has been tapped on or placed in proximity to transceiver 310, the first wireless signal from the portable wireless 201 may be received at block s1342. In response to receiving the first wireless signal the processor 302 of the WSU 122*a* may determine (extract) the first setting command from the first wireless signal at block s1344.

Next, a determination (block s1346) is made as to whether the first setting command is a command to set state of multimode component to the second state. If it is determined that the first setting command is a command to set state of multimode component to the second state, a determination (block s1348) is made as to whether the current state of multimode component is the first state. If it is determined that the current state of multimode component is the first state, the state of the multimode component is set to the second state (block s1348).

If, at block s1346 it is determined that the first setting command is not a command to set state of multimode component to the second state, a determination (block s1352) is made as to whether the first setting command is a command to set state of multimode component to the first state. If it is determined that the first setting command is a command to set state of multimode component to the first state, a determination (block s1354) is made as to whether the current state of multimode component is the second state. If it is determined that the current state of multimode component is the second state, the state of the multimode component is set to the first state (block s1348).

In an embodiment in which the weight sensor unit 122*a* is used in a stock monitoring system for monitoring the quantity of stock items in a respective dispensing unit 120*a* and or the number of stock items removed from or inserted/returned into a respective dispensing unit 120*a*, processing may proceed according to the flowchart of FIG. 13(*e*). To the extent appropriate, the operations of FIGS. 13(*a*) to 13(*d*) may be combined with one, some or all of the operations in FIG. 13(*e*). As used herein, (i) "App" means an application running on the portable wireless device 201 and configured to implement one or more of the techniques illustrated and/or described herein, (ii) "NFC device" means a processor-based, NFC-enabled device, such as portable wireless device 201, (iii) "WSU" means weight sensor unit, and (iv) "cloud-based software" means specially configured (e.g. server-executed) software running on the central control computer ("CCC") or server 116 (see FIG. 1).

An advantage is that the weight sensor unit 122*a* can be switched to a state (mode) in which fewer devices (e.g. sensors) are active, or where the transmitter 308 is used less frequently. This means that the weight sensor unit 122*a* consumes less power, and the life of the (battery of the) weight sensor unit 122*a* is extended. For example, scanning the NFC with the app can be used to change pre-programmed parameters in the BLE module 308 of the weight sensor unit 122*a*, so that: a) the weight sensor unit 122*a* cane be switched to two-way comms in order to receive firmware updates; b) the "beacon frequency" i.e. the number of times the module 308 beacons to a gateway 106*a* or app, can be modified; c) sensors of the weight sensor unit 122*a* can be turned on and off, e.g. temperature sensor and accelerometer; d) the tuning of accelerometer can be modified; and e) the can be modified can be activated to do a weight sensor reading for a predetermined period.

Alerting for Calibration/Repair on Discrepancy.

FIG. 14(*a*) is a flow chart of the operations performed by a processor 302 (FIG. 3) of the weight sensor unit 122*a*, in an embodiment. FIG. 14(*b*) is a flow chart of the operations performed by a processor 240 (FIG. 1) of the portable wireless device 201, in an embodiment. FIG. 14(*c*) is a flow chart of the operations performed by a processor of the central control computer 116 (FIG. 1), in an embodiment.

FIG. 14(*a*) is a flow chart of the operations performed by a processor 302 ("first processor") (FIG. 3) of the weight sensor unit 122*a*, in an embodiment. In one aspect, the process comprises, in response to a portable wireless device being tapped or placed in proximity to the first transceiver for a first time, receive first wireless signals from the portable wireless; receiving a weight sensor reading output by the weight sensor during a first predetermined period after receipt of the first wireless signals; and transmitting a weight reading reporting message to the central control computer via the network, the weight reading reporting message including the weight sensor reading output by the weight sensor; wherein the first processor is configured to, in response to receipt of the alert command message, output a visual and/or audible alert using the output unit, the alert indicating that the weight sensor requires recalibration or replacement An embodiment will now be described with reference to FIGS. 14(*a*) and 14(*d*) to 14(*h*). Initially, the processor 302 of the WSU 122*a* waits to detect wireless interaction at the (e.g. NFC) transceiver 310. If it is detected (at block s1402) that the portable wireless device 201 has been tapped on or placed in proximity to transceiver 310, the first wireless signal from the portable wireless 201 may be received at block s1404. The first wireless signals from the portable wireless device may include an identifier of the portable wireless device 201 or user thereof.

In response to receiving the first wireless signal the processor 302 of the WSU 122*a* may receive (block s1406) a weight sensor reading output by weight sensor 304 (FIG. 3), e.g. in response to polling the latter, during a first predetermined period after receipt of the first wireless signals.

Then, a weight reading reporting message including the weight sensor reading may be transmitted (to central control computer via the network), at block s1408. In an embodiment, the first processor 302 is configured to receive a weight sensor reading output by the weight sensor 304; construct a weight sensor reporting message, the weight sensor reporting message including (i) identifying data related to the dispensing unit 120a or to the weight sensor unit 122a and (ii) the weight sensor reading, and transmit the weight sensor reporting message using the transmission device 308. In an embodiment, the weight sensor unit 122a has a weight sensor unit ID and/or a weight sensor unit type ID, and the identifying data comprises or additionally includes the weight sensor unit ID and/or the weight sensor unit type ID. In an embodiment, the transmission device 308 has a transmission device ID and/or a transmission device type ID, and the identifying data comprises or additionally includes the transmission device ID and/or the transmission device type ID. In an embodiment, the container 124a has a container ID and/or a container type ID, and the identifying data comprises the container ID and/or the container type ID. In an embodiment, the container ID is unique to the container, the weight sensor unit ID is unique to the weight sensor unit and/or the transmission device ID is unique to the transmission device.

At block s1410 a check may be made as to whether a predetermined timeout period has expired. If so, processing returns to block s1402. If, on the other hand, it is determined (block s1412) that an alert command message has been received within the predetermined timeout period, a visual and/or audible alert may be output using the output unit (e.g. a speaker, LED and/or screen (not shown) on the weight sensor unit 122a or on a separate device and associated and in communication with the weight sensor unit 122a).

FIG. 14(b) is a flow chart of the operations performed by a processor 240 ("second processor") (FIG. 1) of the portable wireless device 201, in an embodiment. In one aspect, the process comprises, receiving a first quantity input by the user via the input device; and in response to a portable wireless device being tapped or placed in proximity to the first transceiver for a second time, transmit a quantity reporting message to the central control computer via the network, the quantity reporting message including the first quantity; wherein the second processor is configured to, in response to receipt of the alert command message, output a visual and/or audible alert using the output device, the alert indicating that the weight sensor requires recalibration or replacement.

An embodiment will now be described with reference to FIGS. 14(b) and 14(d) to 13(h). Initially, a check may be made (block s1430) as to whether a user input has been received via the input device (touchscreen) 204. If a first quantity has been input by user via the input device, this may be received at block s1432. At block s1434 a check may be made as to whether a predetermined timeout period has expired. If so, processing may return to block s1430. If, on the other hand, it is determined (block s1436) that portable wireless device 201 has been tapped or placed in proximity to the first transceiver 310 (e.g. for a second time) within the predetermined timeout period, a quantity reporting message including the first quantity may be transmitted to the central control computer (via the network) (block s1438).

At block s1440 a check may be made as to whether a predetermined timeout period has expired. If so, processing may return to block s1430. If, on the other hand, it is determined (block s1442) that an alert command message has been received within the predetermined timeout period, a quantity reporting message including the first quantity may be transmitted to the central control computer (via the network) (block s1438).

FIG. 14(c) is a flow chart of the operations performed by a processor ("third processor") of the central control computer 116 (FIG. 1), in an embodiment. In one aspect, the process comprises receiving the weight reading reporting message; extracting the weight sensor reading from the weight reading reporting message; determining as a second quantity the difference between the extracted weight sensor reading and an immediately preceding weight sensor reading, divided by a unit weight of a corresponding stock item; receiving the quantity reporting message; extracting the first quantity from the quantity reporting message; determining whether the first quantity is different from the second quantity; and transmitting an alert command message to (i) the portable wireless device and/or (ii) to an output unit associated with the dispensing unit, if it is determined that the first quantity is different from the second quantity.

An embodiment will now be described with reference to FIGS. 14(c) and 14(d) to 13(h). Initially, the weight reading reporting message may be received (block s1450). Then, the weight sensor reading may be extracted from the weight reading reporting message (block s1452). Next, a second quantity may be determined as the difference between the extracted weight sensor reading and an immediately preceding weight sensor reading, divided by a unit weight (for the item) (block s1454). At block s1456 a check may be made as to whether a predetermined timeout period has expired. If so, processing may return to block s1450.

If, on the other hand, a quantity reporting message has been received (block s1458) within the predetermined timeout period, a first quantity may be extracted from quantity reporting message (block s1460). A determination may then be made (block s1462) as to whether the first quantity is different from second quantity. If not, processing may return to block s1456.

If, however, it is determined at block s1462 that the first quantity is different from second quantity, an alert command message may be transmitted, e.g. to (i) portable wireless device 201 and/or (ii) output unit associated with dispensing unit 120 (block s1464).

In an embodiment in which the weight sensor unit 122a is used in a stock monitoring system for monitoring the quantity of stock items in a respective dispensing unit 120a and or the number of stock items removed from or inserted/returned into a respective dispensing unit 120a, processing may proceed according to the flowchart of FIGS. 14(d) to 14(f). Screens that may be displayed during the process of FIGS. 14(d) to 14(f) are shown in FIGS. 14(g) to 14(h). To the extent appropriate, the operations of FIGS. 14(a) to 14(c) may be combined with one, some or all of the operations in FIGS. 14(d) to 14(h). As used herein, (i) "App" means an application running on the portable wireless device 201 and configured to implement one or more of the techniques illustrated and/or described herein, (ii) "NFC device" means a processor-based, NFC-enabled device, such as portable wireless device 201, (iii) "WSU" means weight sensor unit, and (iv) "cloud-based software" means specially configured (e.g. server-executed) software running on the central control computer ("CCC") or server 116 (see FIG. 1).

An advantage is that determining whether the correct quantity has been taken/inserted compared with what is measured can provide an indication that a WSU 122a requires recalibration or replacement, i.e. the system is self-monitoring.

Service Operations by Portable Device.

FIG. 15(a) is a flow chart of the operations performed by a processor 302 (FIG. 3) of the weight sensor unit 122a, in an embodiment. FIG. 15(b) is a flow chart of the operations performed by a processor 240 (FIG. 1) of the portable wireless device 201, in an embodiment. FIG. 15(c) is a flow chart of the operations performed by a processor of the central control computer 116 (FIG. 1), in an embodiment.

FIG. 15(a) is a flow chart of the operations performed by a processor 302 ("first processor") (FIG. 3) of the weight sensor unit 122a, in an embodiment. In one aspect, the process comprises, in response to a portable wireless device being tapped or placed in proximity to the first transceiver, transmit a first transceiver ID of the first transceiver; receive the service command using the first transceiver, the service command having a service command type; receive a weight sensor reading output by the weight sensor during a first predetermined period after receipt of the service command; and transmit a weight reading reporting message to the central control computer via the network, the weight reading reporting message including (i) a weight sensor unit ID, (ii) the weight sensor reading, (iii) the time and date of taking the weight sensor reading and optionally (iii) a status relating to the service command type.

An embodiment will now be described with reference to FIGS. 15(a) and 15(d) to 15(g). Initially, in response to a portable wireless device 201 being tapped or placed in proximity to the first transceiver 310, a first transceiver ID of the first transceiver 310 may be transmitted (block s1502). Then, the service command may be received (block s1504) using the first transceiver 310, the service command having a service command type. Next, a weight sensor reading output by the weight sensor 304 during a first predetermined period after receipt of the service command may be received at block s1506. Then, a weight reading reporting message may be transmitted (block s1508) to the central control computer 116 via the network, the weight reading reporting message including (i) a weight sensor unit ID, (ii) the weight sensor reading, (iii) the time and date of taking the weight sensor reading and optionally (iii) a status relating to the service command type FIG. 15(b) is a flow chart of the operations performed by a processor 240 (FIG. 1) of the portable wireless device 201, in an embodiment. Initially, a service command input by the user via the input device 204 may be received at block s1520, the service command being one of a plurality of service command types. Then, in response to a portable wireless device 20-1 being tapped or placed in proximity to the first transceiver 310, a first transceiver ID of the first transceiver may be received (block s1522). Next, the service command may be transmitted (block s1524) using the second transceiver. Then, a service command reporting message may be transmitted (block s1526) to the central control computer 116 via the network, the service command reporting message including (i) the service command type of the service command, (ii) the time and date of transmission of the service command to the weight sensor unit and (iii) first transceiver ID or a location associated with the first transceiver ID.

FIG. 15(c) is a flow chart of the operations performed by a processor of the central control computer 116 (FIG. 1), in an embodiment. Initially, the service command reporting message may be received at block s1530. Then, (i) the service command type, (ii) the time and date of transmission of the service command to the weight sensor unit and (iii) first transceiver ID or a location associated with the first transceiver ID, may be extracted from the service command reporting message (block s1532). Previously to, simultaneously with or subsequent to receipt of the service command reporting message, the weight reading reporting message may be Received (block s1534). Next, (i) a weight sensor unit ID, (ii) the weight sensor reading, (iii) the time and date of taking the weight sensor reading and optionally (iii) a status relating to the service command type, may be extracted from the weight reading reporting message (block s1534). Then, if the time and date of taking the weight sensor reading extracted from the weight reading reporting message matches the time and date of transmission extracted from the service command reporting message, processor of the central control computer 116 may store, in association with the weight sensor unit ID, (i) the weight sensor reading and (ii) a status indicator indicating service completed for the service command type.

In an embodiment in which the weight sensor unit 122a is used in a stock monitoring system for monitoring the quantity of stock items in a respective dispensing unit 120a and or the number of stock items removed from or inserted/returned into a respective dispensing unit 120a, processing may proceed according to the flowchart of FIGS. 15(d) to 15(f). Screens that may be displayed during the process of FIGS. 15(d) to 15(f) is shown in FIG. 15(g). To the extent appropriate, the operations of FIGS. 15(a) to 15(c) may be combined with one, some or all of the operations in FIGS. 15(d) to 15(g). As used herein, (i) "App" or "iBin app" means an application running on the portable wireless device 201 and configured to implement one or more of the techniques illustrated and/or described herein, (ii) "NFC device" means a processor-based, NFC-enabled device, such as portable wireless device 201, (iii) "WSU" means weight sensor unit, (iv) "iBin" or "iBinBLE" means a weight sensor unit and (v) "cloud based software" means specially configured (e.g. server-executed) software running on the central control computer ("CCC") or server 116 (see FIG. 1).

An advantage is that service operations may be effectively performed on a WSU 122a by a user in situ, and the status instantly updated on a CCC 116. This ensures that more WSUs 122 remain in a properly serviced state and can operate more accurately and effectively.

FIG. 16(a) is a flow chart of operations in an embodiment in which the portable wireless device 201 is used in conjunction with other devices to set a product weight (unit weight for an item/product). FIG. 16(b) shows screens that may be displayed during the process of FIG. 16(a).

As used herein, the weight sensor unit 122a (or dispensing unit 120a as a whole) may be referred to as an iBin or iBinBLE, the dispensing unit 702a may be referred to as an iBin Lid, the portable wireless device 201 may be referred to as an NFC device, a stock item dispensing, tracking and/or servicing software application running on the portable wireless device 201 may be referred to as an "app" or "iBin app" or other app, and software running on the central computer 116 may be referred to as "cloud based software".

In one configuration, the dispensing unit, for dispensing stock items comprises a container configured to receive or support the stock items and a weight sensor unit, configured to support, in use, the container. The weight sensor unit comprises a weight sensor configured to output weight sensor readings indicative of the weight of the container, a transmission device configured to transmit wireless signals to a gateway, a processor, coupled to the weight sensor and to the transmission device, and a battery, wherein the weight sensor, transmission device and processor are powered by the battery. The processor is configured to: receive one or more weight sensor readings output by the weight sensor, and transmit the one or more weight sensor readings to the gateway using the transmission device.

In particular embodiments the configuration of various elements is as follows.

Each individual iBin BLE, IBin Lid and may comprise of an independent weight sensor inside an extruded housing which may contain the electronics including a BLE (Bluetooth Low Energy) module for wireless communication with NFC capability for app interaction and a lithium battery, so all Bins' are autonomous. A battery powered bin enables the iBin to be placed anywhere within the range of the Bluetooth gateway (access point), enhancing the flexibility of real time inventory control.

With battery power and wireless connectivity, the flexibility of usage of the iBin BLE, Lid & Pro on the customers' shop floor is greatly enhanced. An individual iBin may be moved from manufacturing cell to manufacturing cell and continue to work seamlessly up to 400 metres (with Bluetooth 5.0 in line of sight)) of the nearest BLE gateway (access point). In addition, racks of riBins' can be on wheels and moved around factories and MRO (Maintenance Repair and Overhaul) facilities, so inventory can be moved to point-of-use easily.

In another configuration, the dispensing unit, for dispensing stock items, comprises a container configured to receive or support the stock items, and a weight sensor unit, configured to support, in use, the container. The weight sensor unit comprises a weight sensor configured to output weight sensor readings indicative of the weight of the container, optionally a transmission device configured to transmit wireless signals to a gateway, a transceiver, configured to wirelessly interact with devices placed in proximity thereto, a processor, coupled to the weight sensor, transceiver and optionally to the transmission device. The processor is configured to: in response to a portable wireless device of a user being tapped or placed in proximity to the transceiver, receive first wireless signals from the portable wireless device including (i) an identifier of the portable wireless device or user, and (ii) a first quantity of stock items removed by that user, receive one or more weight sensor readings output by the weight sensor during a first predetermined period after receipt of the first wireless signals; and determine, from the one or more weight sensor readings, a second quantity of stock items removed; and issue an alert command signal to an output device of the dispensing unit, to the portable wireless device or to a central computer, if the first quantity is different from the second quantity.

In particular embodiments the configuration of various elements is as follows.

In a restock process a WSU 122*a*, a restocker (user) scans the NFC on the bin and informs the app of the quantity restocked. The bin calculates the quantity restocked through the weight sensor. The act of scanning the NFC triggers the weight sensor to read for a set period. Alternatively, the weight sensor can be activated by pressing a button. This is useful when the iBinBLE is battery powered. Both transactions are recorded in the cloud-based software. If there is a discrepancy outside a tolerance for that transaction an alert will appear on the restock app showing a quantity difference between what the user believes they restocked with the app and what the sensor system recorded as the delivery. This allows the restocker to inventory count the contents of the bin and establish whether the bin was restocked with the correct quantity or whether the sensor requires recalibration or replacement. I.e., the system is self-monitoring.

In another configuration, the dispensing unit, for dispensing stock items, comprises a container configured to receive or support the stock items, and a weight sensor unit, configured to support, in use, the container. The weight sensor unit comprises a weight sensor configured to output weight sensor readings indicative of the weight of the container, optionally (i) a transmission device configured to transmit wireless signals to a gateway at a set frequency, (ii) temperature sensor and/or an accelerometer, the temperature sensor and/or an accelerometer being settable to one of an ON and OFF state; a transceiver, configured to wirelessly interact with devices placed in proximity thereto; and a processor, coupled to the weight sensor, transceiver and optionally to the transmission device. The processor is configured to: in response to a portable wireless device of a user being tapped or placed in proximity to the transceiver, receive second wireless signals from the portable wireless device including (i) optionally an identifier of the portable wireless device or user, and (ii) a first setting command; determine, from the second wireless signals, first setting command; and if the first setting command corresponds to a commend to change the frequency of the transmission device to a new frequency, setting the frequency of the transmission device to a new frequency, and if the first setting command corresponds to a commend to change the state of the temperature sensor and/or an accelerometer one of ON and OFF to the other of ON and OFF, setting the state of the temperature sensor and/or an accelerometer one of ON and OFF to the other of ON and OFF.

In particular embodiments the configuration of various elements is as follows.
1. Scanning the NFC with an app may change pre-programmed parameters in the BLE module, including one or more of:
a. The iBinBLE may be two-way communications to receive firmware updates.
b. A beacon frequency i.e., the number of times the module beacons to a gateway or app, may be modified.
c. Reset the bin to reorder after filled. (This may also be automatic with additional weight added.) However, this introduces an improved process as it is known that the bin has been restocked by the restocker and not a user returning product to the bin. The app may be used by the restocker and the button pressed for issuance and returns. The app can also scan the bin to issue to a job number or the tail of a plane.
d. The sensors, e.g., temperature sensor and accelerometer, may be turned on and off.
e. Modify tuning of the accelerometer.
f. Activate a weight sensor reading for a predetermined period.
2. An accelerometer will be fitted to iBinBLE again to conserve battery but initiate readings when product is refilled, returned or issued, i.e., it doesn't have to read all of the time.

In another configuration, the dispensing unit, for dispensing stock items, comprises a container configured to receive or support the stock items, the container including a lid, a sensor on the container or lid being configured to issue at least a lid open signal in the event that a transition of the lid from closed to open is detected by the sensor; and a weight sensor unit, configured to support, in use, the container. The weight sensor unit comprises a weight sensor configured to output weight sensor readings indicative of the weight of the container, a transmission device configured to transmit wireless signals to a gateway; a processor, coupled to the weight sensor, sensor and to the transmission device, and a battery, wherein the weight sensor, sensor, transmission device and processor are powered by the battery. The processor is configured to: receive the lid open signal; in response only to receipt of the lid open signal, receive one or more weight sensor readings output by the weight sensor, and transmit the one or more weight sensor readings to the gateway using the transmission device.

In particular embodiments the configuration of various elements is as follows.

A user entry point is provided that can be monitored by a reed switch or microswitch. When the lid is lifted, the beacon may be activated to read the weight sensor and broadcast the information to the BLE gateway. This means the BLE module consumes less power as it can be turned off between events. This extends the life of the device significantly in the field between battery changes or recharges. The lid on bins in weight sensor unit eliminates the requirement to read all the bins within a weight sensor vending machine when the access door has been opened. Even a quantity of iBin Lids on an open rack no longer need to be on, waiting for a change in weight. The beacon is only activated when the reed switch is triggered. Only the bins that are accessed by the user need to be read. This reduces the number of messages that the BLE gateway needs to manage per transaction as all the bins within the solution do not need to be read. It also decreases the noise from erroneous readings of light items that trigger changes in measurement when there have been no transactions, thus increasing the inventory accuracy of the entire cabinet (vending solution). The lid is superior to an accelerometer as the accelerometer may initiate readings due to a passing truck, or nearby bins being restocked.

In another configuration, the dispensing unit, for dispensing stock items, comprises a container configured to receive or support the stock items; and a weight sensor unit, configured to support, in use, the container. The weight sensor unit comprises a weight sensor configured to output weight sensor readings indicative of the weight of the container, optionally a transmission device configured to transmit wireless signals to a gateway; a transceiver, configured to wirelessly interact with devices placed in proximity thereto; a processor, coupled to the weight sensor, transceiver and optionally to the transmission device. The processor is configured to: in response to a portable wireless device of a user being tapped or placed in proximity to the transceiver, receive third wireless signals from the portable wireless device including (i) optionally an identifier of the portable wireless device or user, and (ii) one or more stock IDs identifying stock items and/or a third quantity of stock items; receive one or more weight sensor readings output by the weight sensor; and determine, from the one or more weight sensor readings, a fourth quantity of stock items removed; and when the fourth quantity is equal to the second quantity, issue an operation complete command signal to an output device of the dispensing unit, to the portable wireless device or to a central computer, the operation complete command signal indicating that the required quantity of stock items have been removed.

In particular embodiments the configuration of various elements is as follows.

The app may allow automatic differentiation (used on restocks) between a restock and a return or can be used to choose restock or return and record name of operative.

The app may be used in a pick mode, i.e., when NFC scanned activates weight sensor and BLE feeds back to the app when the quantity required has been picked, i.e. a live measurement. This speeds up picking particularly for kits of parts.

In other particular embodiments the configuration of various elements is as follows.

With regard to the accelerometer and light sensor, they may be used to change beaconing rates when not moving/moving, light or dark. However, they could also change signal strength rates which has a number of advantages:

1. When an asset tag is scanned with the app into a cabinet or lockers it may reduce the frequency of beaconing and reduce the (RISS signal strength) as the asset is secured and is beaconing to a local gateway in the hardware. When the asset is scanned into access-controlled hardware. The NFC scan may also activate a parameter so that at predetermined intervals two-way communications is established with the asset tag and gateway. This will allow over-the-air firmware updates in a controlled environment, i.e., asset isn't moving. With lockers, access to the asset may be stopped until the firmware update is complete.
2. Same as above but the accelerometer drives the changes when the asset is stationary other than it knowing it is in a cabinet or lockers. This would be established when there is two-way communications and the cloud-based software would know that the gateway the asset tags are associated with are within lockers or a cabinet from the gateway ID.
3. With the light sensor, the reading could be activated when it goes dark (but going dark wouldn't necessarily associate it to be within lockers or a cabinet e.g., could just be night time. Adding an infrared light to the lockers and cabinet that comes on momentarily could also be the trigger to reduce beaconing rates and signal strength to conserve battery.
4. Adding the light sensor allows the asset tag to know it's in a cabinet or lockers without scanning or using two-way communications on the gateway. The strongest beacon strength to the gateway does though automatically verify which cabinet/lockers the asset is held in. If there are antennae on every shelf or in every locker it could even identify which shelf the asset is held in within the cloud-based software. This is useful for a search function (where a user enters a stock item or its code at his portable wireless device, and seeks to find it at a dispensing station or within a factory or site) and pick by light functionality in lockers and cabinets.
5. When an asset tag is taken out of a non-glazed cabinet or locker, the increase in intensity of light from dark may automatically increase signal strength and beacon frequency so the asset can be tracked.
6. The accelerometer may automatically increase signal strength and beacon frequency so the asset can be tracked across the site. Combining with a light sensor may allow an additional automatic and intermediate beacon rate. So, when not moving but the area is lit as it's been worked in (even at night). The beacon rate could reduce to the slowest tracking rate e.g. every 8 seconds, when it's on the move every 4 seconds and when put in a cabinet a longer period e.g. every half an hour (determined by infrared light on door closing event).

A significant benefit of a weight sensor bin going into lockers or a cabinet that uses infrared to trigger reading from a door closing event is that it significantly reduces the cost of assembly time in the manufacture of the cabinet/lockers due to reduced wiring compared to a hard-wired cabinet.

The app can inform the cloud-based software where an iBin BLE weight sensor bin or Smartie asset tag is on a shelf or locker at set up, so a planogram can be built in the cloud-based software. The shelf gateway can confirm that it is on the correct shelf/locker—automated checking. Any anomalies e.g., different gateway reading the tag bin (indicating wrong shelf/locker) can be reported on and fed back to the installer via the app. Location identification of consumable in iBinBLE and Smartie asset tags is required for searching for products.

While embodiments have been described by reference to embodiments of stock monitoring systems having various components in their respective implementations, it will be appreciated that other embodiments make use of other combinations and permutations of these and other components.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms "comprising", "comprised of" or "which comprises" is an open term that means including at least the elements/features that follow, but not excluding others. Thus, the term "comprising", when used in the claims, should not be interpreted as being limitative to the means or elements or steps listed thereafter. For example, the scope of the expression "a device comprising A and B" should not be limited to devices consisting only of elements A and B. Any one of the terms "including" or "which includes" or "that includes" as used herein is also an open term that also means including at least the elements/features that follow the term, but not excluding others. Thus, "including" is synonymous with and means "comprising".

Similarly, it is to be noticed that the term "coupled", when used in the claims, should not be interpreted as being limitative to direct connections only. The terms "coupled" and "connected," along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other. For example, in the context of airflow, where an outlet of A is coupled to an inlet of B it may be that one or more additional devices are provided between the outlet of A and the inlet of B.

Thus, while there has been described what are believed to be the preferred embodiments of the invention, those skilled in the art will recognize that other and further modifications may be made thereto without departing from the scope of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A dispensing unit, for dispensing stock items, the dispensing unit comprising:
   a container configured to receive or support the stock items, the container including a lid, a lid sensor on the container or lid being configured to issue at least a lid open signal in the event that a transition of the lid from closed to open is detected by the lid sensor; and a weight sensor unit, configured to support, in use, the
container, the weight sensor unit comprising:
  a weight sensor configured to output weight sensor
    readings indicative of the weight being supported by
    the weight sensor,
  a transmission device configured to transmit wireless
    signals;
  a processor, coupled to the weight sensor, lid sensor and
    to the transmission device, and
  a battery, wherein the weight sensor, transmission
    device and processor are powered by the battery;
  wherein the processor is configured to:
    receive the lid open signal;
    only after receipt of the lid open signal,
      receive one or more weight sensor readings output
        by the weight sensor, and
      transmit the one or more weight sensor readings
        wirelessly using the transmission device.

2. The dispensing unit of claim 1, wherein the lid sensor is further configured to issue a lid close signal in the event that a transition of the lid from open to closed is detected by the lid sensor; and
  wherein the processor is configured to:
    only after receipt of the lid close signal,
      receive one or more weight sensor readings output
        by the weight sensor, and
      transmit the one or more weight sensor readings
        using the transmission device.

3. The dispensing unit of claim 2, wherein the processor is configured to transmit the one or more weight sensor readings using the transmission device only after receipt (i) of the lid open signal and (ii) the lid close signal within a predetermined timeout period after the lid open signal.

4. The dispensing unit of claim 1, wherein the transmission device is configured to be operated in one of at least a first state in which the transmission device consumes power P1, and in a second state, in which the transmission device consumes power P2, wherein P2 is greater than P1.

5. The dispensing unit of claim 1, wherein the processor is configured to switch the transmission device from the first state to the second state only after only after receipt (i) of the lid open signal and/or (ii) the lid close signal within a predetermined timeout period after the lid open signal.

6. The dispensing unit of claim 5, wherein in the first state the transmission device is in deactivated mode, and in the second state the transmission device is in activated mode whereby it is able to transmit the wireless signals.

7. The dispensing unit of claim 4, wherein: (i) P1 is 2 to 50 times P2, or P1 is 5 to 15 times P2 or P1 is 10 times P2 and/or (ii) P3 is 2 to 50 times P4, or P3 is 5 to 15 times P4 or P1 is 10 times P2, or wherein P1 is zero.

8. The dispensing weight sensor-unit of claim 2, wherein:
  after the lid close signal and until the next lid open signal
    the processor is configured to repeatedly poll the
    weight sensor for a weight sensor reading of the weight
    sensor readings with a predetermined periodicity T,
    wherein (i) T is in a range of 1 second to 5 minutes, (ii)
    T is in a range of 1 second to 3 minutes or (iii) T is in
    a range of 1 second to 1 minute.

9. The weight sensor unit of claim 1, wherein the processor is configured to transmit the wireless signals using the transmission device at a given time at a settable signal strength S, corresponding to a range R of signal reception lying in the range of (i) 1 to 500 m, (ii) 50 to 500 m, (iii) 50 to 400 m or (iv) 100 to 400 m.

10. The weight sensor unit of claim 1, wherein (i) the transmission device is a Bluetooth Low Energy (BLE) transmitter, and the wireless signals are BLE signals or (ii) the transmission device is an ultra-wide band (UWB) transmitter, and the wireless signals are UWB signals.

11. The dispensing unit of claim 2, wherein:
  after the lid open signal and until the next lid close signal
    the processor is configured to repeatedly poll the
    weight sensor to obtain a weight sensor reading of the
    weight sensor readings, and to average the weight
    sensor readings obtained over a predetermined period
    lying within or contemporaneous with the period
    between the lid open signal and until the next lid close
    signal.

12. The dispensing unit of claim 2, wherein the processor is configured to:
  poll the weight sensor to obtain a weight sensor reading
    in response to receipt of the lid open signal; and/or
  poll the weight sensor to obtain a weight sensor reading
    in response to receipt of the lid close signal; and/or
  average weight sensor readings in a period commencing
    at a time point a first predetermined delay period after
    the lid open signal and/or ending at the next lid close
    signal.

13. A dispensing enclosure, the dispensing enclosure comprising:
  a housing;
  a door mounted on the housing, whereby the door is
    openable and closable by a user; and
  one or more shelves mounted internally within the housing; and
  one or more dispensing units according to claim 1 disposed on one or more of the shelves.

14. The dispensing enclosure of claim 13, wherein, for each dispensing unit, the processor thereof the corresponding dispensing unit is configured to (i) obtain the one or more weight sensor readings and/or (ii) transmit the one or more weight sensor readings using the transmission device, independently of the processor of the or each other dispensing unit.

15. The dispensing enclosure of claim 13, wherein (i) the one or more weight sensor readings are obtained and/or (ii) the one or more weight sensor readings are transmitted using the transmission device, only by the respective processor of those dispensing units in which the lid open signal and/or the next lid close signal is received.

* * * * *